US007770546B2

(12) United States Patent
Dick et al.

(10) Patent No.: US 7,770,546 B2
(45) Date of Patent: *Aug. 10, 2010

(54) RADIAL IMPULSE ENGINE, PUMP, AND COMPRESSOR SYSTEMS, AND ASSOCIATED METHODS OF OPERATION

(75) Inventors: Timber Dick, Denver, CO (US); Corban I. Tillemann-Dick, Denver, CO (US); Levi M. Tillemann-Dick, Washington, DC (US); Tomicah S. Tillemann-Dick, Washington, DC (US)

(73) Assignee: IRIS Engines, Inc., Washington, DC (US)

( * ) Notice: Subject to any disclaimer, the term of this patent is extended or adjusted under 35 U.S.C. 154(b) by 108 days.

This patent is subject to a terminal disclaimer.

(21) Appl. No.: 11/954,053

(22) Filed: Dec. 11, 2007

(65) Prior Publication Data
US 2008/0087235 A1 Apr. 17, 2008

Related U.S. Application Data

(63) Continuation of application No. 11/414,148, filed on Apr. 28, 2006, now Pat. No. 7,392,768.

(60) Provisional application No. 60/676,017, filed on Apr. 29, 2005, provisional application No. 60/719,631, filed on Sep. 21, 2005.

(51) Int. Cl.
*F02B 25/08* (2006.01)

(52) U.S. Cl. ..................... 123/18 R; 123/232; 123/241

(58) Field of Classification Search ............... 123/18 R, 123/232, 241
See application file for complete search history.

(56) References Cited

U.S. PATENT DOCUMENTS

| 696,768 A | 4/1902 | Sleeper |
| 2,071,528 A | 2/1937 | Hover |
| 2,097,881 A | 11/1937 | Hopkins |
| 2,507,923 A | 5/1950 | Morris |
| 2,731,002 A | 1/1956 | Fiala-Fernbrugg |
| 2,853,982 A | 9/1958 | Bachle et al |

(Continued)

FOREIGN PATENT DOCUMENTS

EP 0680551 8/1997

(Continued)

OTHER PUBLICATIONS

International Search Report and Written Opinion for International Application No. PCT/US2006/016304, 6 pages, mailed Feb. 21, 2007.

(Continued)

*Primary Examiner*—Noah Kamen
(74) *Attorney, Agent, or Firm*—Perkins Coie LLP

(57) ABSTRACT

Radial impulse engine, pump, and compressor systems are disclosed herein. In one embodiment of the invention, an engine includes a first end wall portion spaced apart from a second end wall portion to at least partially define a combustion chamber therebetween. In this embodiment, the engine further includes a plurality of movable wall portions disposed between the first and second end wall portions. Each movable wall portion includes a cylindrical surface extending at least partially between a distal edge portion and a pivot axis. Upon ignition in the combustion chamber, the distal edge portion of each movable wall portion slides across the cylindrical surface of the adjacent movable wall portion as the movable wall portions pivot outwardly in unison about their respective pivot axes.

20 Claims, 43 Drawing Sheets

U.S. PATENT DOCUMENTS

| | | |
|---|---|---|
| 2,886,018 A | 5/1959 | Cuddon-Fletcher |
| 2,896,596 A | 7/1959 | Abraham |
| 2,925,073 A | 2/1960 | Millar |
| 2,949,899 A | 8/1960 | Jacklin |
| 3,021,825 A | 2/1962 | Garcia De La Pera |
| 3,090,366 A | 5/1963 | Nagelmann |
| 3,130,592 A | 4/1964 | Burrison |
| 3,135,166 A | 6/1964 | Born |
| 3,304,923 A | 2/1967 | Parenti |
| 3,315,653 A | 4/1967 | Chicurel |
| 3,394,683 A | 7/1968 | Erick |
| 3,431,788 A | 3/1969 | Du Pre |
| 3,439,654 A | 4/1969 | Campbell |
| 3,446,192 A | 5/1969 | Woodward |
| 3,528,396 A | 9/1970 | Cummins |
| 3,538,893 A | 11/1970 | Tinsley |
| 3,563,223 A | 2/1971 | Ishida et al. |
| 3,604,204 A | 9/1971 | Conrad et al. |
| 3,677,026 A | 7/1972 | Granryd et al. |
| 3,692,005 A | 9/1972 | Buske |
| 3,702,057 A | 11/1972 | Rabiger et al. |
| 3,857,370 A | 12/1974 | Hemenway |
| 3,866,581 A | 2/1975 | Herbert |
| 3,868,931 A | 3/1975 | Dutry et al. |
| 3,871,337 A | 3/1975 | Green et al. |
| 3,895,620 A | 7/1975 | Foster |
| 3,961,607 A | 6/1976 | Brems |
| 3,969,894 A | 7/1976 | Bachmann |
| 3,987,767 A | 10/1976 | Buske |
| 4,030,471 A | 6/1977 | Ginkel |
| 4,086,880 A | 5/1978 | Bates |
| 4,090,478 A | 5/1978 | Trimble et al. |
| 4,090,479 A | 5/1978 | Kaye et al. |
| 4,188,131 A | 2/1980 | Duguet |
| 4,305,349 A | 12/1981 | Zimmerly |
| 4,412,476 A | 11/1983 | Benaroya et al. |
| 4,418,663 A | 12/1983 | Bentley |
| 4,419,969 A | 12/1983 | Bundrick, Jr. |
| 4,463,662 A | 8/1984 | Okuyama et al. |
| 4,475,439 A | 10/1984 | Myers |
| 4,480,599 A | 11/1984 | Allais et al. |
| 4,489,686 A | 12/1984 | Yagi et al. |
| 4,527,516 A | 7/1985 | Foster et al. |
| 4,553,471 A | 11/1985 | Brademeyer |
| 4,635,590 A | 1/1987 | Gerace |
| 4,651,690 A | 3/1987 | Yang |
| 4,677,950 A * | 7/1987 | Buske ........................ 123/241 |
| 4,678,407 A | 7/1987 | Benaroya et al. |
| 4,679,538 A | 7/1987 | Foster et al. |
| 4,796,514 A | 1/1989 | Richter et al. |
| 4,800,858 A | 1/1989 | Yang |
| 4,802,449 A | 2/1989 | Yang |
| 4,823,745 A | 4/1989 | Yang |
| 4,867,121 A | 9/1989 | Bivona et al. |
| 4,905,574 A | 3/1990 | Trevisan et al. |
| 4,955,328 A | 9/1990 | Sobotowski |
| 5,004,409 A | 4/1991 | Nakhmanson et al. |
| 5,012,769 A | 5/1991 | Cottingham |
| 5,025,756 A | 6/1991 | Nyc |
| 5,056,471 A | 10/1991 | Van Husen |
| 5,067,323 A | 11/1991 | Bennett et al. |
| 5,072,651 A | 12/1991 | Kagita et al. |
| 5,083,530 A | 1/1992 | Rassey |
| 5,109,810 A | 5/1992 | Christenson |
| 5,203,287 A | 4/1993 | Wiley |
| 5,228,415 A | 7/1993 | Williams |
| 5,251,594 A | 10/1993 | Meyer |
| 5,261,358 A | 11/1993 | Rorke et al. |
| 5,305,716 A | 4/1994 | Huttlin |
| 5,363,813 A | 11/1994 | Paarlberg |
| 5,419,292 A | 5/1995 | Antonov |
| 5,447,142 A | 9/1995 | Bailey |
| 5,448,979 A | 9/1995 | Clarke |
| 5,460,128 A | 10/1995 | Kruse |
| 5,474,044 A | 12/1995 | Matterazzo et al. |
| 5,477,818 A | 12/1995 | Ascari et al. |
| 5,517,953 A | 5/1996 | Wiesen |
| 5,520,147 A | 5/1996 | Secord et al. |
| 5,636,610 A | 6/1997 | Friedrich et al. |
| 5,713,314 A | 2/1998 | Beare et al. |
| 5,809,864 A | 9/1998 | Ashton et al. |
| 5,950,427 A | 9/1999 | Demerjian, Jr. et al. |
| 6,016,737 A | 1/2000 | Leijonberg et al. |
| 6,026,768 A | 2/2000 | Spitler et al. |
| 6,050,153 A | 4/2000 | Yoneyama et al. |
| 6,079,377 A | 6/2000 | Leijonberg et al. |
| 6,082,313 A | 7/2000 | Leijonberg et al. |
| 6,092,493 A | 7/2000 | Leijonberg et al. |
| 6,142,112 A | 11/2000 | Leijonberg et al. |
| 6,148,776 A | 11/2000 | Liejonberg et al. |
| 6,192,858 B1 | 2/2001 | Nieberding et al. |
| 6,250,263 B1 | 6/2001 | Sisco |
| 6,270,322 B1 | 8/2001 | Hoyt |
| 6,289,867 B1 | 9/2001 | Free |
| 6,386,838 B2 | 5/2002 | Hoyt |
| 6,393,841 B1 | 5/2002 | Van Husen |
| 6,415,747 B1 | 7/2002 | Asano et al. |
| 6,474,288 B1 | 11/2002 | Blom |
| 6,722,322 B2 | 4/2004 | Tse et al. |
| 6,782,800 B2 | 8/2004 | Strain et al. |
| 6,796,285 B2 | 9/2004 | Karnes |
| 6,814,045 B2 | 11/2004 | Masters et al. |
| 6,886,528 B2 | 5/2005 | James |
| 6,899,017 B2 | 5/2005 | Meagher et al. |
| 6,912,988 B2 | 7/2005 | Adams et al. |
| 6,988,482 B2 | 1/2006 | Lockett |
| 2003/0101962 A1 | 6/2003 | Masters |
| 2003/0136356 A1 | 7/2003 | Namkung |
| 2006/0260563 A1 | 11/2006 | Dick et al. |
| 2006/0260564 A1 | 11/2006 | Dick et al. |
| 2006/0260565 A1 | 11/2006 | Dick et al. |
| 2006/0260566 A1 | 11/2006 | Dick et al. |

FOREIGN PATENT DOCUMENTS

| | | |
|---|---|---|
| FR | 2396585 A1 | 2/1979 |
| RU | 2076217 C1 | 3/1997 |
| RU | 2102612 C1 | 1/1998 |
| RU | 2120043 C1 | 10/1998 |
| RU | 2158830 C1 | 11/2000 |
| SU | 1454989 A1 | 1/1989 |

OTHER PUBLICATIONS

Office Action for U.S. Appl. No. 11/413,599, mailed Jul. 31, 2007, 11 pages.
Office Action for U.S. Appl. No. 11/413,606, mailed Jul. 31, 2007, 11 pages.
Office Action for U.S. Appl. No. 11/414,167, mailed Jul. 31, 2007, 11 pages.
Office Action for U.S. Appl. No. 11/414,148, mailed Jul. 31, 2007, 12 pages.
Office Action for U.S. Appl. No. 11/953,968, mailed Aug. 11, 2008.
Office Action for U.S. Appl. No. 11/953,968, mailed Apr. 30, 2009.
Office Action for U.S. Appl. No. 11/954,572, mailed Feb. 6, 2009.
Office Action for U.S. Appl. No. 11/954,572, mailed Jul. 23, 2009.
Office Action for U.S. Appl. No. 11/954,541, mailed Feb. 6, 2009.
Office Action (translation) for China Application No. 200680021930.9 dated Jun. 12, 2009.
Office Action (translation) issued in Aug. 14, 2009 China Application No. 200680021923.9.

* cited by examiner

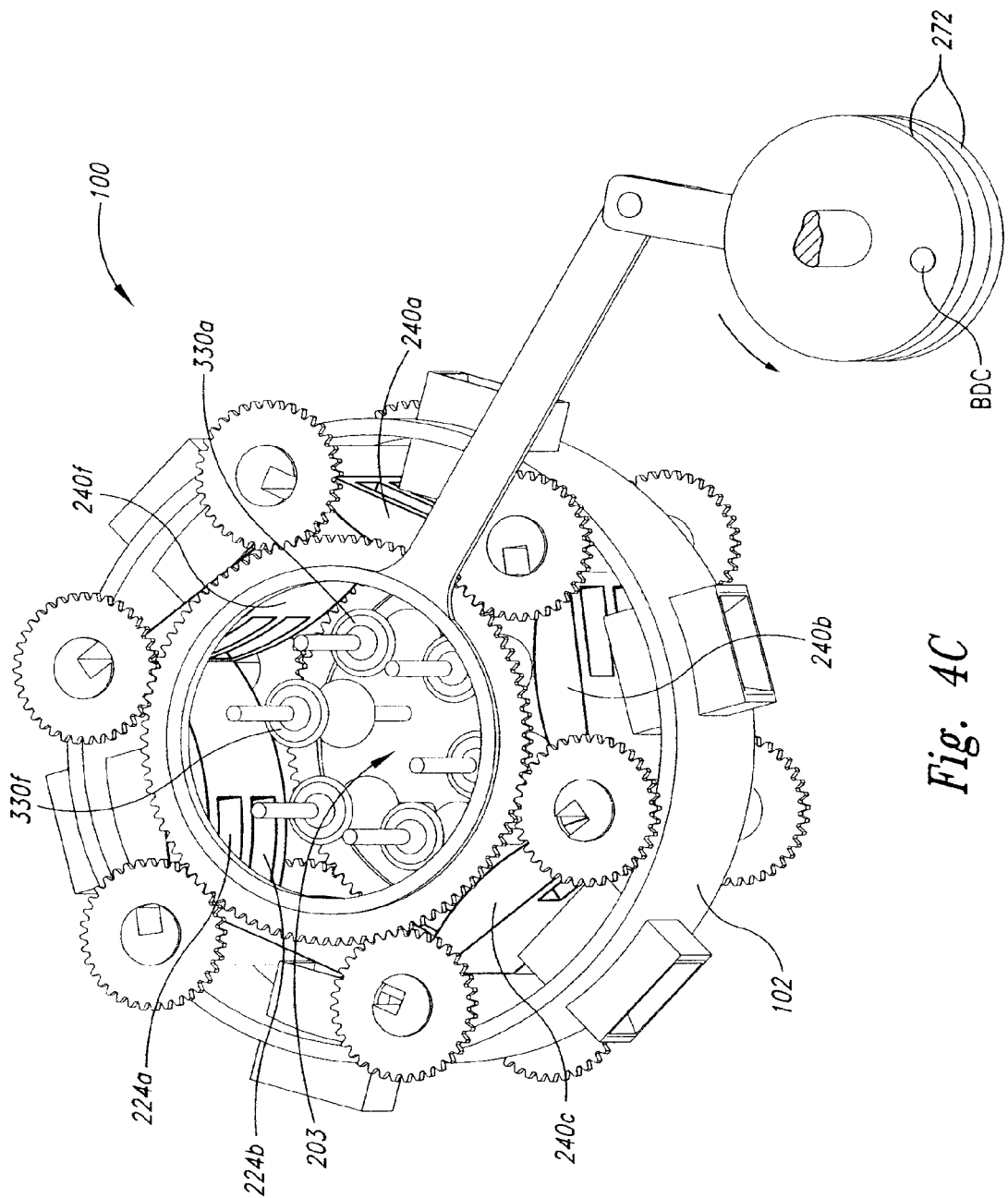

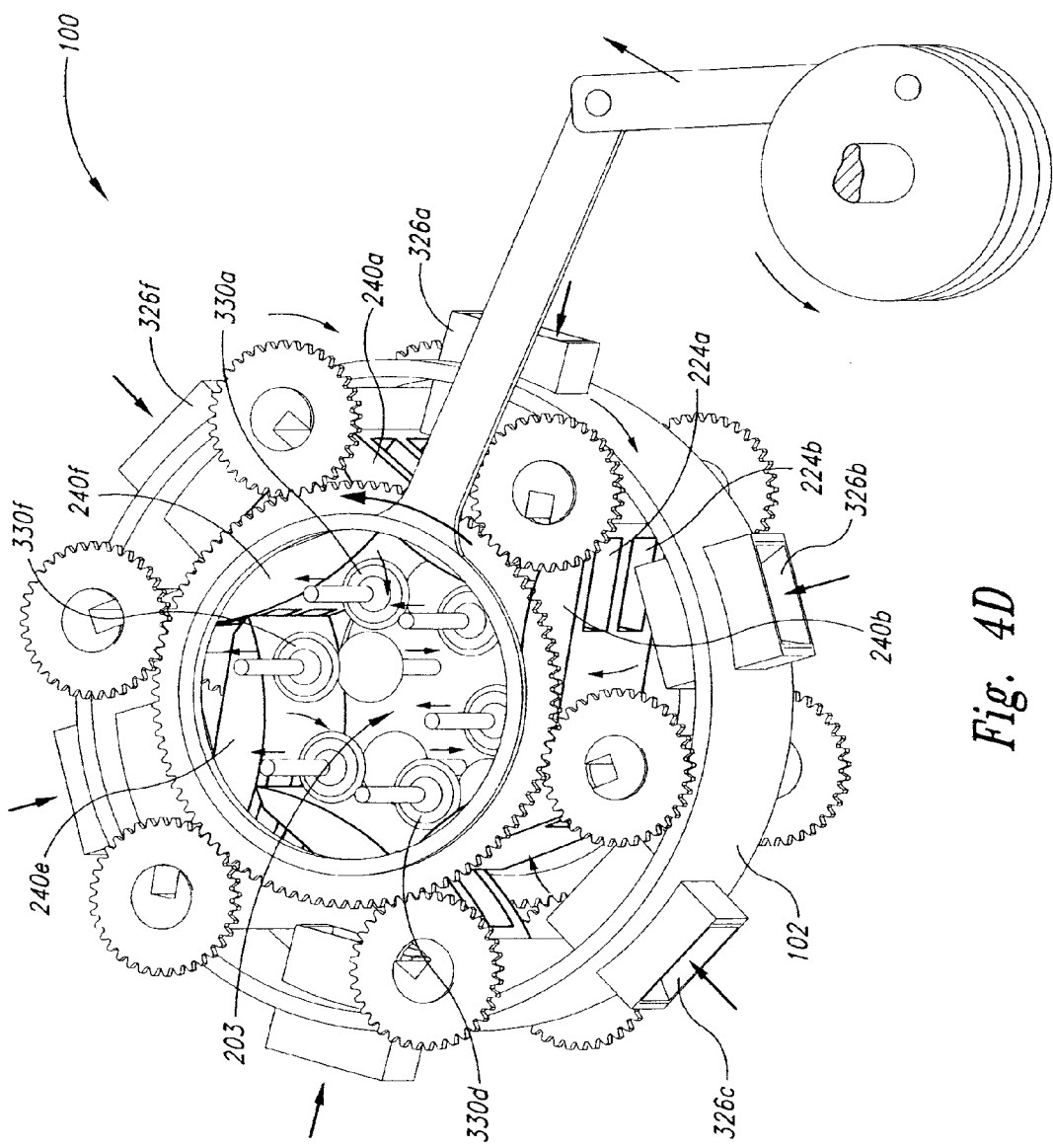

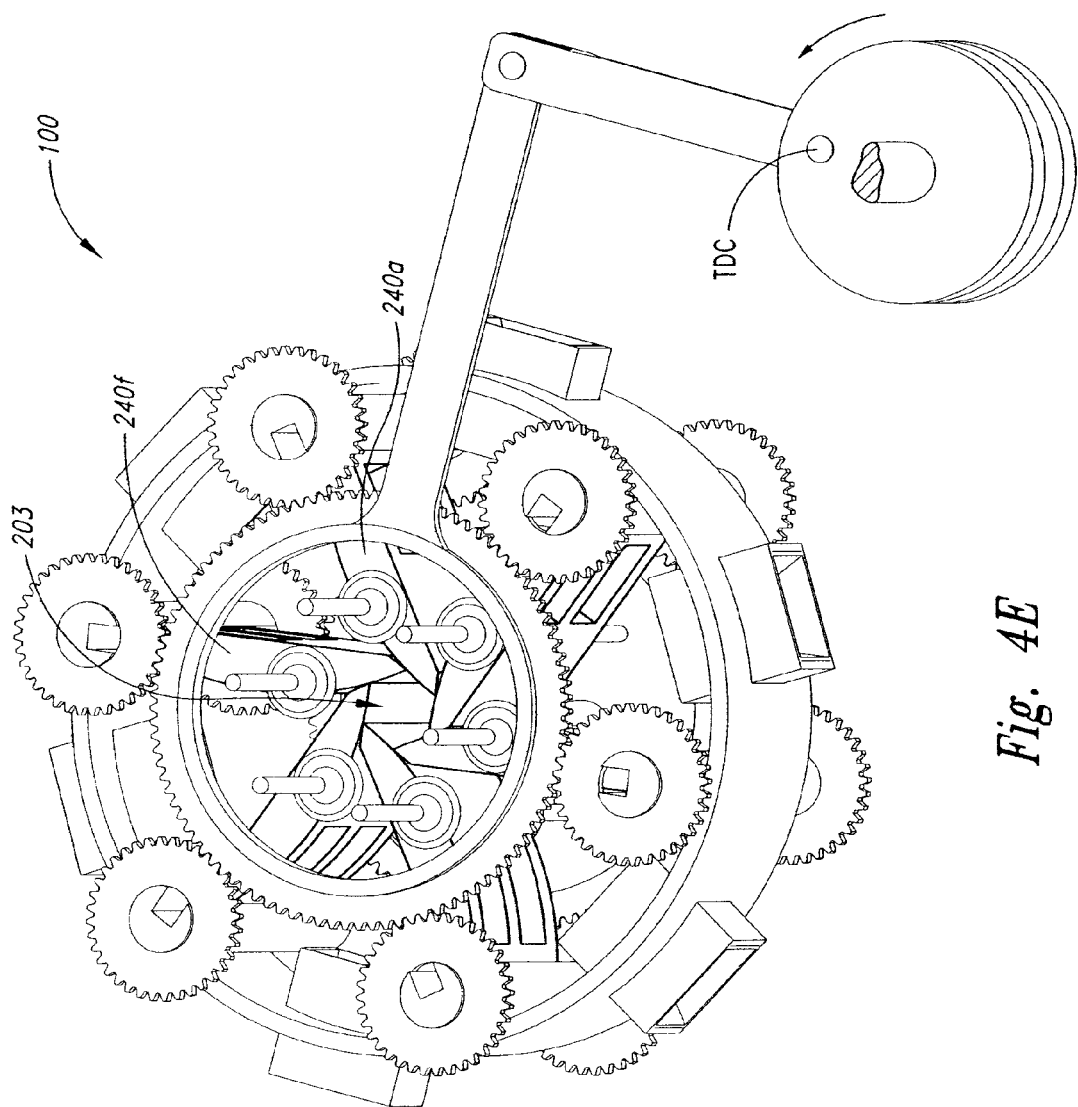

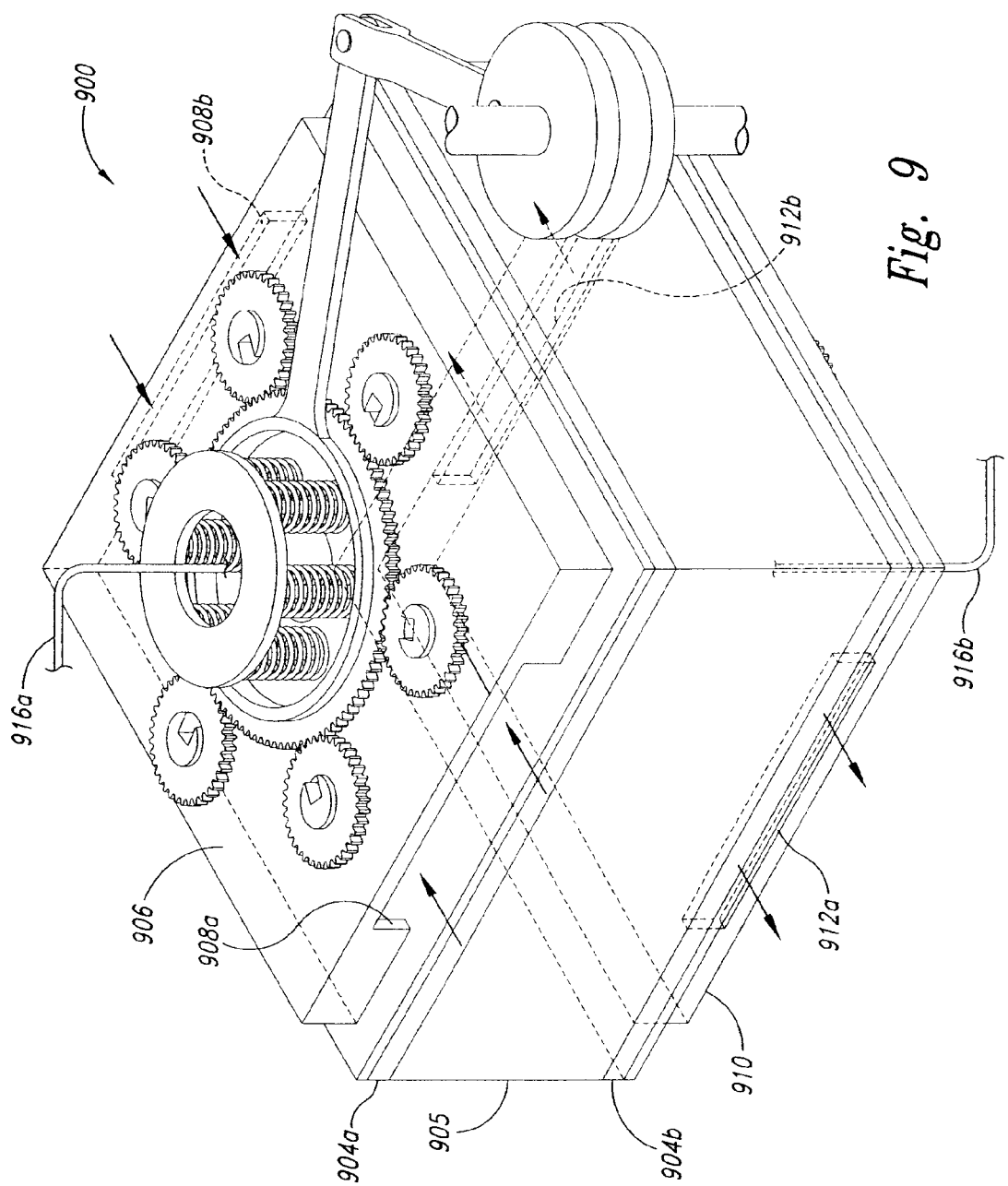

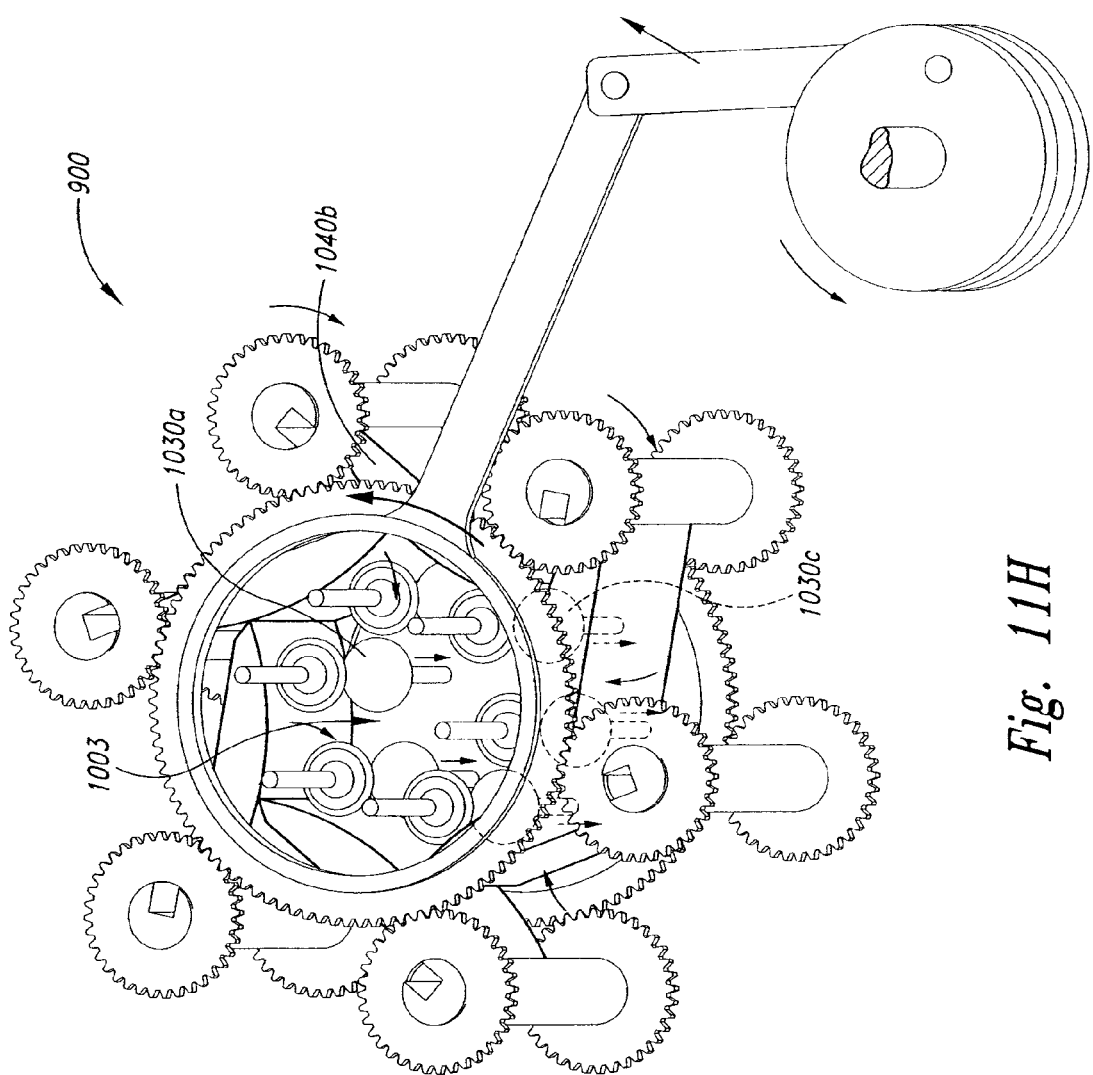

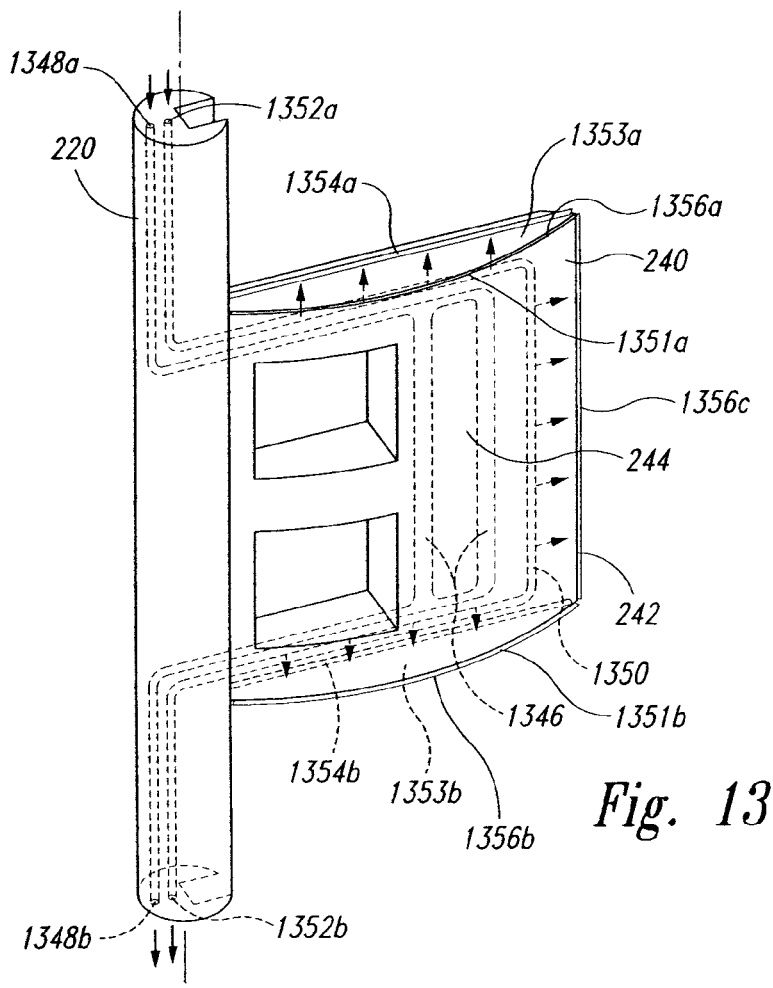
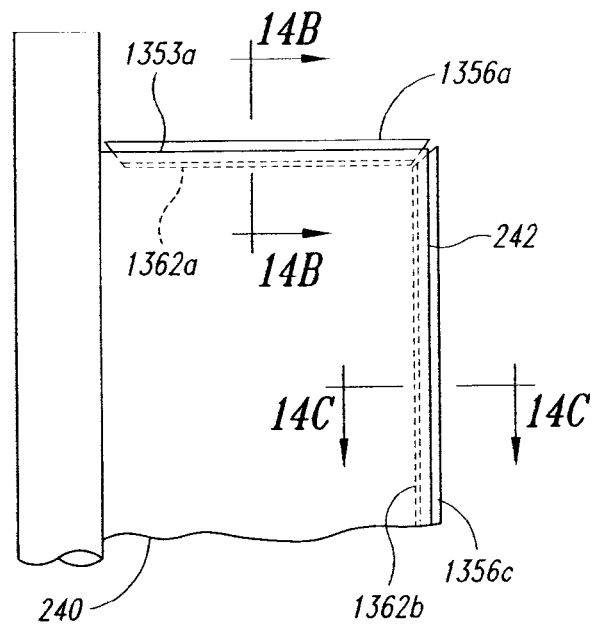
Fig. 13
Fig. 14A

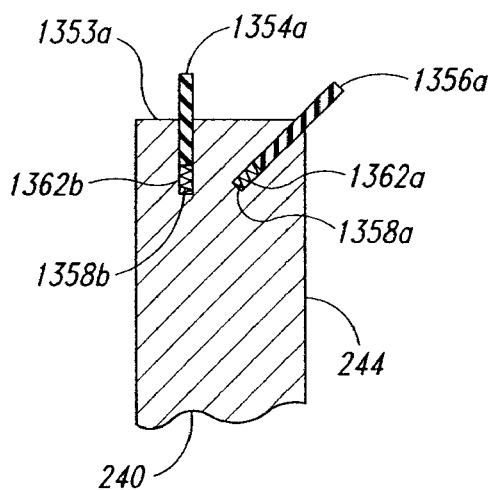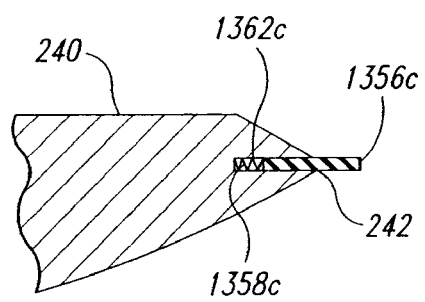
Fig. 14B  Fig. 14C
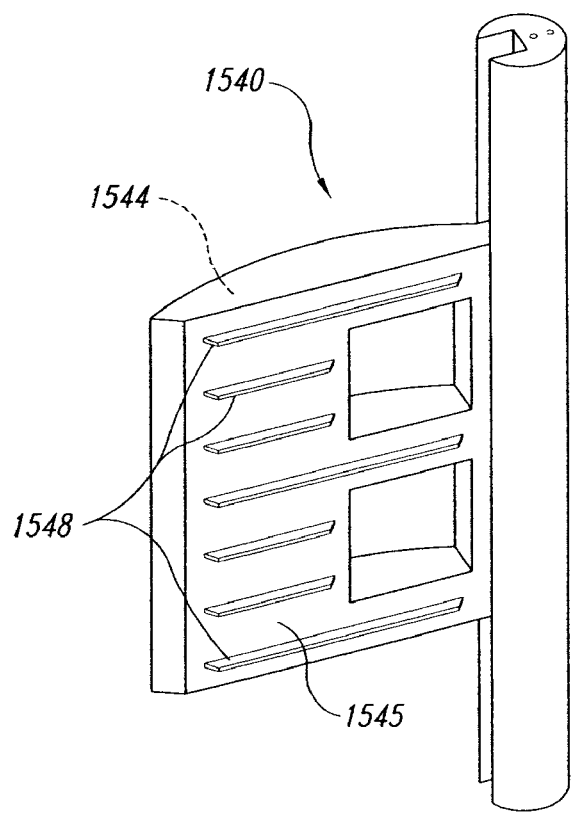
Fig. 15

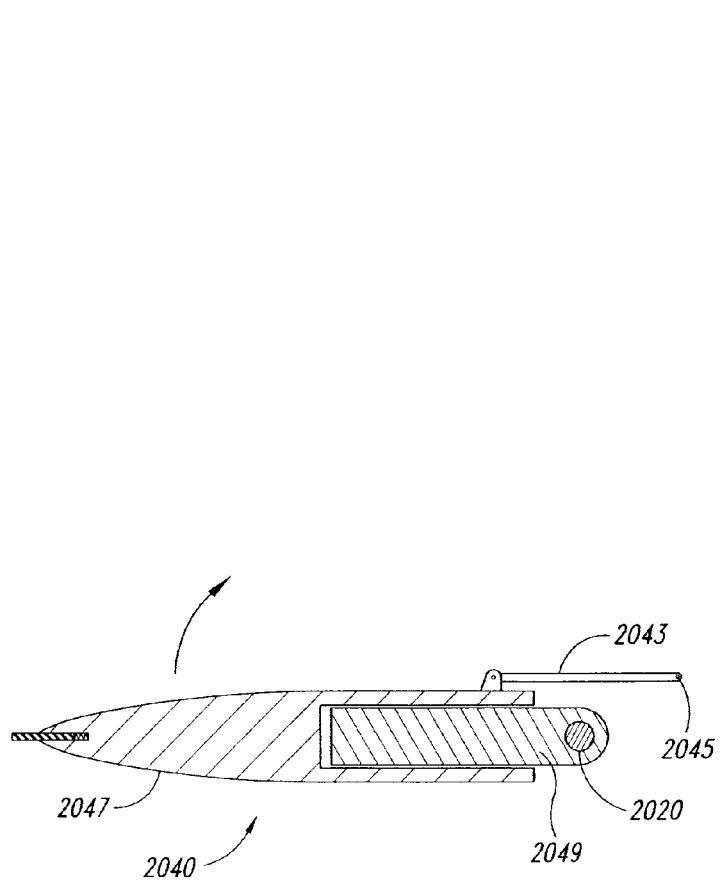
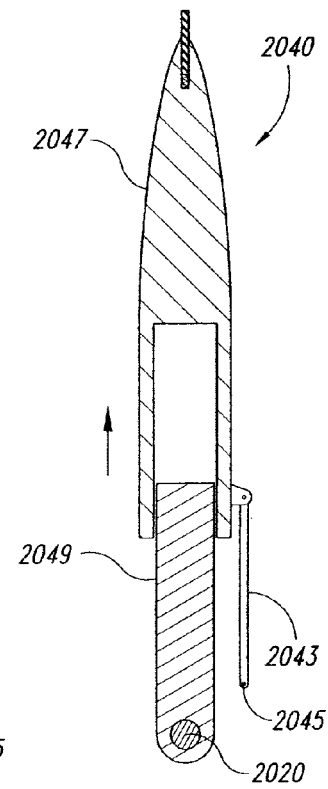
Fig. 20A          Fig. 20B
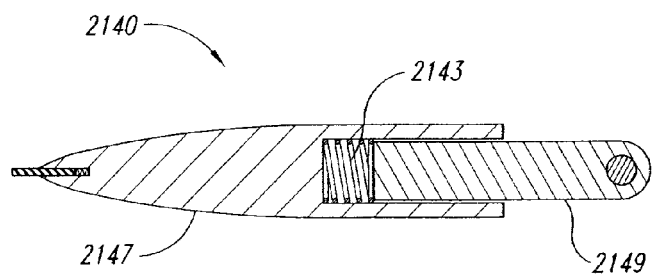
Fig. 21

RADIAL IMPULSE ENGINE, PUMP, AND COMPRESSOR SYSTEMS, AND ASSOCIATED METHODS OF OPERATION

CROSS-REFERENCE TO RELATED APPLICATIONS INCORPORATED BY REFERENCE

This application is a continuation of U.S. patent application Ser. No. 11/414,148, filed Apr. 28, 2006, which claims priority to U.S. Provisional Patent Application No. 60/676,017, filed Apr. 29, 2005, and U.S. Provisional Patent Application No. 60/719,631, filed Sep. 21, 2005. U.S. application Ser. No. 11/414,148, U.S. Provisional Patent Application No. 60/676,017, and U.S. Provisional Patent Application No. 60/719,631 are incorporated herein in their entireties by reference.

The present application is related to U.S. patent application Ser. No. 11/413,599, entitled "RADIAL IMPULSE ENGINE, PUMP, AND COMPRESSOR SYSTEMS, AND ASSOCIATED METHODS OF OPERATION," filed Apr. 28, 2006; U.S. patent application Ser. No. 11/413,606, entitled "RADIAL IMPULSE ENGINE, PUMP, AND COMPRESSOR SYSTEMS, AND ASSOCIATED METHODS OF OPERATION," filed Apr. 28, 2006; and U.S. patent application Ser. No. 11/414,167, entitled "RADIAL IMPULSE ENGINE, PUMP, AND COMPRESSOR SYSTEMS, AND ASSOCIATED METHODS OF OPERATION," filed Apr. 28, 2006. Each of the U.S. Patent Applications listed above is incorporated herein in its entirety by reference.

TECHNICAL FIELD

The following disclosure relates generally to engines, pumps, and similar apparatuses and systems.

BACKGROUND

The efficiency of internal combustion engines is often expressed in terms of thermal efficiency, which is a measure of an engine's ability to convert fuel energy into mechanical power. Conventional internal combustion engines with reciprocating pistons typically have relatively low thermal efficiencies. Conventional automobile engines, for example, typically have thermal efficiencies of about 0.25, which means that about seventy-five percent of the fuel's energy is wasted during engine operation. Specifically, about forty percent of the fuel's energy flows out the exhaust pipe as lost heat, while another thirty-five percent is absorbed by the cooling system (i.e., coolant, oil, and surrounding air flow). As a result of these losses, only about twenty-five percent of the fuel's energy is converted into usable power for moving the car and operating secondary systems (e.g., charging systems, cooling systems, power-steering systems, etc.).

There are a number of reasons that conventional internal combustion engines are so inefficient. One reason is that the cylinder head and walls of the combustion chamber absorb heat energy from the ignited fuel but do no work. Another reason is that the ignited fuel charge is only partially expanded before being pumped out of the combustion chamber at a relatively high temperature and pressure during the exhaust stroke. An additional reason is that reciprocating piston engines produce very little torque through much of the piston stroke because of the geometric relationship between the reciprocating piston and the rotating crankshaft.

While some advancements have been made in the field of piston engine technology, it appears that the practical limits of piston engine efficiency have been reached. The average fuel economy of new cars, for example, has increased by only 2.3 miles-per-gallon (mpg) in the last 20 years or so. More specifically, the average fuel economy of new cars has increased from 26.6 mpg in 1982 to only 28.9 mpg in 2002.

Although a number of alternatives to the conventional internal combustion engine have been proposed, each offers only marginal improvements. Hybrid vehicles, for example (e.g., the Toyota Prius), and alternative fuel systems (e.g., propane, natural gas, and biofuels) still use conventional reciprocating piston engines with all of their attendant shortcomings. Electric cars, on the other hand, have limited range and are slow to recharge. Hydrogen fuel cells are another alternative, but implementation of this nascent technology is relatively expensive and requires a new fuel distribution infrastructure to replace the existing petroleum-based infrastructure. Accordingly, while each of these technologies may hold promise for the future, they appear to be years away from mass-market acceptance.

SUMMARY

This summary is provided for the benefit of the reader only, and does not limit the invention as set forth by the claims.

The present invention is directed generally toward engines, pumps, and similar energy conversion devices that convert thermal energy into mechanical energy or, alternatively, convert mechanical energy into fluid energy. An internal combustion engine configured in accordance with one aspect of the invention includes a first end wall portion spaced apart from a second end wall portion to at least partially define a combustion chamber therebetween. The engine further includes first and second movable wall portions disposed between the first and second end wall portions. The first movable wall portion includes a first distal edge portion spaced apart from a first pivot axis. The second movable wall portion includes a second distal edge portion spaced apart from a second pivot axis. The second movable wall portion further includes a cylindrical surface extending at least partially between the second distal edge portion and the second pivot axis. Upon ignition in the combustion chamber, the first distal edge portion of the first movable wall portion slides across the cylindrical surface of the second movable wall portion as the first and second movable wall portions pivot outwardly in unison about their respective pivot axes. In one embodiment of the invention, each of the movable wall portions can additionally include an aperture configured to admit at least one of air and an air/fuel mixture into the combustion chamber during engine operation.

In another aspect of the invention, the engine further includes a third movable wall portion disposed between the first and second end wall portions adjacent to the second movable wall portion. Like the first and second movable wall portions, the third movable wall portion has a third distal edge portion spaced apart from a third pivot axis. In this aspect of the invention, the cylindrical surface of the first movable wall portion has a first radius of curvature, and the first, second, and third pivot axes define a circle having a second radius of curvature that is at least approximately equivalent to the first radius of curvature.

In a further aspect of the invention, the first movable wall portion is fixedly attached to a first wrist shaft, and the second movable wall portion is fixedly attached to a second wrist shaft. In this aspect of the invention, the first wrist shaft is operably coupled to the second wrist shaft to ensure that the movable wall portions move in unison during engine operation. In one embodiment of the invention, a synchronizing ring gear operably couples the first wrist shaft to the second wrist shaft for this purpose. In this embodiment, the synchronizing ring gear is also coupled to a crankshaft for power transmission and energy storage.

BRIEF DESCRIPTION OF THE DRAWINGS

FIGS. 4A-4E are a series of isometric views illustrating operation of the engine of FIG. 1 in a two-stroke mode in accordance with an embodiment of the invention.

FIG. 9 is an isometric view of a radial impulse engine configured in accordance with a further embodiment of the invention.

FIGS. 11A-11H are a series of isometric views illustrating operation of the engine of FIG. 9 in a four-stroke mode in accordance with an embodiment of the invention.

FIG. 13 is an enlarged isometric view of one of the chordon/wrist shaft subassemblies of the engine of FIGS. 1-4E.

FIG. 14A is an enlarged front view of a portion of the chordon of FIG. 13, and FIGS. 14B and 14C are enlarged cross-sectional views taken along lines 14B-14B and 14C-14C, respectively, in FIG. 14A.

FIG. 15 is a rear isometric view of a chordon configured in accordance with another embodiment of the invention.

FIGS. 20A and 20B are cross-sectional end views of a telescoping chordon configured in accordance with an embodiment of the invention.

FIG. 21 is a cross-sectional end view of a telescoping chordon configured in accordance with another embodiment of the invention.

DETAILED DESCRIPTION

The following disclosure provides a detailed description of a number of different engine, pump, and compressor systems, as well as a number of different methods for operating such systems. Certain details are set forth in the following description to provide a thorough understanding of various embodiments of the invention. Other details describing well-known structures and systems often associated with internal combustion engines, steam engines, pumps, and similar devices are not set forth below, however, to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, angles, and/or features without departing from the spirit or scope of the present invention. Furthermore, additional embodiments of the invention can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

I. Radial Impulse Internal Combustion Engines

Figure 1:
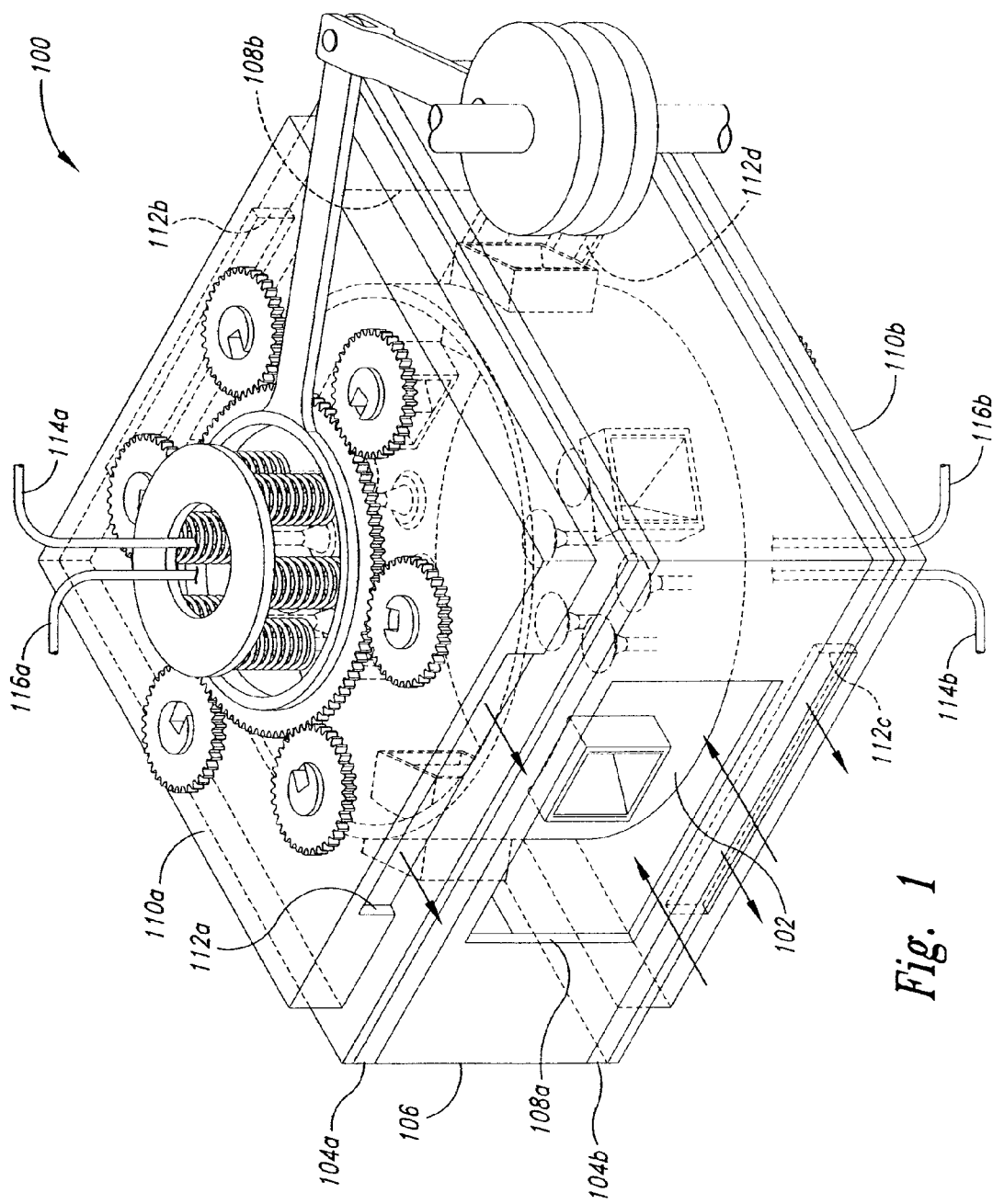
FIG. 1 is a partially hidden isometric view of a radial impulse engine configured in accordance with an embodiment of the invention.

FIG. 1 is a partially hidden isometric view of a radial impulse engine 100 ("engine 100") configured in accordance with an embodiment of the invention. In one aspect of this embodiment, the engine 100 includes a cylindrical scavenging barrel 102 extending between a first end plate 104a and a second end plate 104b. An intake manifold 106 extends around the scavenging barrel 102 and includes a first inlet 108a opposite a second inlet 108b. The inlets 108 are configured to provide air to the scavenging barrel 102 during operation of the engine 100.

In another aspect of this embodiment, the engine 100 further includes a first exhaust manifold 110a attached to the first end plate 104a and a second exhaust manifold 110b attached to the second end plate 104b. The first exhaust manifold 110a is configured to direct exhaust gases away from the scavenging barrel 102 through a first exhaust outlet 112a and a second exhaust outlet 112b. The second exhaust manifold 110b is similarly configured to direct exhaust gases away from the scavenging barrel 102 through a third exhaust outlet 112c and a fourth exhaust outlet 112d. Although not shown in FIG. 1, the exhaust outlets 112 can be connected to a muffler and/or an emission control device if desired for acoustic attenuation and/or exhaust gas cleaning, respectively.

As described in detail below, fuel can be provided to the engine 100 in a number of different ways. In the illustrated embodiment, for example, fuel is provided to a first fuel injector (not shown in FIG. 1) via a first fuel line 116a and to a second fuel injector (also not shown) via a second fuel line 116b. Although this embodiment of the engine 100 utilizes fuel injection, in other embodiments, the engine 100 can utilize other forms of fuel delivery. Such forms can include, for example, carburetors, fuel-injected throttle bodies, or similar devices positioned in flow communication with the first inlet 108a and the second inlet 108b of the intake manifold 106.

Once fuel has been injected into the engine 100, it can be ignited in a number of different ways as well. In the illustrated embodiment, for example, a first spark plug (not shown in FIG. 1) operably connected to a first ignition wire 114a, and by a second spark plug (also not shown in FIG. 1) operably connected to a second ignition wire 114b ignite the fuel. In other embodiments, other devices (e.g., glow plugs) can be used for intake charge ignition or, alternatively, the ignition devices can be omitted and the intake charge can be ignited by compression ignition.

Figure 2:
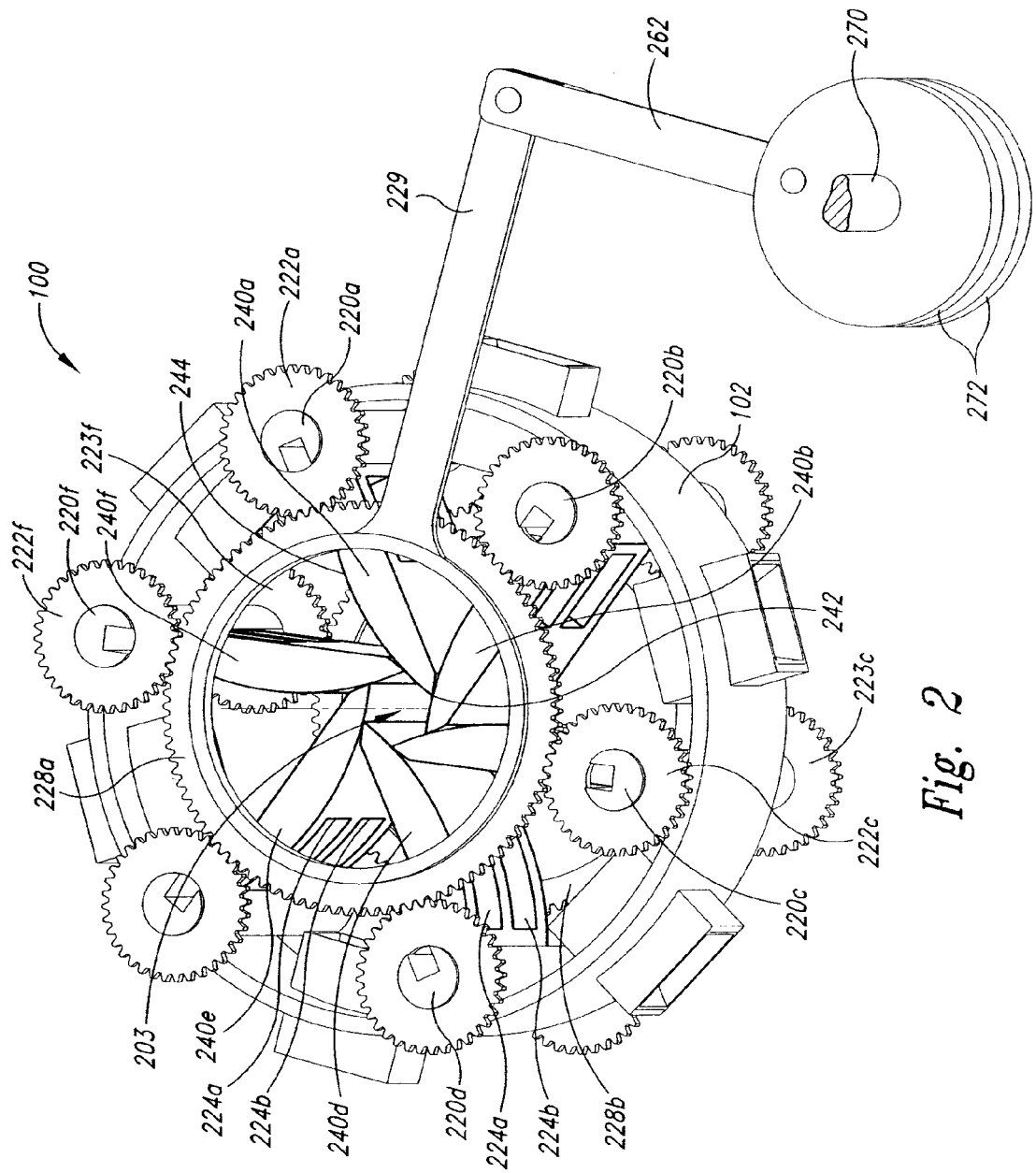
FIG. 2 is an isometric view of the engine of FIG. 1 with a number of components removed for purposes of illustration.

FIG. 2 is an isometric view of the engine 100 with the intake manifold 106, the exhaust manifolds 110, and a number of other components removed for purposes of illustration. In one aspect of this embodiment, the engine 100 includes a plurality of movable wall portions 240 (identified individually as movable wall portions 240a-f) positioned around a combustion chamber 203. For ease of reference, the movable wall portions 240 are referred to herein as "chordons." In the illustrated embodiment, each of the chordons 240 is a movable member that includes a curved face 244, a distal edge portion 242, and a plurality of transfer ports 224 (identified individually as transfer ports 224a-b). Each of the chordons 240 is fixedly attached to a corresponding wrist shaft 220 (identified individually as wrist shafts 220a-f). The wrist shafts 220 are pivotally supported by the first end plate 104a and the second end plate 104b shown in FIG. 1. As described in greater detail below, during operation of the engine 100, the chordons 240 pivot back and forth in unison about their respective wrist shafts 220. In the process, the distal edge portion 242 of each chordon 240 slides back and forth across the adjacent chordon face 244, thereby sealing the combustion chamber 203 without detrimental binding or interference.

In another aspect of this embodiment, each wrist shaft 220 carries a first timing gear 222 (identified individually as first timing gears 222a-f) on one end and a second timing gear 223 (identified individually as second timing gears 223a-f) on the other end. Each of the first timing gears 222 is operably engaged with a first ring gear 228a, and each of the second timing gears 223 is similarly engaged with a second ring gear 228b. The ring gears 228 synchronize motion of the chordons 240 during operation of the engine 100.

In a further aspect of this embodiment, a crank-arm 229 extends outwardly from the first ring gear 228a and is pivotally coupled to a connecting rod 262. The connecting rod 262 is in turn pivotally coupled to a crankshaft 270. The crankshaft 270 can include one or more flywheels 272 of sufficient mass to drive the chordons 240 through the compression (inward) portion of their cyclic motion. Although only one crankshaft assembly is illustrated in FIG. 2, in other embodiments, additional crank-arms, connecting rods, and/or crankshafts can be used if necessary for storing additional kinetic energy or for structural and/or dynamic reasons. For example, in another embodiment, a second crank-arm extends outwardly from the second ring gear 228b and can be pivotally coupled to the crankshaft 270 (or another crankshaft) by means of a second connecting rod.

Figure 3:
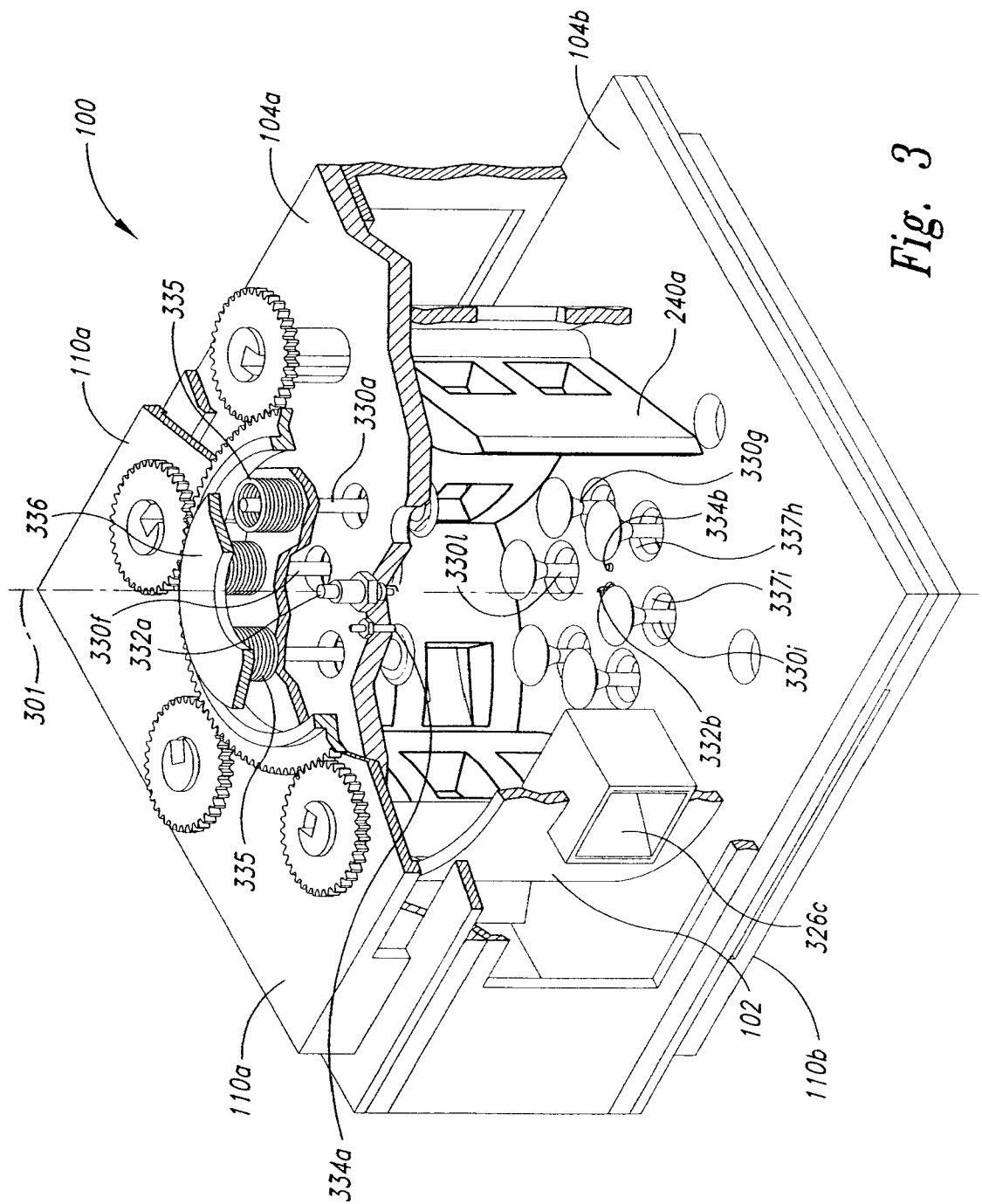
FIG. 3 is a partially cut-away isometric view of the engine of FIG. 1.

FIG. 3 is a partially cut-away isometric view of the engine 100 with the chordons 240 rotated to an outward position. In one aspect of this embodiment, the engine 100 includes a plurality of one-way valves 326 (identified individually as one-way valves 326a-f) positioned around the scavenging barrel 102 adjacent to corresponding chordons 240. The one-way valves 326 can include reed valves or similar devices configured to pass air (or an air/fuel mixture) into, but not out of, the scavenging barrel 102.

In another aspect of this embodiment, the engine 100 further includes a plurality of exhaust valves 330 (identified individually as exhaust valves 330a-l). The exhaust valves 330a-f extend through the first end plate 104a, and the exhaust valves 330g-l extend through the second end plate 104b. Each of the exhaust valves 330 seats in a corresponding exhaust port 337, and is held closed by a corresponding coil spring 335. An actuator plate 336 presses against the coil springs 335 to move the exhaust valves 330 away from the respective end plate 104 and open the exhaust ports 337. Opening the exhaust ports 337 in this manner allows exhaust gases to flow out of the combustion chamber 203 through the adjacent exhaust manifold 110.

In a further aspect of this embodiment, the engine 100 also includes first and second fuel injectors 334a and 334b, and first and second igniters 332a and 332b (e.g., spark plugs). The first and second fuel injectors 334a and 334b are carried by the first and second end plates 104a and 104b, respectively, and are configured to receive fuel from the first and second fuel lines 116a and 116b of FIG. 1, respectively. The first and second igniters 332a and 332b are carried by the first and second end plates 104a and 104b adjacent to the first and second fuel injectors 334a and 334b, respectively. In the illustrated embodiment, the first and second igniters 332a and 332b are aligned with a central axis 301 of the engine 100, and are configured to receive electrical voltage via the first and second ignition wires 114a and 114b of FIG. 1, respectively.

Figure 4A:
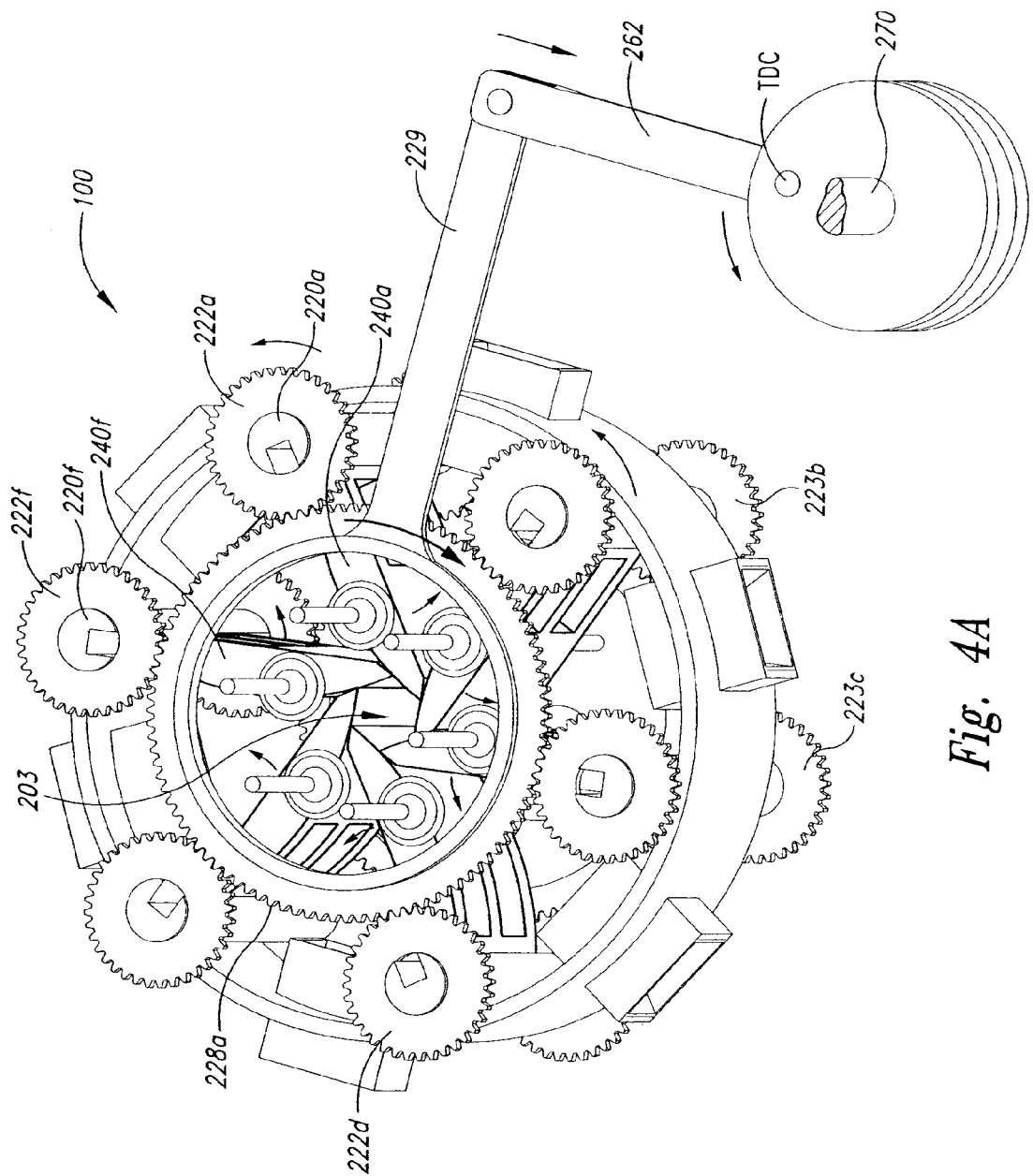

FIGS. 4A-4E are a series of isometric views illustrating operation of the engine 100 in a two-stroke mode in accordance with an embodiment of the invention. A number of engine components have been omitted from FIGS. 4A-4E to facilitate the discussion that follows. Referring first to FIG. 4A, in this view the chordons 240 are at the innermost part of their pivotal stroke which, for ease of reference, can be referred to as "top dead center." The top dead center position of the chordons 240 corresponds to top dead center position of the crankshaft 270. At this point in the cycle, the fuel injectors 334 (FIG. 3) have injected fuel into the combustion chamber 203, and the igniters 332 (FIG. 3) have ignited the compressed air/fuel mixture. The resulting combustion drives the chordons 240 outwardly, causing the wrist shafts 220 to rotate in a counterclockwise direction about their respective axes. As the wrist shafts 220 rotate in the counterclockwise direction, the timing gears 222/223 drive the ring gears 228 in a clockwise direction. As the first ring gear 228a rotates, it transmits power from the chordons 240 to the crankshaft 270 via the crank-arm 229.

Figure 4B:
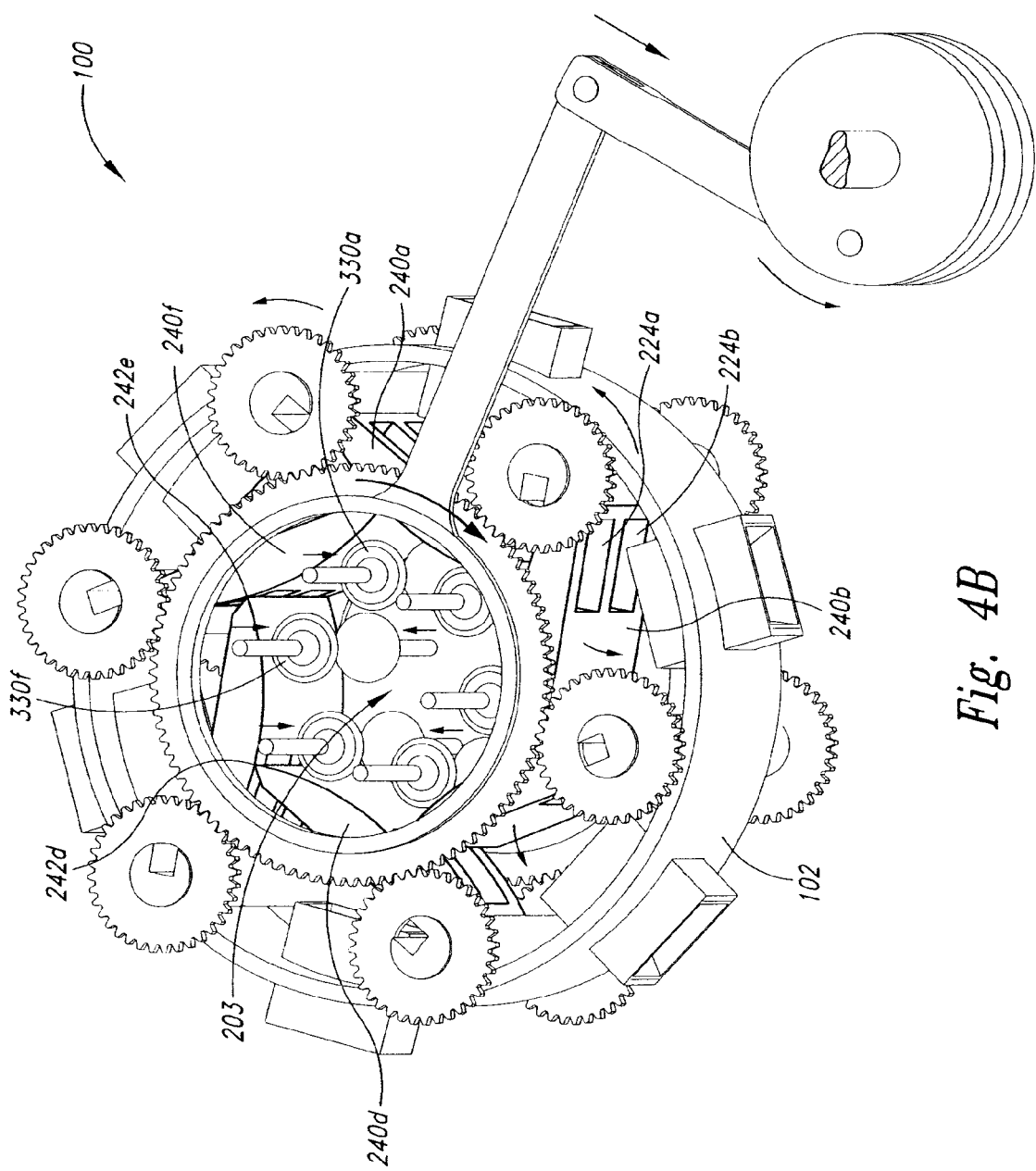

Referring next to FIG. 4B, when the chordons 240 reach a point in their outward stroke just beyond the exhaust valves 330, the exhaust valves 330 begin opening into the combustion chamber 203. This allows exhaust gases to begin flowing out of the combustion chamber 203 through the exhaust ports 337 (FIG. 3). As the chordons 240 continue moving outwardly, they compress the air trapped between them and the scavenging barrel 102. This compressed air is allowed to flow into the combustion chamber 203 once the distal edge portion 242 of each chordon 240 slides past the transfer ports 224 in the adjacent chordon 240. This incoming air helps to push the exhaust gases out of the combustion chamber 203 through the exhaust ports 337. When the chordons 240 reach the outermost part of their pivotal stroke (i.e., the "bottom dead center" position) as shown in FIG. 4C, the exhaust valves 330 are fully open. From here, the kinetic energy of the crankshaft flywheels 272 causes the chordons 240 to reverse direction and begin moving inwardly toward the top dead center position of FIG. 4A.

Referring to FIG. 4D, as the chordons 240 continue moving inwardly toward the top dead center position, they compress the intake charge and continue to push the exhaust gases out of the combustion chamber 203 through the exhaust ports 337. The exhaust valves 330 fully retract, however, before the chordons 240 reach them to avoid contact. As the chordons 240 continue moving inwardly, they create a vacuum in the space between them and the scavenging barrel 102. This vacuum draws fresh air into the scavenging barrel 102 through the one-way valves 326. This air will be compressed by the next outward stroke of the chordons 240 before flowing into the combustion chamber 203 through the transfer ports 224.

In FIG. 4E, the chordons 240 have returned to the top dead center position from which they started in FIG. 4A. At this point in the cycle, the intake charge in the combustion chamber 203 is fully compressed. As discussed above with reference to FIG. 4A, the fuel injectors 334 can inject fuel into the combustion chamber 203 at or about this time for ignition by the igniters 232. When this occurs, the cycle described above with reference to FIGS. 4A-4D repeats.

Although the embodiment of the invention described above uses fuel injection, in other embodiments the engine 100 can use other forms of fuel delivery. Such forms can include, for example, carburetors or fuel-injected throttle bodies providing an air/fuel mixture to the combustion chamber 203 through the inlets 108 (FIG. 1) of the intake manifold 106 (FIG. 1). While the engine 100 will operate satisfactorily with carburetors, fuel injection may offer certain advantages, such as better fuel economy and lower hydrocarbon emissions.

Figure 5A:
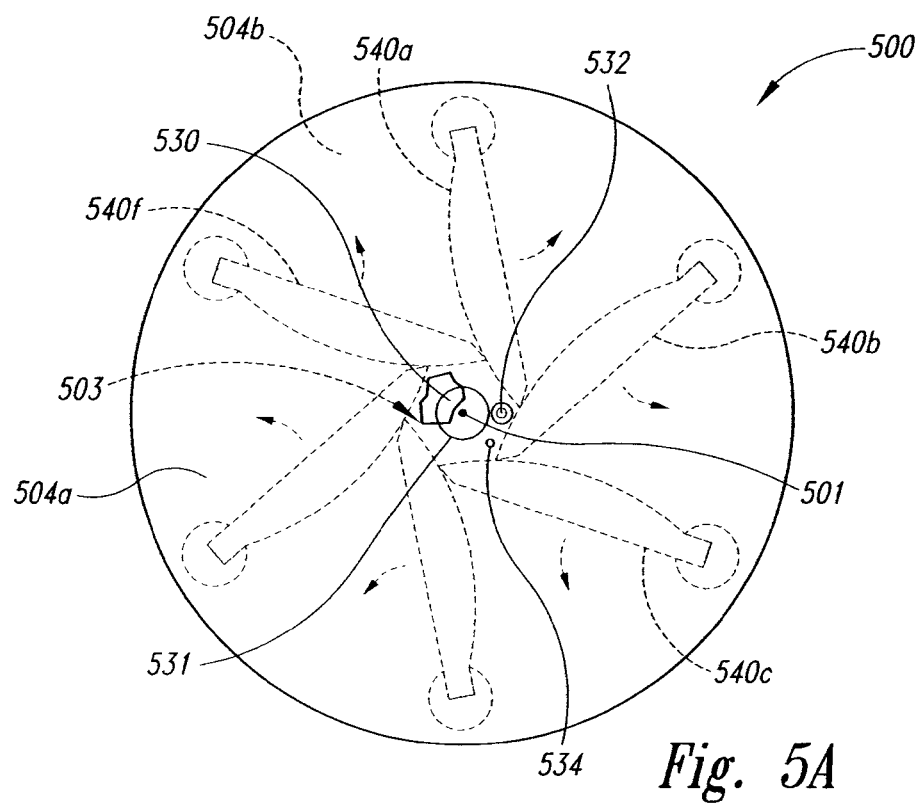
FIGS. 5A-5E are a series of top views of a portion of a radial impulse engine configured in accordance with another embodiment of the invention.
Figure 5B:
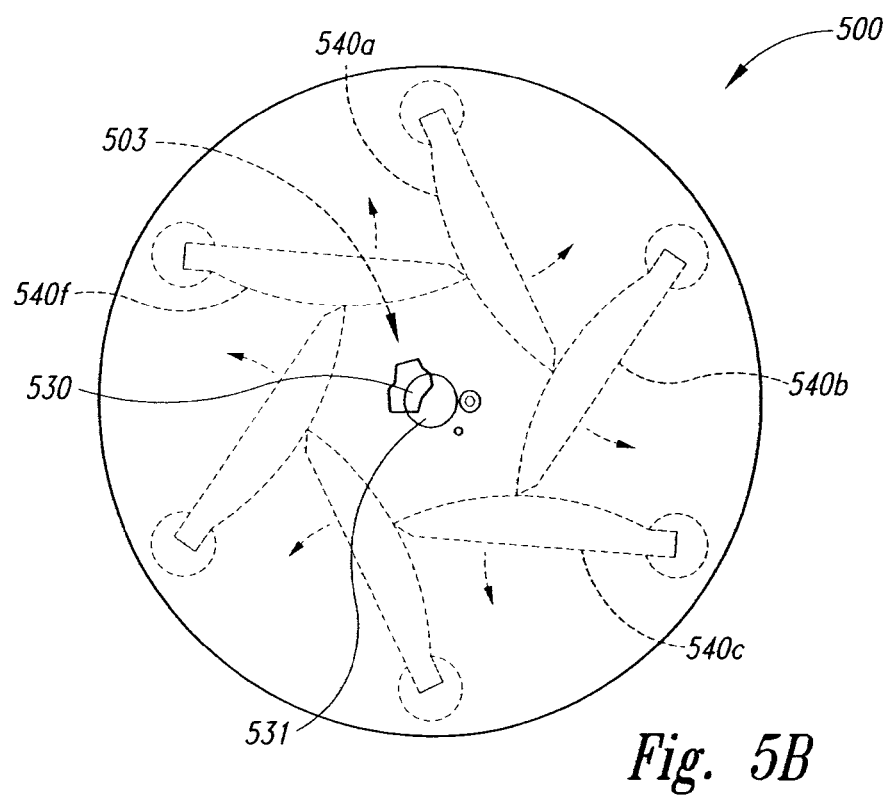

FIGS. 5A-5E are a series of top views of a portion of a radial impulse engine 500 ("engine 500") configured in accordance with another embodiment of the invention. Referring first to FIG. 5A, many features of the engine 500 can be at least generally similar in structure and function to corresponding features of the engine 100 described above with reference to FIGS. 1-4E. In this particular embodiment, however, the engine 500 does not include a scavenging barrel or the associated one-way valves. Furthermore, although the engine 500 does include a plurality of chordons 540 (identified individually as chordons 540a-f), the chordons 540 lack transfer ports (such as the transfer ports 224 described above with reference to FIGS. 2-4E). The engine 500 does, however, include an intake valve 531 in a first end plate 504a and an exhaust valve 530 in a second end plate 504b. The intake valve 531 and the exhaust valve 530 are aligned with a central axis 501 of a combustion chamber 503. A fuel injector 534 and an igniter 532 extend into the combustion chamber 503 adjacent to the intake valve 531.

The engine 500 can operate in both two-stroke and four-stroke modes. In two-stroke mode, the igniter 532 ignites a compressed intake charge when the chordons 540 are at or near the top dead center position illustrated in FIG. 5A. At this point in the cycle, the intake valve 531 and the exhaust valve 530 are fully closed, and the resulting combustion pressure drives the chordons 540 outwardly. When the chordons 540 reach the position illustrated in FIG. 5B, the exhaust valve 530 begins to open, enabling the expanding exhaust gases to start flowing out of the combustion chamber 503.

Figure 5C:
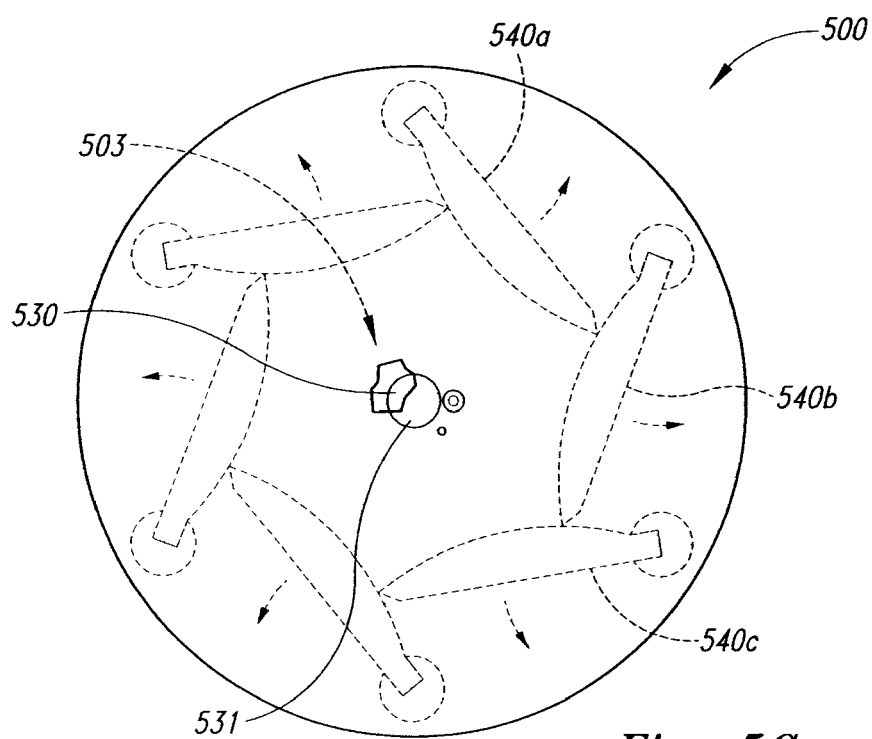

When the chordons 540 reach the position illustrated in FIG. 5C, the exhaust valve 530 is fully, or near-fully, open. At this point in the cycle, the intake valve 531 begins to open, allowing pressurized air (from, for example, an accessory scavenging blower) to flow into the combustion chamber 503. The outward motion of the chordons 540 facilitates the flow of pressurized air into the combustion chamber 503, which helps to push the exhaust gasses out of the combustion chamber 503 past the open exhaust valve 530.

Figure 5D:
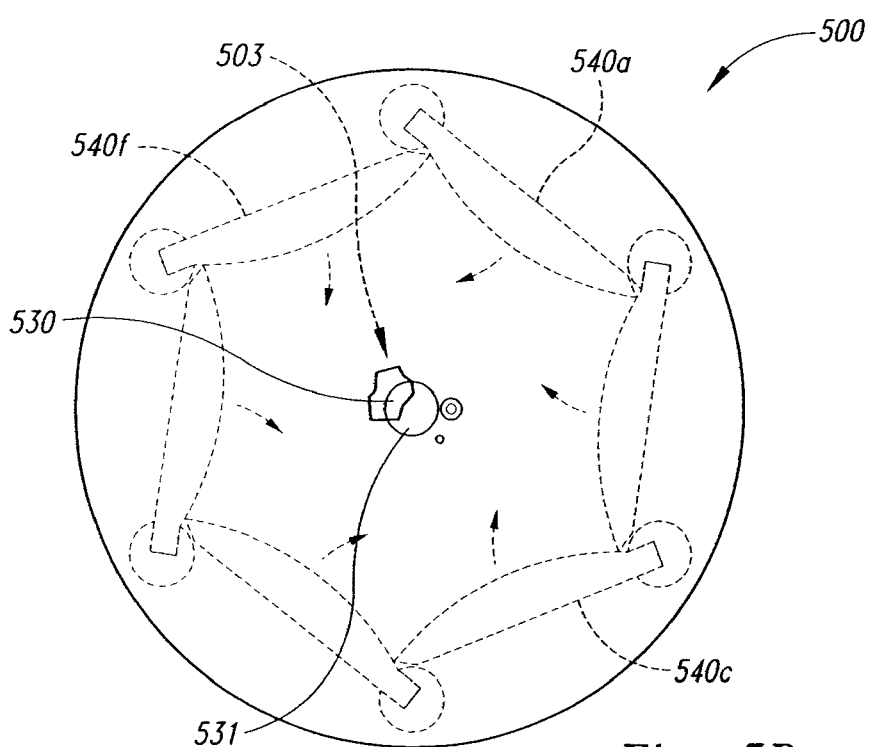
Figure 5E:
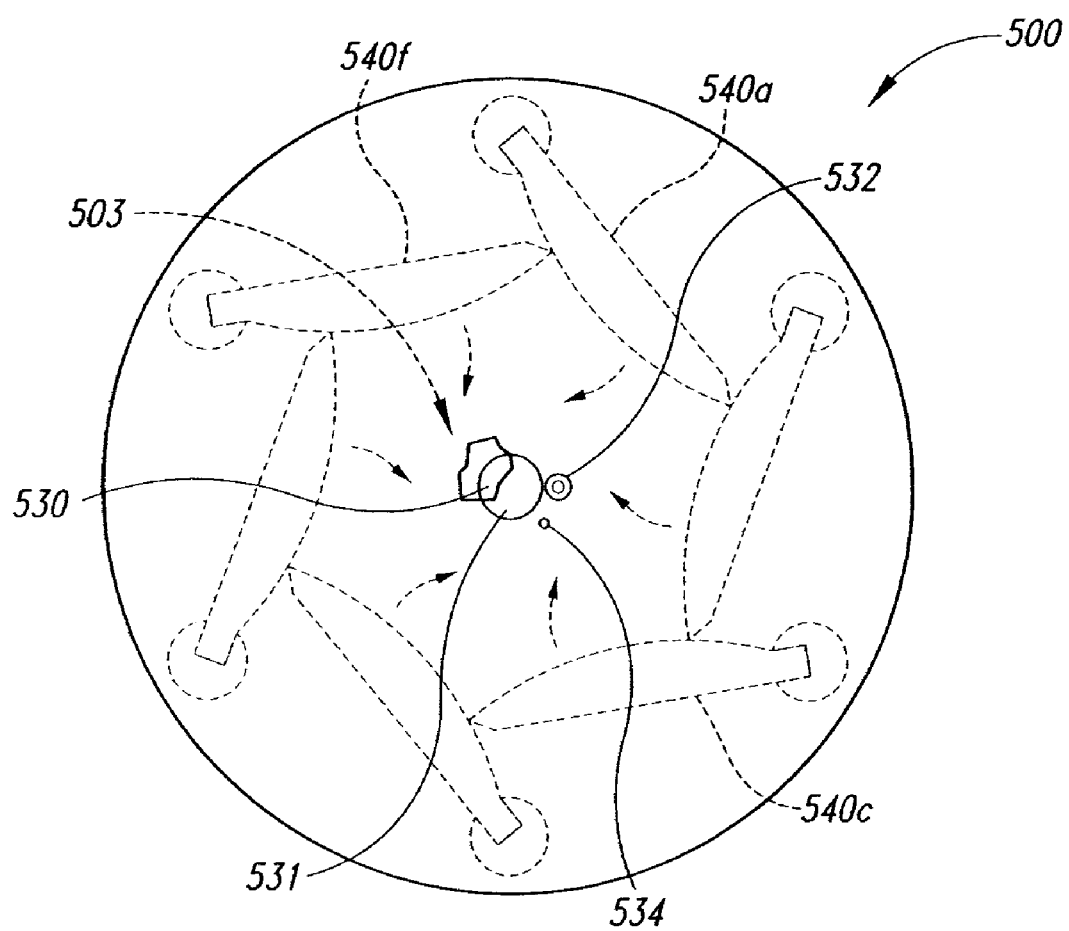

When the chordons 540 reach the bottom dead center position shown in FIG. 5D, both the exhaust valve 530 and the intake valve 531 are fully open. As the chordons 540 begin moving inwardly from this point, the intake valve 531 starts to close. When the chordons 540 reach the position illustrated in FIG. 5E, the intake valve 531 is fully, or near-fully, closed. The exhaust valve 530, however, is just starting to close. As a result, the chordons 540 continue pushing the exhaust gases out of the combustion chamber 503 as they proceed inwardly, compressing the intake charge. When the chordons 540 reach the top dead center position shown in FIG. 5A, both the exhaust valve 530 and the intake valve 531 are fully closed. At or about this time, the fuel injector 534 injects fuel into the combustion chamber 503 for ignition by the igniter 532. When this occurs, the cycle described above can repeat.

Although the embodiment of the engine 500 described above utilizes fuel injection, those of ordinary skill in the relevant art will appreciate that the engine 500 or variations thereof can be readily adapted to operate with a carburetor or similar device that introduces an air/fuel mixture into the combustion chamber 503 via the intake valve 531. Furthermore, although the engine 500 only includes a single intake valve and a single exhaust valve, in other embodiments, engines at least generally similar in structure and function to the engine 500 can include a plurality of intake valves in the first end plate 504a and a plurality of exhaust valves in the second end plate 504b. In still further embodiments, engines at least generally similar in structure and function to the engine 500 can include both intake and exhaust valves on each of the end plates 504. In such embodiments, however, the corresponding intake/exhaust manifolds may be somewhat complicated.

Figure 6:
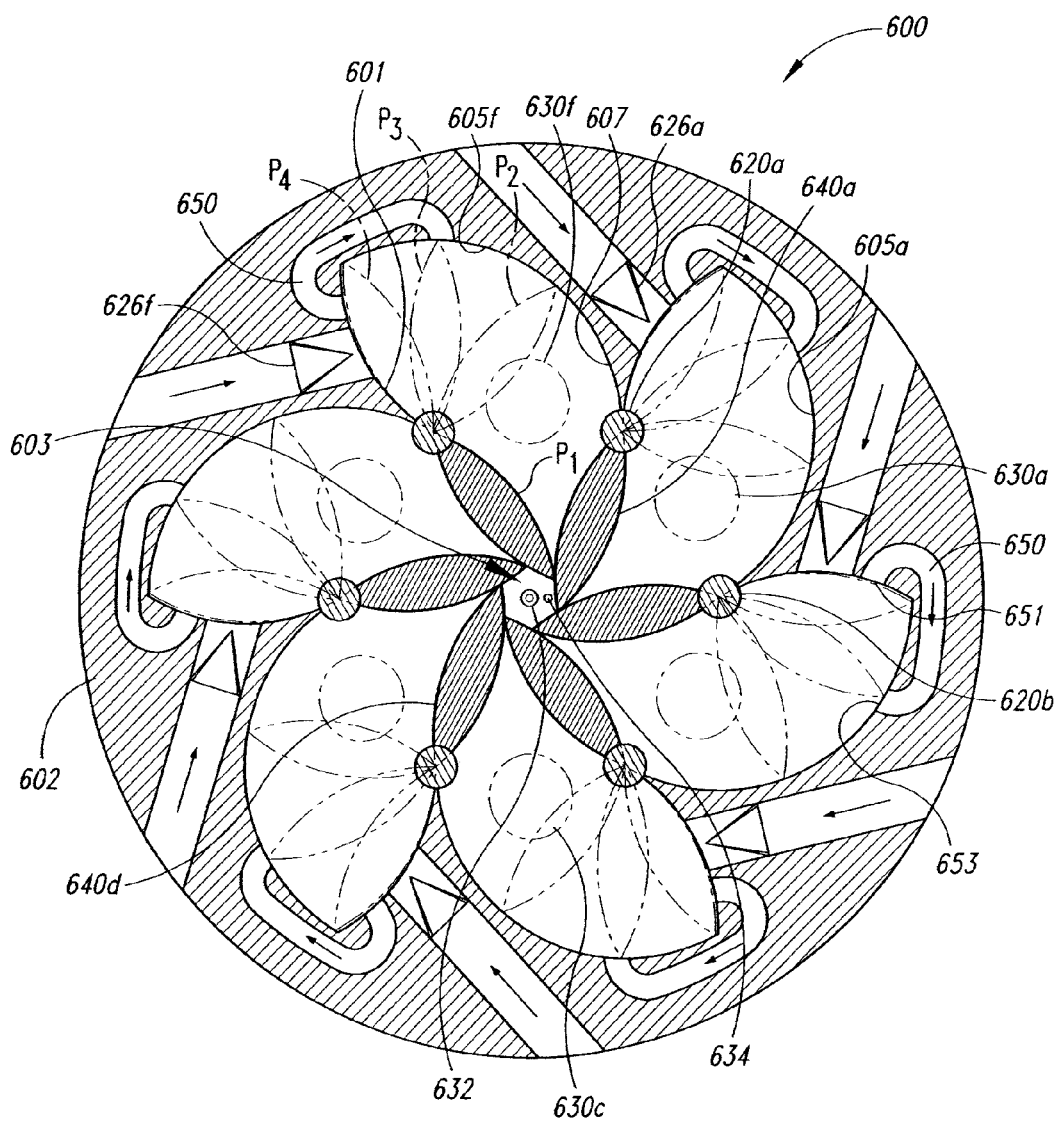
FIG. 6 is a cross-sectional top view of a portion of a radial impulse engine configured in accordance with a further embodiment of the invention.

FIG. 6 is a cross-sectional top view of a portion of a radial impulse engine 600 ("engine 600") configured in accordance with a further embodiment of the invention. Many features of the engine 600 are at least generally similar in structure and function to corresponding features of the engine 100 described above with reference to FIGS. 1-4E. For example, the engine 600 includes a plurality of chordons 640 (identified individually as chordons 640a-f) and a plurality of corresponding wrist shafts 620 (identified individually as wrist shafts 620a-f). The wrist shafts 620 enable the chordons 640 to pivot between first and second end plates (not shown). As in the engine 100, each end plate includes a plurality of exhaust ports 630 (identified individually as exhaust ports 630a-f), and each end plate carries a fuel injector 634 and an igniter 632 which extend into an adjacent combustion chamber 603.

Unlike the chordons 240 of the engine 100, the chordons 640 of the engine 600 reciprocate through an arc of about 180 degrees during normal operation. To accommodate this motion, the engine 600 further includes a scavenging barrel 602 with a plurality of individual chordon chambers 605a-f. In the illustrated embodiment, each chordon chamber 605 receives air from an associated one-way valve 626 (identified individually as one-way valves 626a-f). The one-way valves 626 flow air into the chordon chambers 605 via a back wall 601. A transfer port 650 extends from an inlet 651 on each back wall 601 to an outlet 653 on an adjacent front wall 607.

In operation, the fuel injectors 634 spray fuel into the combustion chamber 603 when the chordons 640 are at or near a first position $P_1$ (i.e., a top dead center position). The fuel mixes with compressed air in the combustion chamber 603 and is ignited by the igniters 632. The resulting combustion drives the chordons 640 outwardly from the first position $P_1$ to a second position $P_2$. As the chordons 640 approach the second position $P_2$, they allow the exhaust gases to begin flowing out of the combustion chamber 603 through the exposed exhaust ports 630. As the chordons 640 continue moving outwardly from the second position $P_2$ toward a third position $P_3$, they compress the air trapped in their respective chordon chambers 605. As the chordons 640 continue moving toward a fourth position $P_4$, however, they drive the compressed air back into the chordon chambers 605 through the transfer ports 650. This incoming charge helps to push the exhaust gases out of the combustion chamber 603 through the exhaust ports 630.

As the chordons 640 reverse direction and begin moving inwardly from the fourth position $P_4$ (i.e., the bottom dead center position), they compress the intake charge which further helps to drive the exhaust gases out of the combustion chamber 603. In addition, this motion also draws new air into the chordon chambers 605 through the one-way valves 626. Further inward motion of the chordons 640 continues to compress the intake charge and push the exhaust gases out of the combustion chamber 603 through the exhaust ports 630. When the chordons 640 arrive at position $P_1$, the fuel injectors 634 again inject fuel into the combustion chamber 603 for ignition by the igniters 632, causing the cycle described above to repeat.

Various aspects of the engine 600 can be different from those described above without departing from the spirit or scope of the present invention. For example, in another embodiment, the transfer ports 650 can be positioned in one or both of the end plates (not shown). In a further embodiment, the exhaust ports 630 can be movable relative to their respective end plates to vary the exhaust timing and change engine performance characteristics accordingly. One way to vary the exhaust timing is to utilize controllable shutter valves or similar devices to vary the port positions and/or size. In yet other embodiments, sleeve valves or similar devices can be used to actively change the relative positions of the one-way valves 626 and/or the transfer port outlets 653 to alter intake timing as desired.

Figure 7:
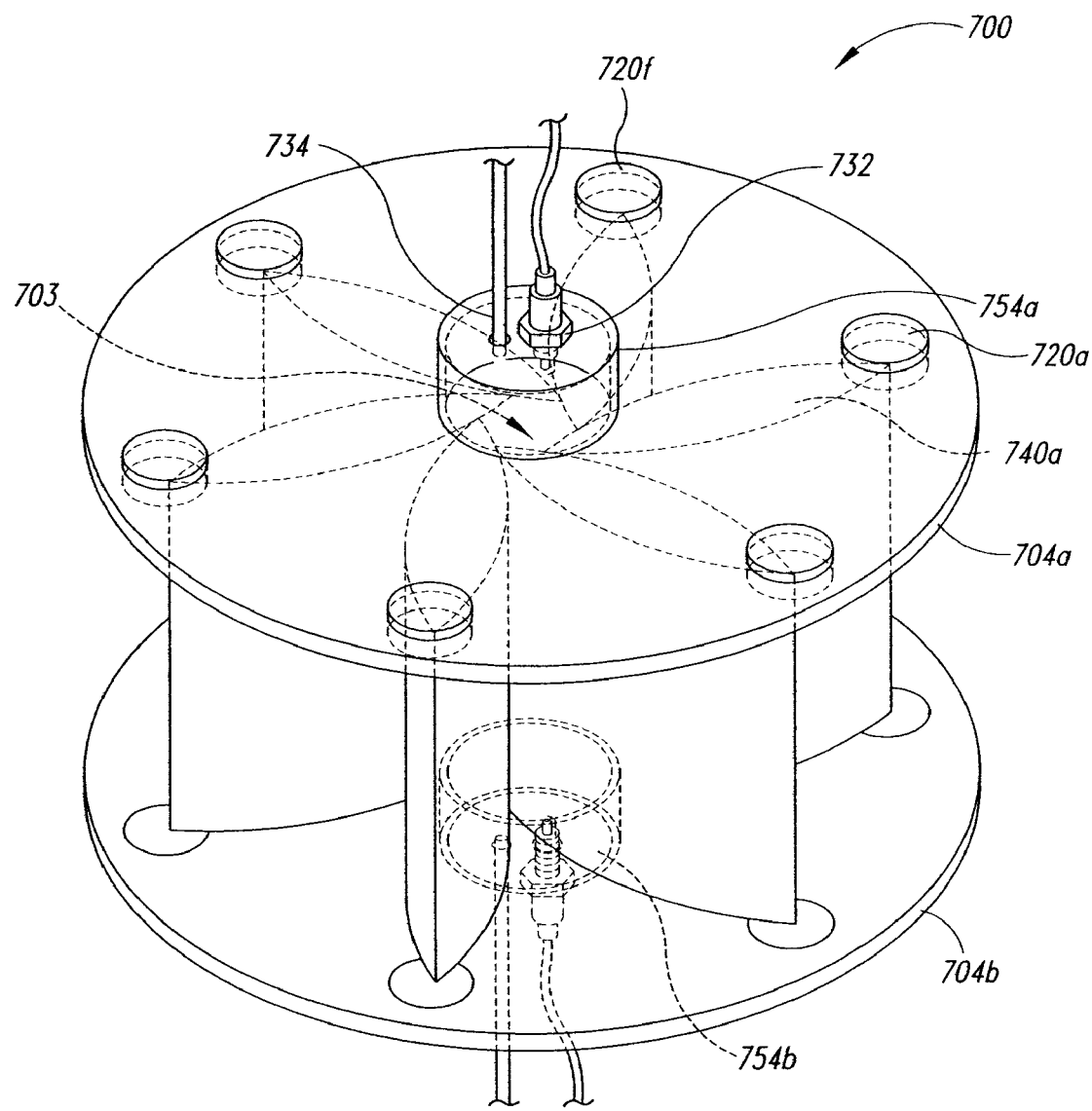
FIG. 7 is an isometric view of a portion of a radial impulse engine configured in accordance with another embodiment of the invention.

FIG. 7 is an isometric view of a portion of a radial impulse engine 700 ("engine 700") configured in accordance with another embodiment of the invention. Many features of the engine 700 are at least generally similar in structure and function to corresponding features of the engine 100 described above with reference to FIGS. 1-4E. For example, the engine 700 includes a plurality of symmetrical chordons 740 (identified individually as chordons 740a-f) and a plurality of corresponding wrist shafts 720 (identified individually as wrist shafts 720a-f). As in the engine 100, the wrist shafts 720 enable the chordons 740 to pivot between a first end plate 704a and a second end plate 704b. As described in greater detail below, however, in this particular embodiment the chordons 740 rotate completely around their respective wrist shafts 720 during engine operation, rather than reciprocating backward and forward. To facilitate this motion, the first end plate 704a includes a first charge receiver 754a and the second end plate 704b includes a second charge receiver 754b. The charge receivers 754 are recessed with respect to a combustion chamber 703, and each carries a fuel injector 734 and a corresponding igniter 732.

Figure 8A:
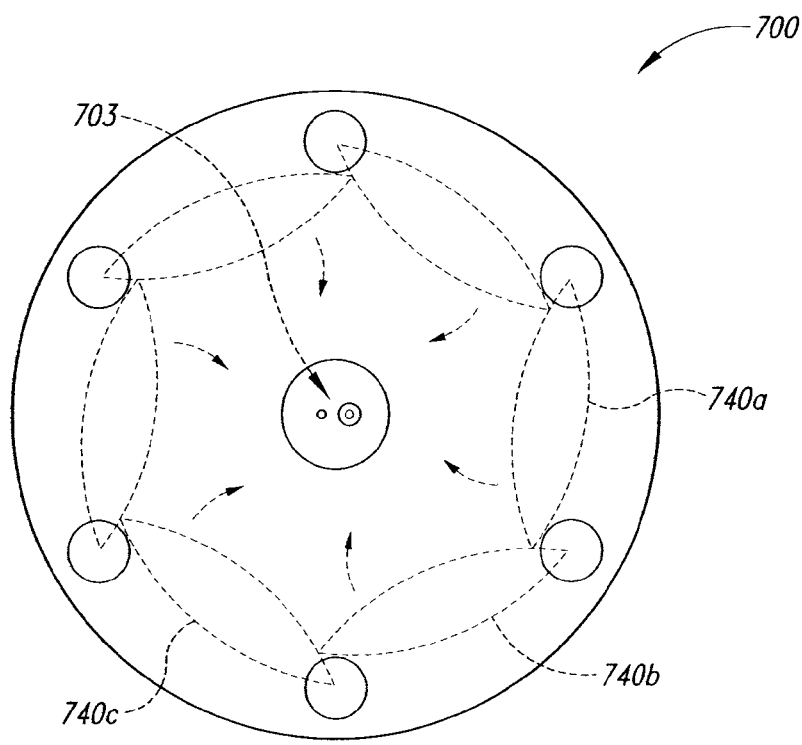
FIGS. 8A-8F are a series of top views illustrating operation of the engine of FIG. 7 in accordance with an embodiment of the invention.
Figure 8B:
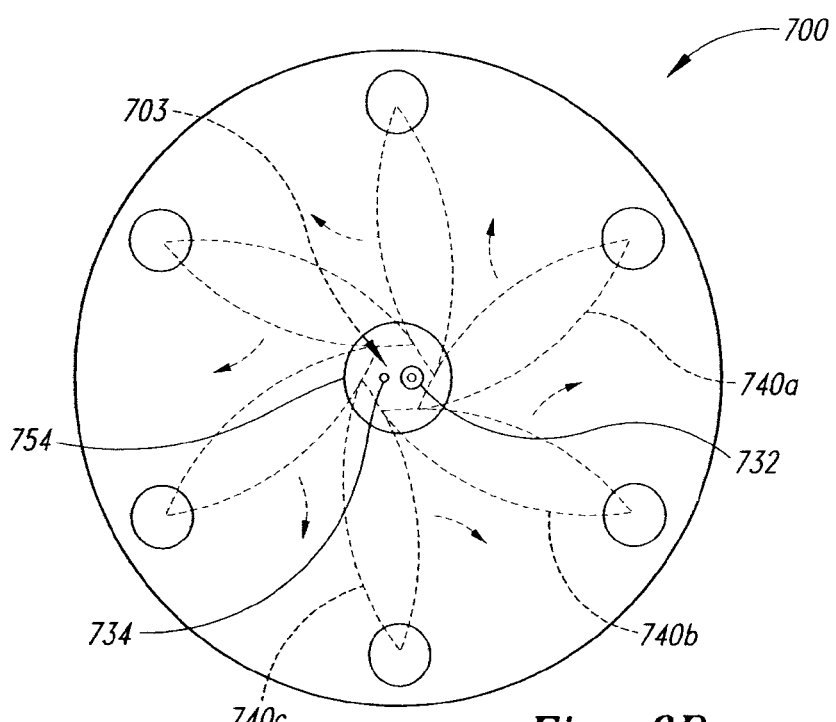

FIGS. 8A-8F are a series of top views illustrating operation of the engine 700 in accordance with an embodiment of the invention. In FIG. 8A, the chordons 740 are moving inwardly and have just begun compressing the air in the combustion chamber 703. As the chordons 740 approach the position shown in FIG. 8B, the air in the combustion chamber 703 and the adjacent charge receivers 754 is highly compressed. As the chordons 740 continue rotating toward the center of the combustion chamber 703, the volume of the combustion chamber 703 approaches the vanishing point, forcing the air into the adjacent charge receivers 754. At or about this time, the fuel injectors 734 spray fuel into the charge receivers 754, and the resulting air/fuel mixture is ignited by the igniters 732.

Figure 8C:
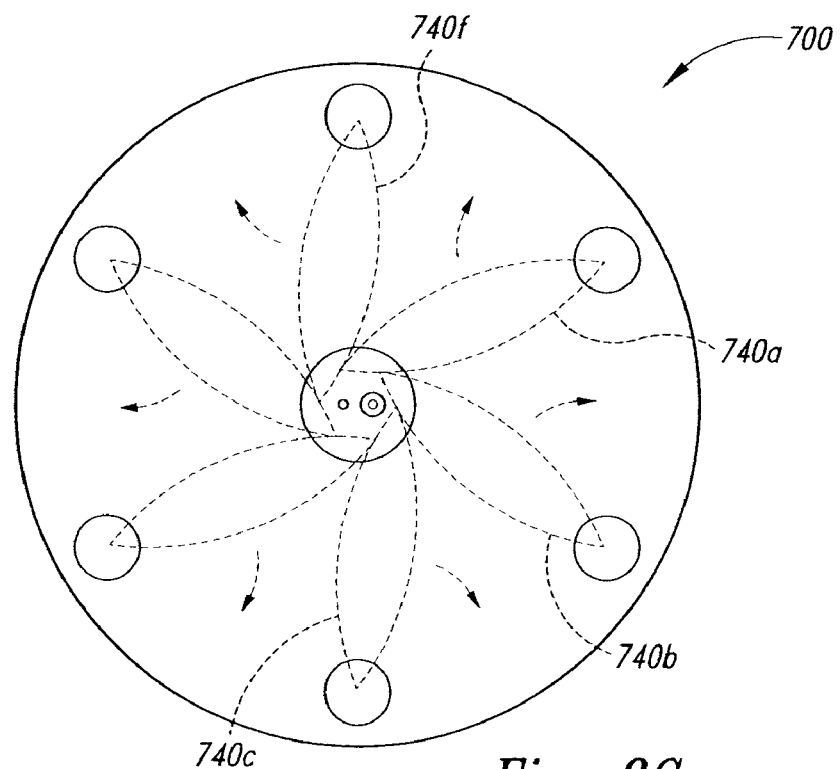
Figure 8D:
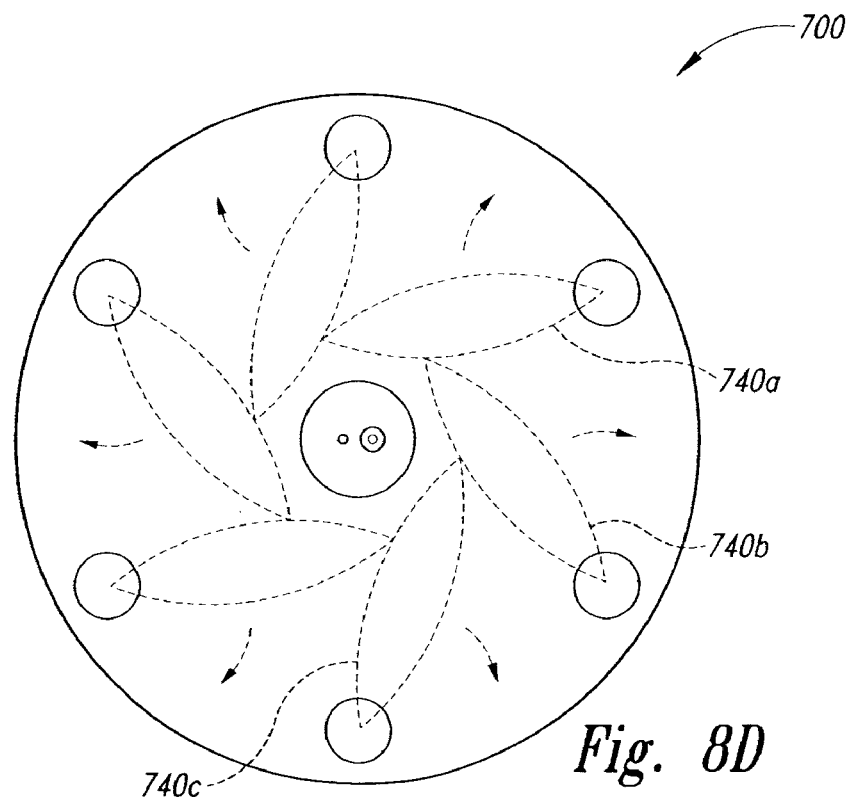
Figure 8E:
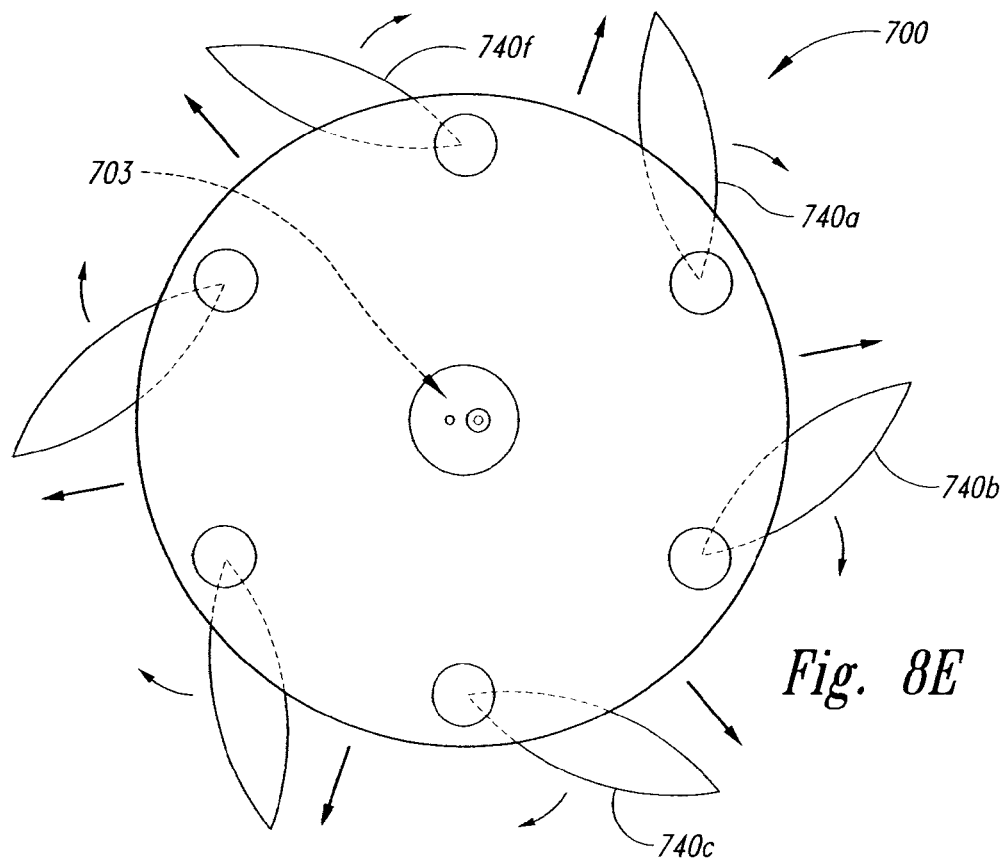
Figure 8F:
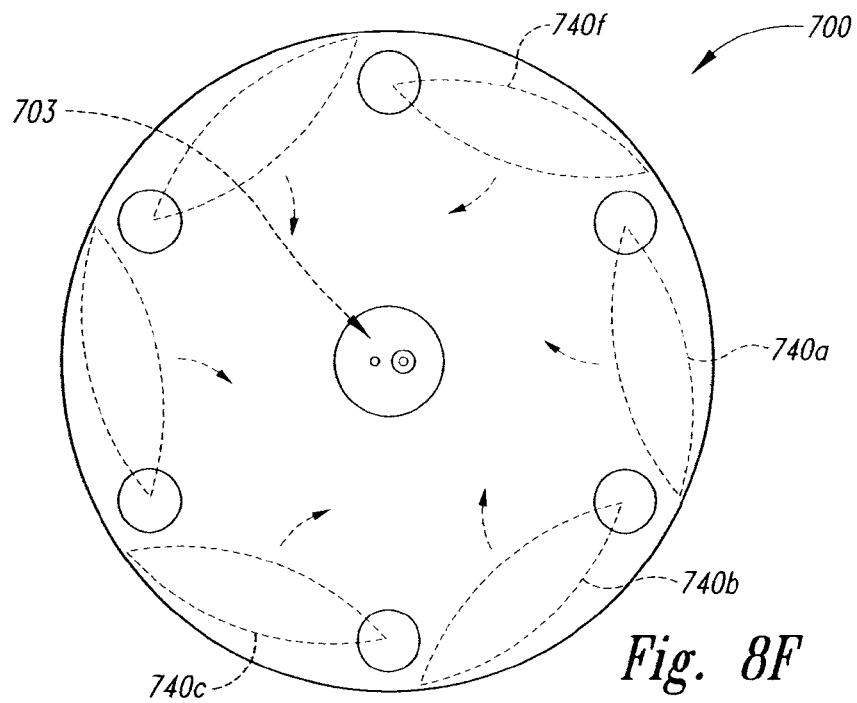

Referring next to FIG. 8C, as the ignited air/fuel mixture begins to expand, it drives the chordons 740 outwardly in the clockwise direction toward the position shown in FIG. 8D. Although not shown in FIGS. 8A-8F, the engine 700 can include a crankshaft or other suitable power-take-out device to harness the power from the chordons 740. As the chordons 740 approach the position shown in FIG. 8E, they let the exhaust gases flow out of the combustion chamber 703. From here, the chordons 740 continue their clockwise rotation, drawing the exhaust gases out of the combustion chamber 703 and circulating new air into the combustion chamber 703. When the chordons 740 reach the position shown in FIG. 8F, the cycle repeats.

FIG. 9 is an isometric view of a radial impulse engine 900 ("engine 900") configured in accordance with another embodiment of the invention. Many features of the engine 900 can be at least generally similar in structure and function to corresponding features of the engine 100 described above with reference to FIGS. 1-4E. In the particular embodiment of FIG. 9, however, the engine 900 includes an enclosure 905 extending between a first end plate 904a and a second end plate 904b. The engine 900 further includes an intake manifold 906 positioned on the first end plate 904a and an exhaust manifold 910 positioned on the second end plate 904b. The intake manifold 906 includes a first inlet 908a opposite a second inlet 908b. The inlets 908 are configured to provide an air/fuel mixture to the engine 900 from an associated carburetor, fuel-injected throttle body, or other fuel delivery device. In other embodiments, the engine 900 can be configured to operate with a fuel injection system similar to one or more of the fuel injection systems described above. The exhaust manifold 910 is configured to direct exhaust gases away from the engine 900 through a first exhaust outlet 912a and a second exhaust outlet 912b. A suitable muffler and/or emission control device can be connected to the exhaust outlets 912 if desired for noise suppression and/or exhaust gas cleansing.

The engine 900 further includes a first ignition wire 916a and a second ignition wire 916b. Each of the ignition wires 916 is operably connected to a corresponding igniter or spark plug (not shown in FIG. 9) carried by one of the end plates 904.

Figure 10:
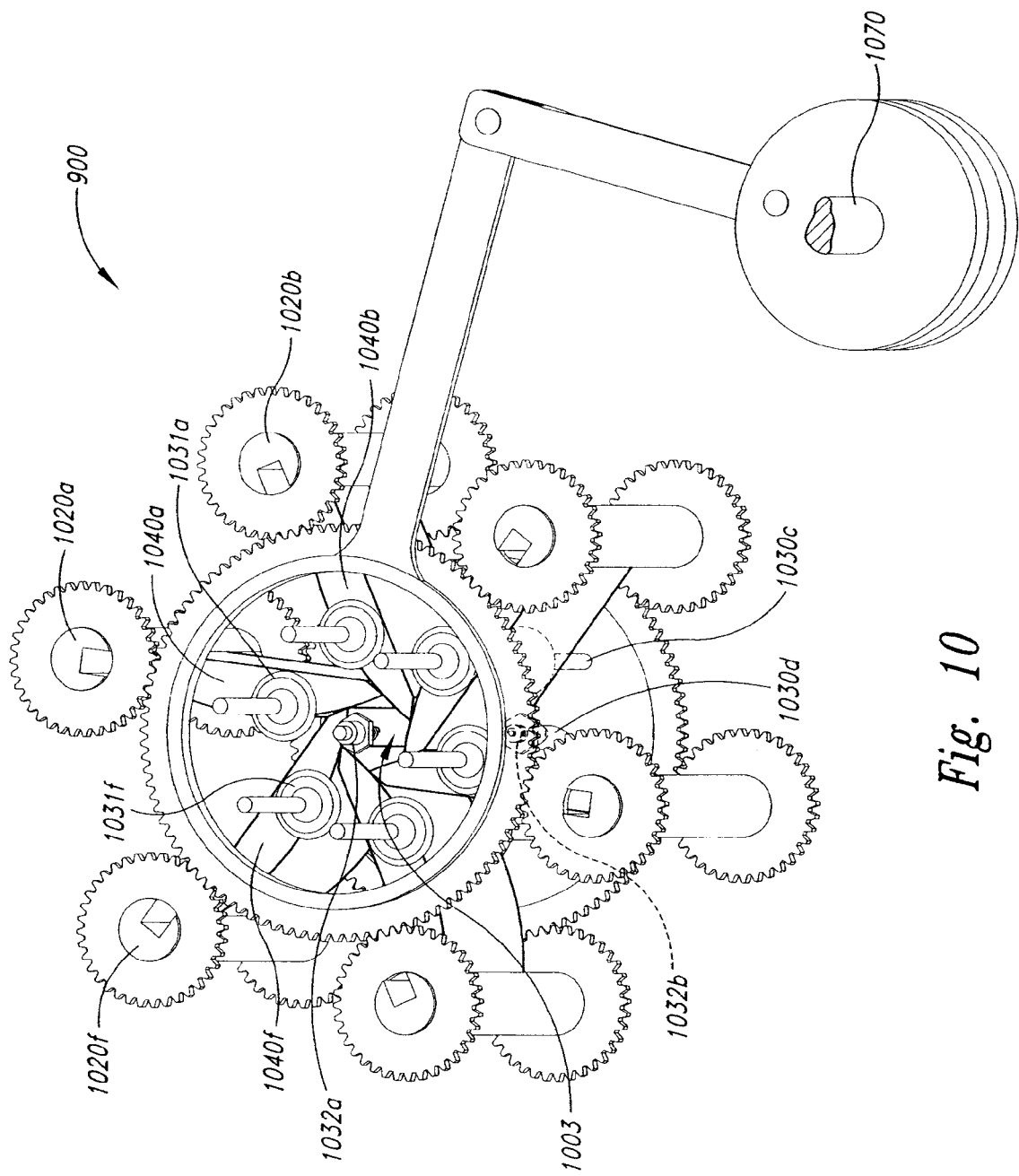
FIG. 10 is an isometric view of the engine of FIG. 9 with a number of components removed for purposes of illustration.

FIG. 10 is an isometric view of the engine 900 with the enclosure 905 and a number of other components removed for purposes of illustration. As mentioned above, many features of the engine 900 are at least generally similar in structure and function to the corresponding features of the engine 100 described above with reference to FIGS. 1-4E. For example, the engine 900 includes a plurality of movable chordons 1040a-f and a plurality of corresponding wrist shafts 1020a-f. The engine 900 also includes a first igniter 1032a positioned at one end of a combustion chamber 1003, and a second igniter 1032b positioned at the other end of the combustion chamber 1003. The chordons 1040 are operably coupled to a crankshaft 1070 for power take out.

Unlike the engine 100, however, the engine 900 lacks a scavenging barrel and the associated one-way valves. Instead, the engine 900 utilizes a plurality of intake valves 1031a-f that are carried by the first end plate 904a (FIG. 9). As described in detail below, the intake valves 1031 are configured to open at the appropriate times during engine operation to admit an air/fuel mixture from the intake manifold 906 (FIG. 9) into the combustion chamber 1003 for subsequent ignition by the igniters 1032. In an alternate embodiment, the engine 900 can include one or more fuel injectors positioned proximate to the igniters 1032 for direct fuel injection. With direct fuel injection, the intake valves 1031 can be used to introduce air into the combustion chamber 1003 rather than an air/fuel mixture.

The engine 900 further includes a plurality of exhaust valves 1030g-l that are carried by the second end plate 904b (FIG. 9). As described in detail below, the exhaust valves 1030 are configured to open at the appropriate times during engine operation to allow the exhaust gases to flow out of the combustion chamber 1003 through the exhaust manifold 910 (FIG. 9).

Figure 11A:
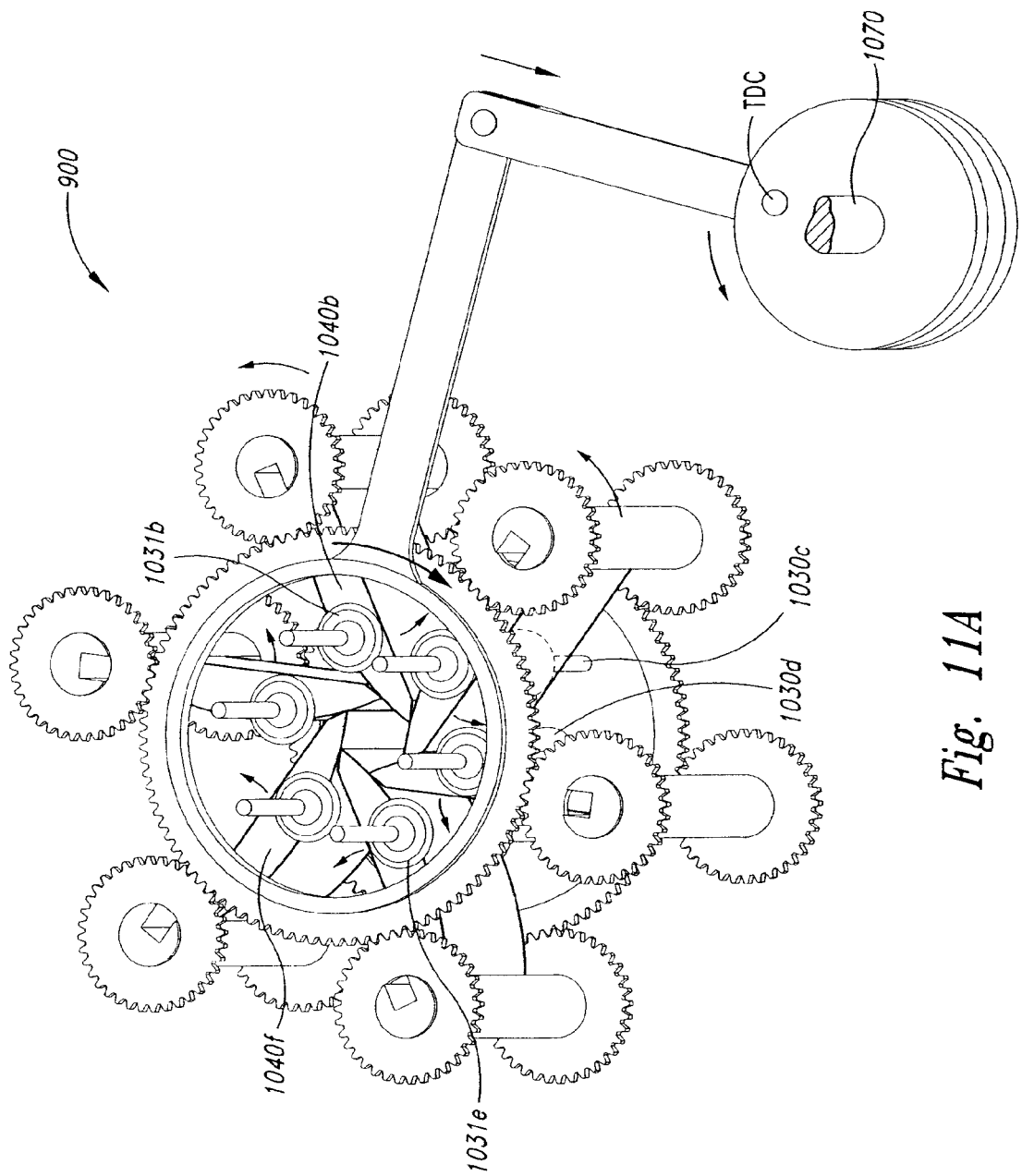
Figure 11B:
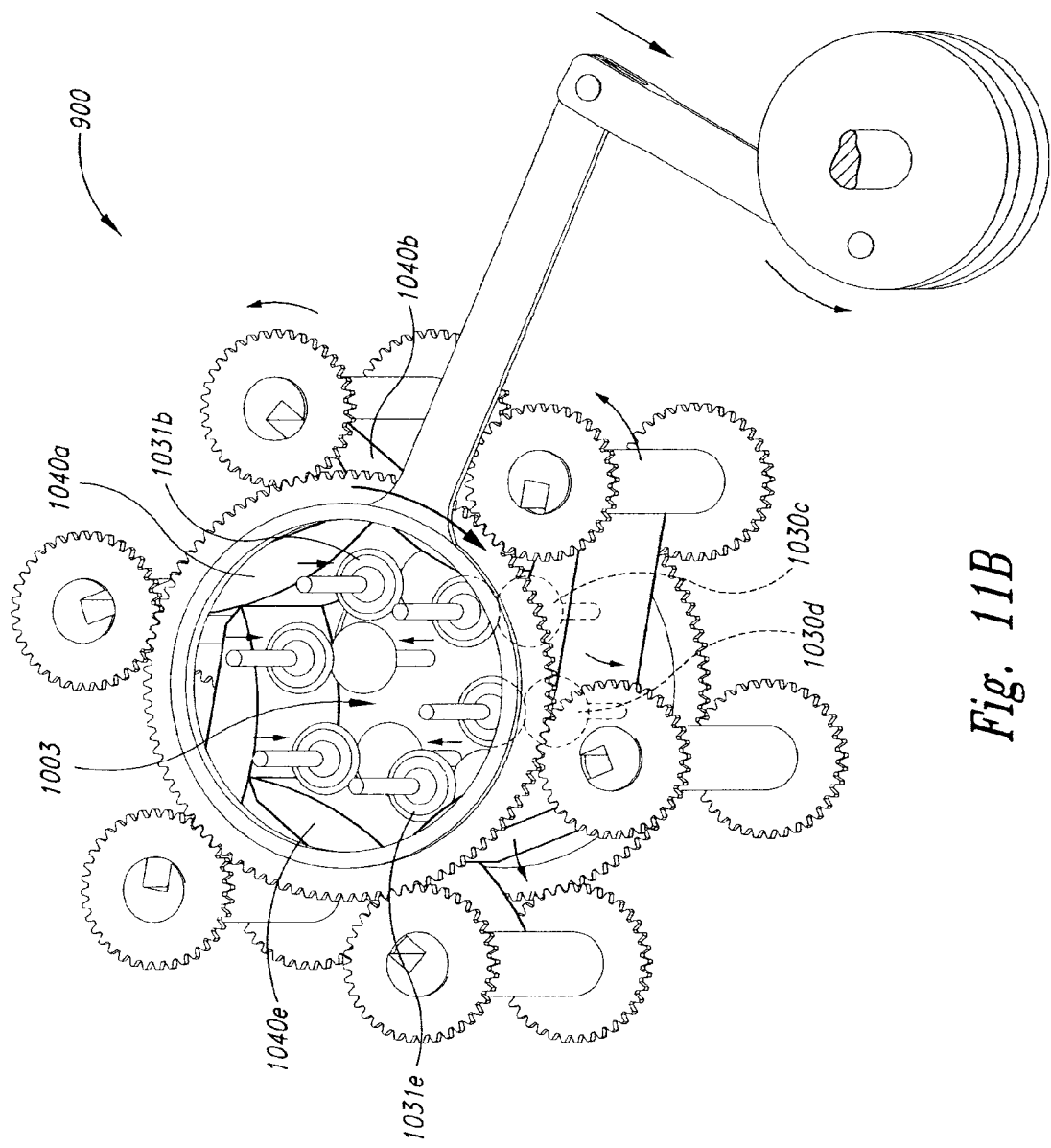
Figure 11C:
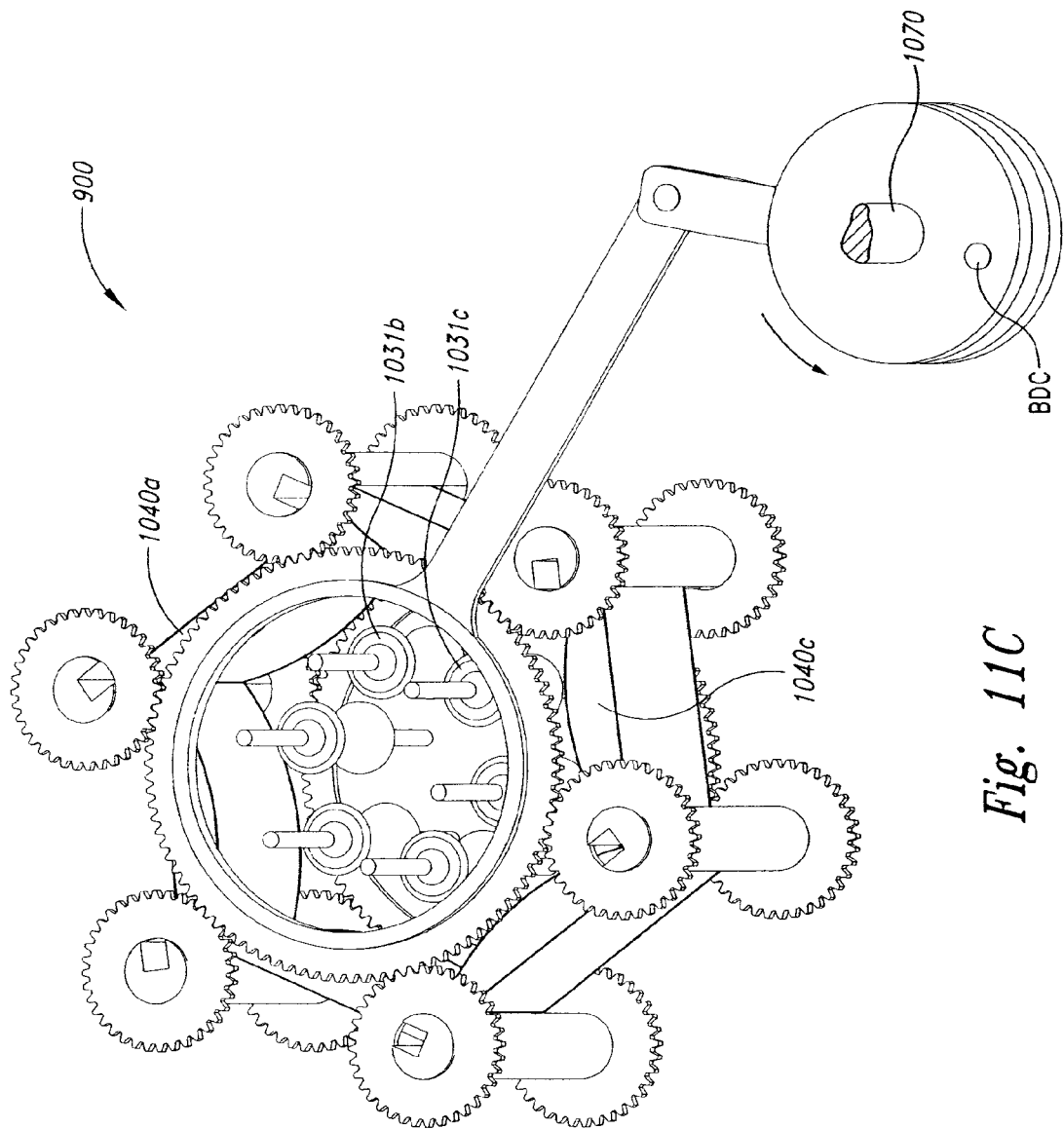

FIGS. 11A-11H are a series of isometric views illustrating operation of the engine 900 in a four-stroke mode in accordance with an embodiment of the invention. In this embodiment, the cycle begins with the chordons 1040 in a top dead center position at the end of an exhaust stroke, as illustrated in FIG. 11A. When the chordons 1040 are in this position, both the intake valves 1031 and the exhaust valves 1030 are fully closed. From here, the rotational momentum of the crankshaft 1070 causes the chordons 1040 to move outwardly toward the position shown in FIG. 11B. As the chordons 1040 approach this position, the intake valves 1031 begin to open, allowing an air/fuel mixture to be drawn into the combustion chamber 1003 from the intake manifold 906 (FIG. 9). When the chordons 1040 reach the bottom dead center position illustrated in FIG. 11C, the intake valves 1031 are fully open to maximize intake flow. At this position, the rotation of the crankshaft 1070 causes the chordons 1040 to stop and reverse direction.

Figure 11D:
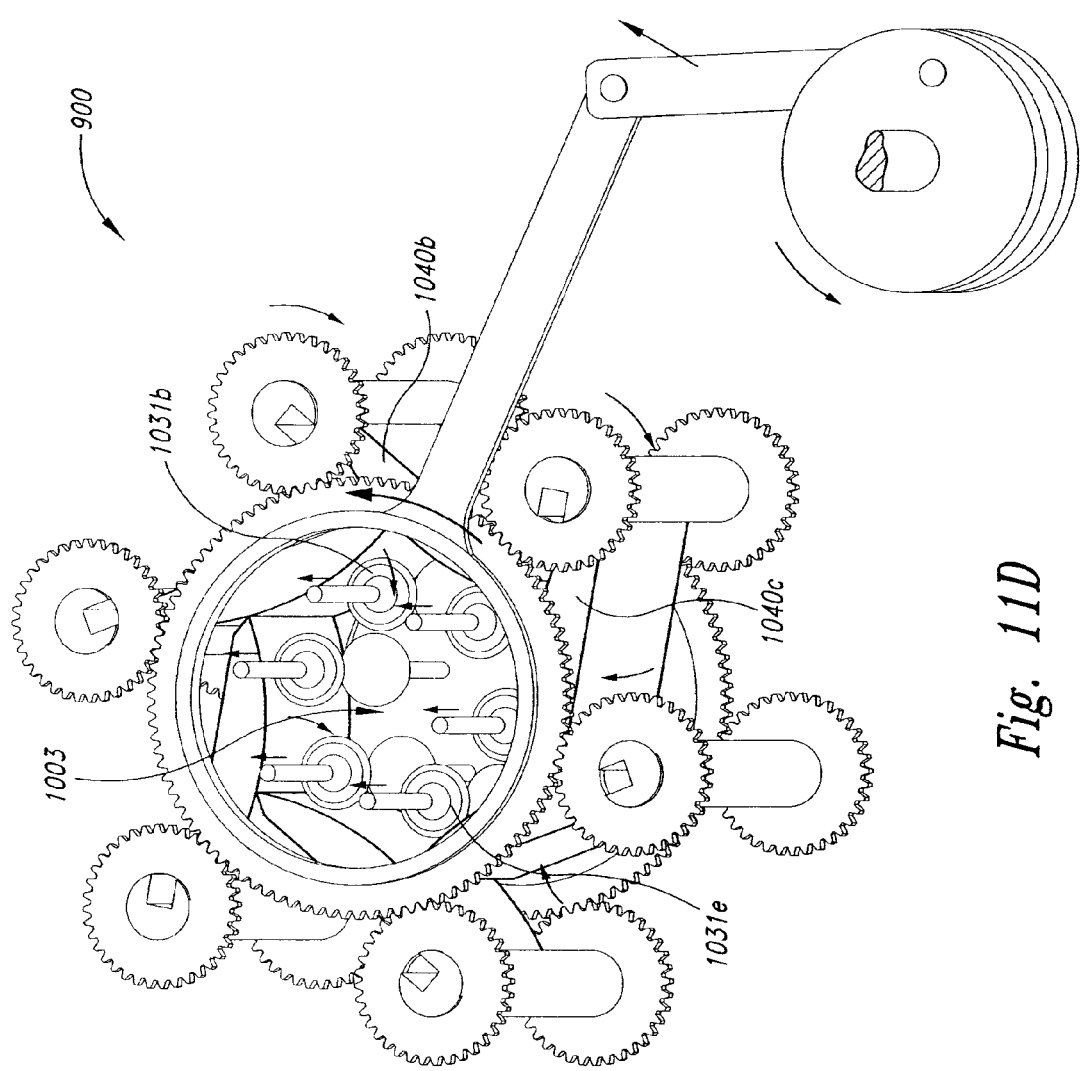
Figure 11E:
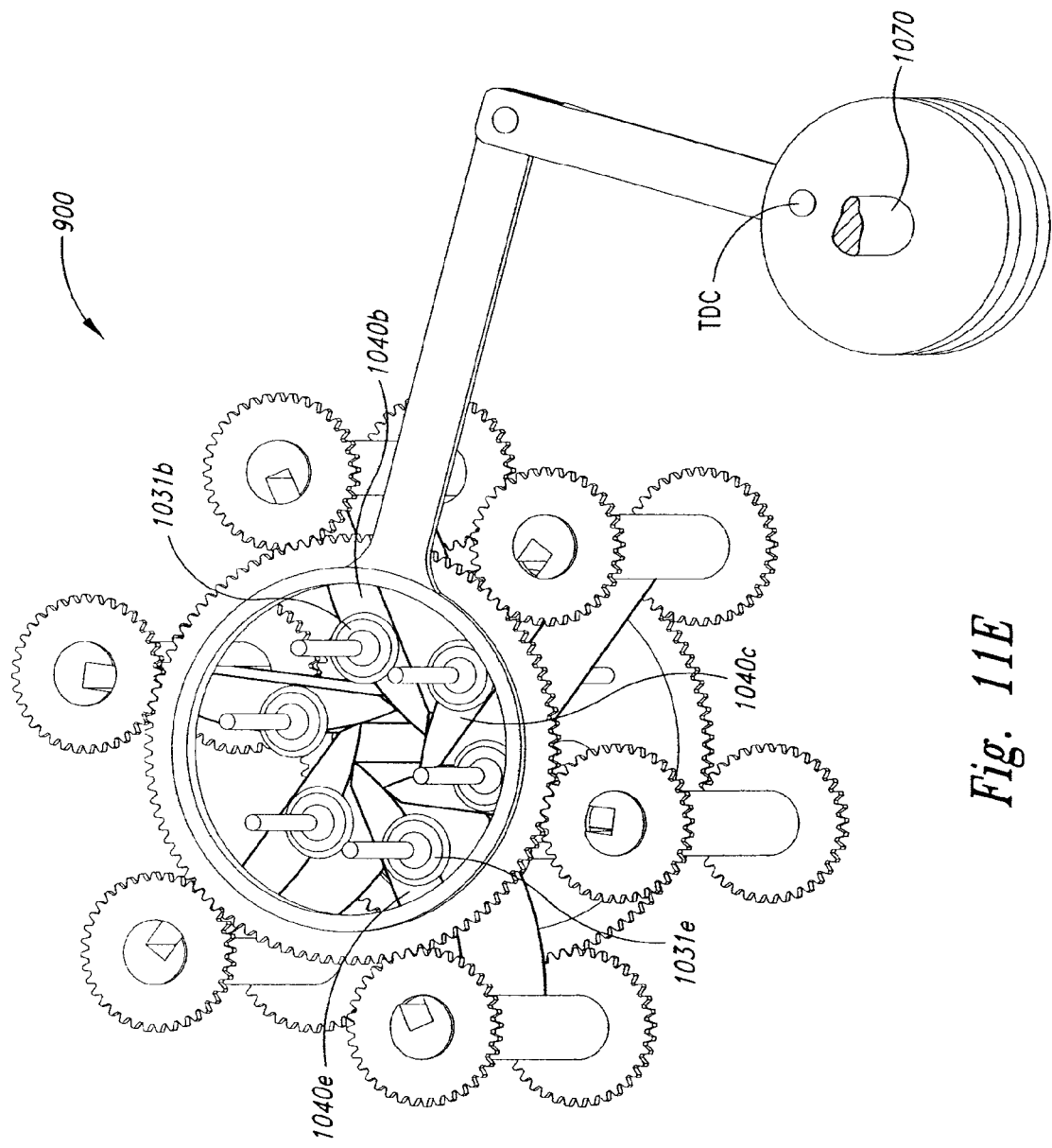
Figure 11F:
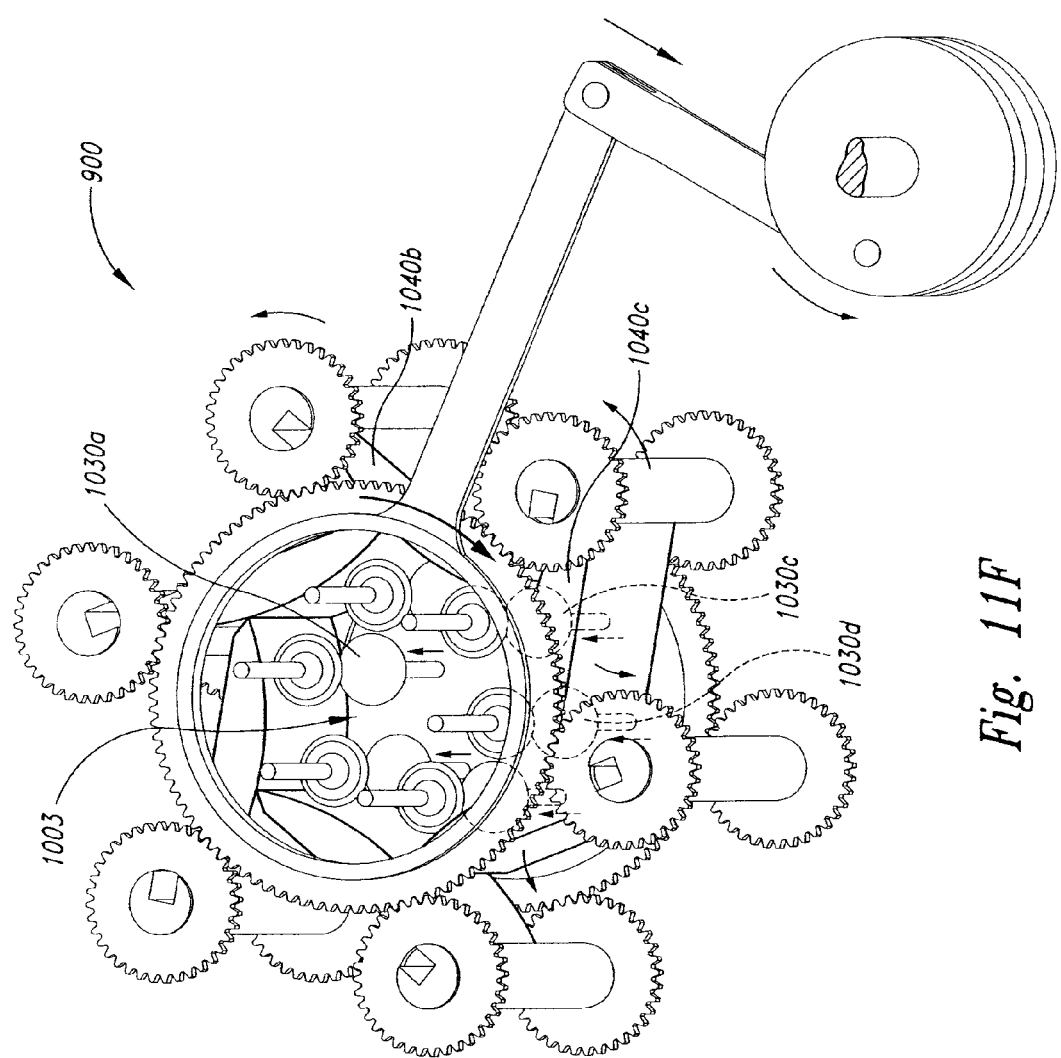
Figure 11G:
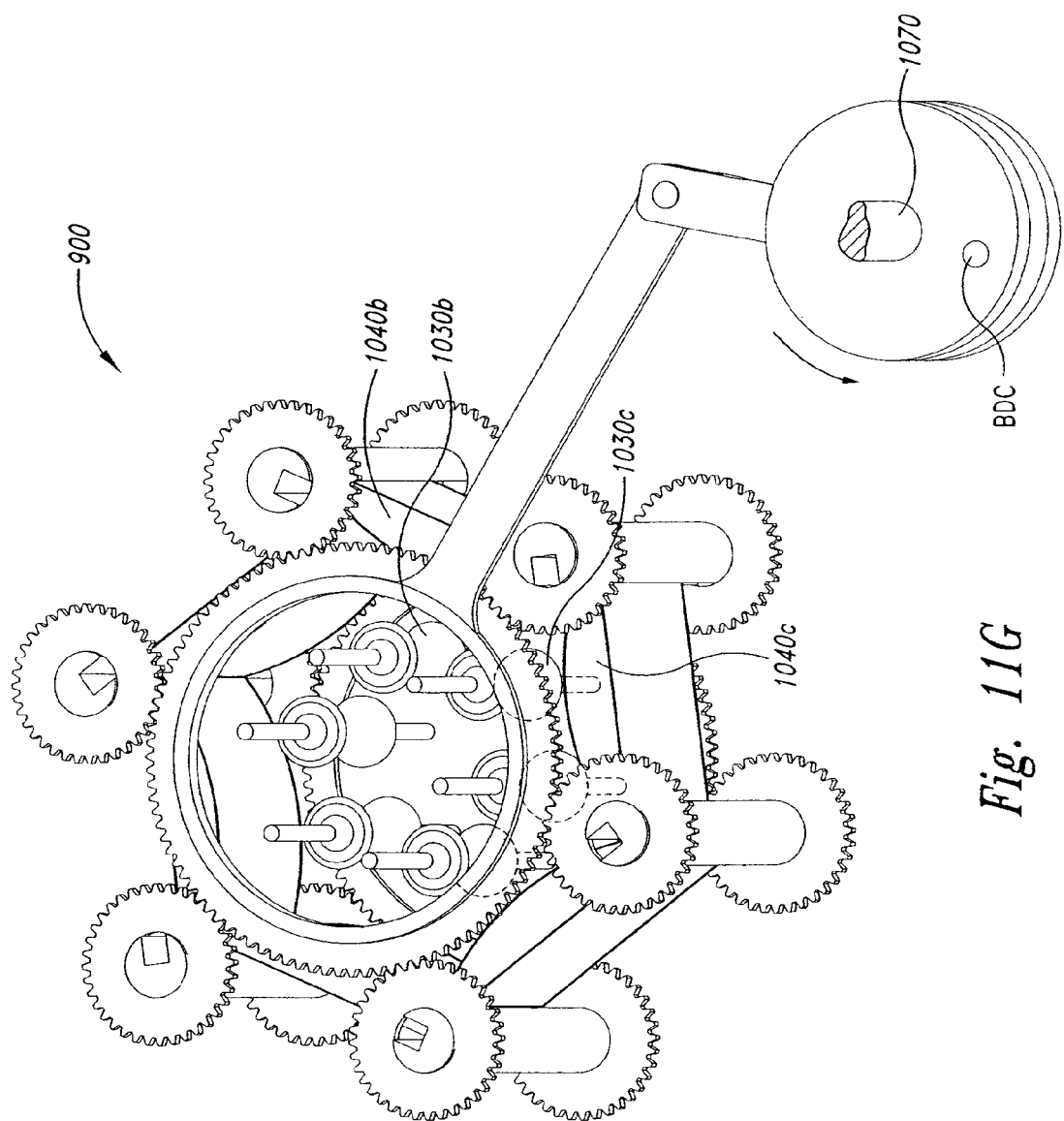

As the chordons 1040 move inwardly toward the position shown in FIG. 11D, the intake valves 1031 close to avoid chordon contact. As the chordons 1040 continue moving inwardly, they compress the intake charge in the combustion chamber 1003. When the chordons 1040 reach the top dead center position shown in FIG. 11E, the igniters 1032 (FIG. 10) ignite the intake charge. The resulting combustion pressure drives the chordons 1040 outwardly, transmitting power to the crankshaft 1070. When the chordons 1040 reach the position illustrated in FIG. 11F, the exhaust valves 1030 start to open, allowing the exhaust gases to flow out of the combustion chamber 1003 through the exhaust manifold 910 (FIG. 9). When the chordons 1040 reach the bottom dead center position shown in FIG. 11G, the exhaust valves 1030 are fully open to maximize exhaust outflow. At this position, the rotation of the crankshaft 1070 causes the chordons 1040 to stop and reverse direction.

As the chordons 1040 move inwardly toward the position shown in FIG. 11H, they drive the exhaust gases out of the combustion chamber 1003 past the open exhaust valves 1030. The exhaust valves 1030 are closing at this time, however, so that they will be fully closed just before the chordons 1040 reach them to avoid any detrimental contact. When the chordons 1040 reach the top dead center position of FIG. 11A, the cycle described above repeats.

Although the engine 900 utilizes multiple intake and exhaust valves, in other embodiments, other engines at least generally similar in structure and function to the engine 900 can utilize a single intake valve on one end plate and a single exhaust valve on the opposing end plate. In further embodiments, other similar engines can utilize comingled exhaust and intake valves on one or both end plates. In yet other embodiments, a four-stroke engine similar to the engine 900 described above can operate with unidirectional rotation of the chordons 1040 about their respective wrist shafts 1020. In such embodiments, chordon motion can be at least generally similar to the chordon motion described above with reference to FIGS. 8A-8F.

One feature of the radial impulse engines described above with reference to FIGS. 1-11H is that the combustion chamber has a higher Reactive Surface Ratio (RSR) than comparable internal combustion engines with reciprocating pistons. This is because the combustion chamber of the present invention expands exponentially, with the ignited fuel charge doing work against each of the individual chordons during their outward stroke. In contrast, the combustion chamber of a conventional reciprocating piston engine expands only linearly, with the ignited fuel charge only doing work against the top surface of the piston and not the fixed cylinder walls. One advantage of the high RSR of the present invention is that it increases the amount of shaft work extracted from the fuel as a result of the combustion process. In this regard, it is expected that radial impulse engines configured in accordance with embodiments of the invention can achieve thermal efficiencies of about 0.50 or more, which corresponds to a 100% increase over conventional internal combustion engines.

Another feature of the radial impulse engines described above is that outward chordon motion "hyper-expands" the exhaust gases during the power stroke. This hyper-expansion has the advantage of significantly reducing exhaust gas temperatures. As a result, the engine runs significantly cooler, leading to less wear and tear on the internal engine parts over time. In addition, the lower operating temperatures allow the use of a smaller capacity cooling system than conventional internal combustion engines. One advantage of the smaller cooling system is that it draws less power from the engine during operation than a comparable cooling system for a conventional engine.

Yet another feature of the radial impulse engines described above is that they have fewer parts than conventional internal combustion engines of comparable capacity and output. As a result, the radial impulse engines of the present invention can be made smaller and lighter and generally more compact than conventional engines. This feature enables cars and other vehicles that use the engines of the present invention to be made smaller and lighter than their conventional counterparts and to have correspondingly better fuel efficiency. The reduction in moving parts also results in a reduction in overall operating friction, which again leads to increased fuel efficiency.

II. Chordon Features

Figure 12:
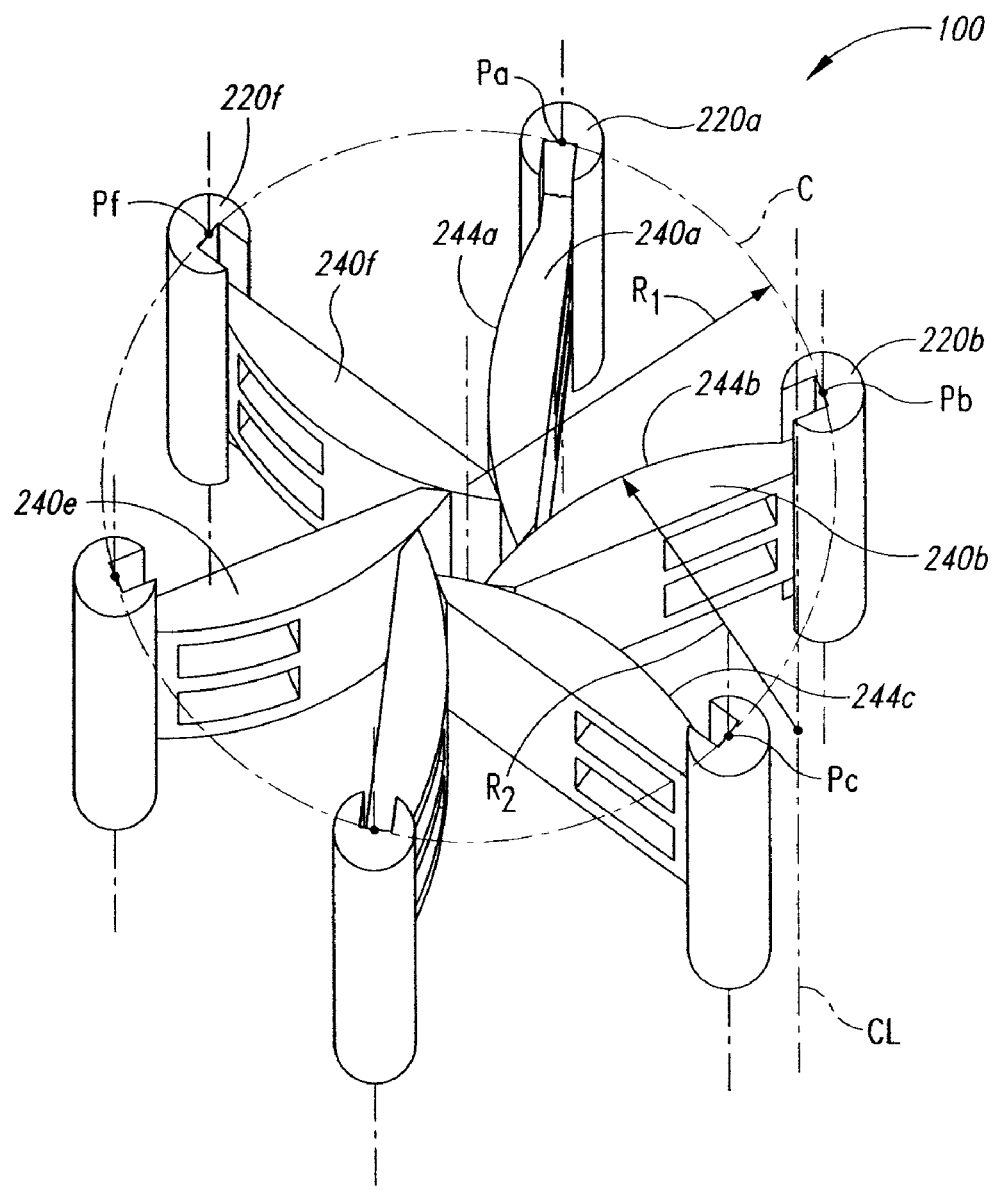
FIG. 12 is an isometric view illustrating various aspects of the chordons and wrist shafts of the engine of FIGS. 1-4E.

FIG. 12 is an isometric view illustrating various aspects of the chordons 240 and the wrist shafts 220 from the engine 100 described above with reference to FIGS. 1-4E. In one aspect of this embodiment, the wrist shafts 220 have pivot axes $P_a$-$P_f$ that define a circle C. The circle C has a first radius of curvature $R_1$. In another aspect of this embodiment, each of the chordon faces 244 has a second radius of curvature $R_2$ relative to a centerline axis CL. The centerline axis CL is parallel to the wrist shaft pivot axes $P_a$-$P_f$. In this particular embodiment, the second radius of curvature $R_2$ is equivalent to, or at least approximately equivalent to, to the first radius of curvature $R_1$.

For radial impulse engines having six chordons, making the radius of curvature of the chordon face 244 at least approximately equivalent to the radius of curvature of the circle passing through the wrist shaft pivot axes $P_a$-$P_f$ has been shown to facilitate continuous chordon-to-chordon sliding contact during chordon reciprocation without detrimental binding. As described in greater detail below, however, in other embodiments radial impulse engines configured in accordance with various aspects of the invention can include more or fewer chordons having other configurations.

FIG. 13 is an enlarged isometric view of one of the chordon/wrist shaft subassemblies from the engine 100 described above with reference to FIGS. 1-4E. In one aspect of this embodiment, the chordon 240 can include one or more coolant passages 1346 that circulate coolant through the chordon 240 during engine operation. In the illustrated embodiment, the coolant passages 1346 receive coolant from an inlet 1348a positioned toward one end of the wrist shaft 220, and discharge the heated coolant through an outlet 1348b positioned toward the opposite end of the wrist shaft 220.

In another aspect of this embodiment, the chordon 240 can further include a first pressure control seal 1356a extending along a first end edge portion 1351a, a second pressure control seal 1356b extending along a second end edge portion 1351b, and a third pressure control seal 1356c extending along the distal edge portion 242. The pressure control seals 1356 reduce pressure leaks between the chordon 240 and adjacent surfaces during operation of the engine 100. For example, the first pressure control seal 1356a seals the gap between the chordon 240 and the first end plate 104a (not shown), and the second pressure control seal 1356b seals the gap between the chordon 240 and the second end plate 104b (also not shown). The third pressure control seal 1356c seals the gap between the chordon 240 and the adjacent chordon face during engine operation.

In addition to the pressure control seals 1356, the chordon 240 can also include a first oil control seal 1354a extending along a first end surface 1353a, and a second oil control seal 1354b extending across a second end surface 1353b. Both of the oil control seals 1354, as well as the third pressure control seal 1356c, can be configured to receive lubrication from an oil galley 1350 passing through the chordon 240. In the illustrated embodiment, the oil galley 1350 receives oil from an inlet 1352a positioned toward one end of the wrist shaft 220, and discharges the oil through an outlet 1352b positioned toward the opposite end of the wrist shaft 220. During engine operation, the oil control seals 1354 and the third pressure control seal 1356c can provide lubrication between the chordon 240 and the adjacent surfaces to reduce friction and minimize engine wear.

FIG. 14A is an enlarged front view of a portion of the chordon 240 of FIG. 13. FIGS. 14B and 14C are enlarged cross-sectional views taken along lines 14B-14B and 14C-14C, respectively, in FIG. 14A. Referring to FIGS. 14A-C together, in one aspect of this embodiment, each of the pressure control seals 1356 and each of the oil control seals 1354 can be made from flat pieces of metal or other suitable material. When installed in corresponding seal grooves 1358 (identified individually as seal grooves 1358a-c), the first pressure control seal 1356a takes the shape of a conic section, while the first oil control seal 1354a and the third pressure control seal 1356c remain flat.

In another aspect of this embodiment, a plurality of springs 1362a-c (e.g., metallic springs) can be disposed in the grooves 1358a-c, respectively, to press the corresponding seals 1354/1356 outwardly against adjacent surfaces and maintain an adequate seal during engine operation. Alternatively, in another embodiment, each of the seals 1354/1356 can be pressurized by combustion chamber gases flowing through back-ports (not shown) in the chordon 240.

The various chordon features described above represent only a few of the different approaches that can be used to solve the inherent internal combustion engine problems of cooling, lubrication, and combustion-chamber sealing. Accordingly, in other embodiments, other approaches can be used to solve these problems. In one such embodiment, for example, the lubricating medium can provide chordon cooling, thereby dispensing with the need for a separate cooling system. In another embodiment, nonmetallic O-ring type seals, such as Teflon® seals, can be used for chordon sealing.

FIG. 15 is a rear isometric view of a chordon 1540 configured in accordance with another embodiment of the invention. Many features of the chordon 1540 can be at least generally similar in structure and function to corresponding features of the chordon 240 described above with reference to FIGS. 13-14C. For example, the chordon 1540 includes a curved face 1544 that is swept by an adjacent chordon during engine operation. In one aspect of this particular embodiment, however, the chordon 1540 further includes a plurality of cooling fins 1548 on a backside or unswept surface 1545. The cooling fins 1548 increase the surface area of the unswept surface 1545 to improve the heat transfer between the chordon 1540 and the cool intake charge during engine operation. Cooling the chordon 1540 in the foregoing manner can minimize heat input to the chordon cooling system, thereby increasing overall engine efficiency.

Figure 16:
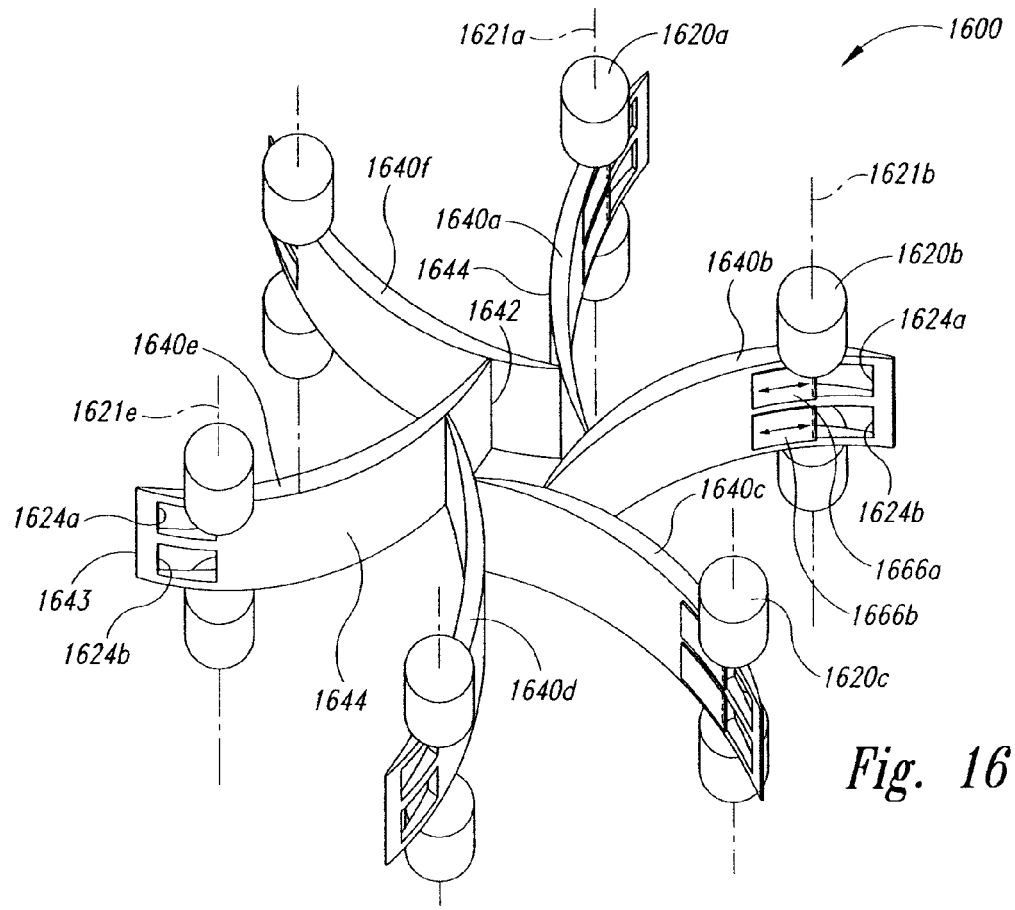
FIG. 16 is an isometric view of a portion of a radial impulse engine configured in accordance with a further embodiment of the invention.

FIG. 16 is an isometric view of a portion of a radial impulse engine 1600 ("engine 1600") configured in accordance with a further embodiment of the invention. The engine 1600 includes a plurality of chordons 1640a-f fixedly attached to corresponding wrist shafts 1620a-f. The chordons 1640 and the wrist shafts 1620 are at least generally similar in structure and function to their counterparts described above. The chordons 1640 differ in one particular aspect, however, in that they each include a curved face 1644 that extends from a distal edge portion 1642 to a proximal edge portion 1643 positioned beyond a pivot axis 1621 of the corresponding wrist shaft 1620.

In another aspect of this embodiment, the chordons 1640 can also include "sub-axial" transfer ports 1624a-b that extend through the chordon 1640 outboard of the pivot axis 1621 of the corresponding wrist shaft 1620. As illustrated in FIG. 16, in selected embodiments, movable shutter valves 1666 (identified individually as a first shutter valve 1666a and a second shutter valve 1666b) can be used to adjust the size and/or opening point of the transfer ports 1624 during engine operation. Varying the port size and/or timing in this manner can be used to alter engine performance characteristics as desired.

Figure 17:
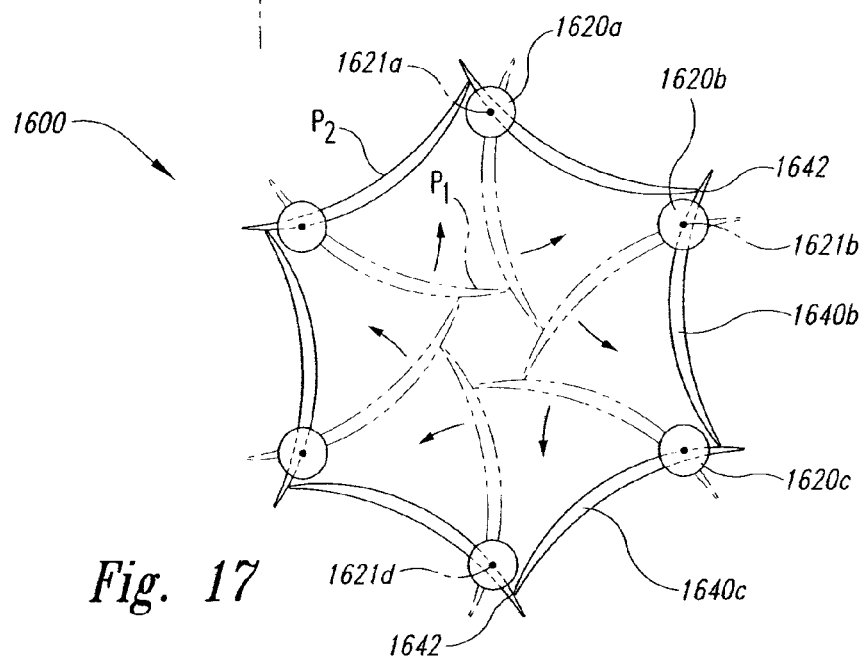
FIG. 17 is a top view of the engine of FIG. 16 illustrating the extended stroke of the associated chordons.

FIG. 17 is a top view of the engine 1600 illustrating the extended stroke of the chordons 1640. As this view shows, each of the chordons 1640 includes a distal edge portion 1642 that sweeps beyond the pivot axis 1621 of the adjacent wrist shaft 1620 as the chordons 1640 pivot outwardly from a top dead center position $P_1$ to a bottom dead center position $P_2$. Extending the chordon stroke in the foregoing manner results in greater wrist shaft rotation and smoother power delivery.

Although the embodiments of the invention described above utilize "one-piece" chordons, in other embodiments (such as the embodiments described below), other radial impulse engines configured in accordance with the present invention can utilize multi-piece hinged and/or telescoping chordons.

Figure 18A:
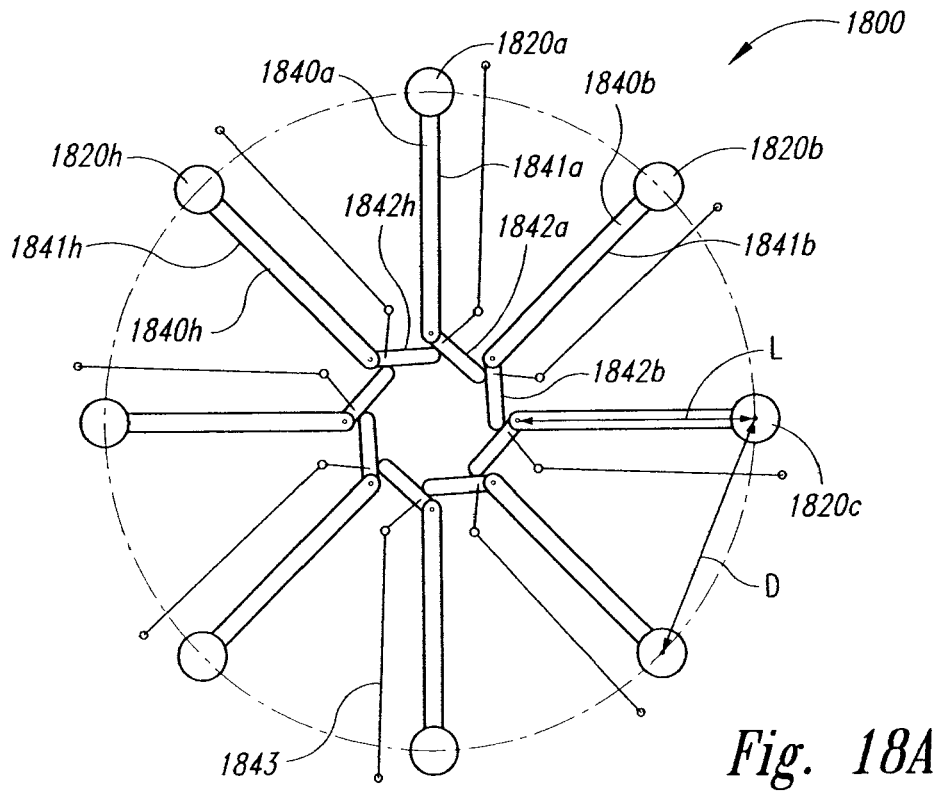
FIGS. 18A and 18B are top views of a portion of a radial impulse engine having a plurality of hinged chordons configured in accordance with an embodiment of the invention.
Figure 18B:
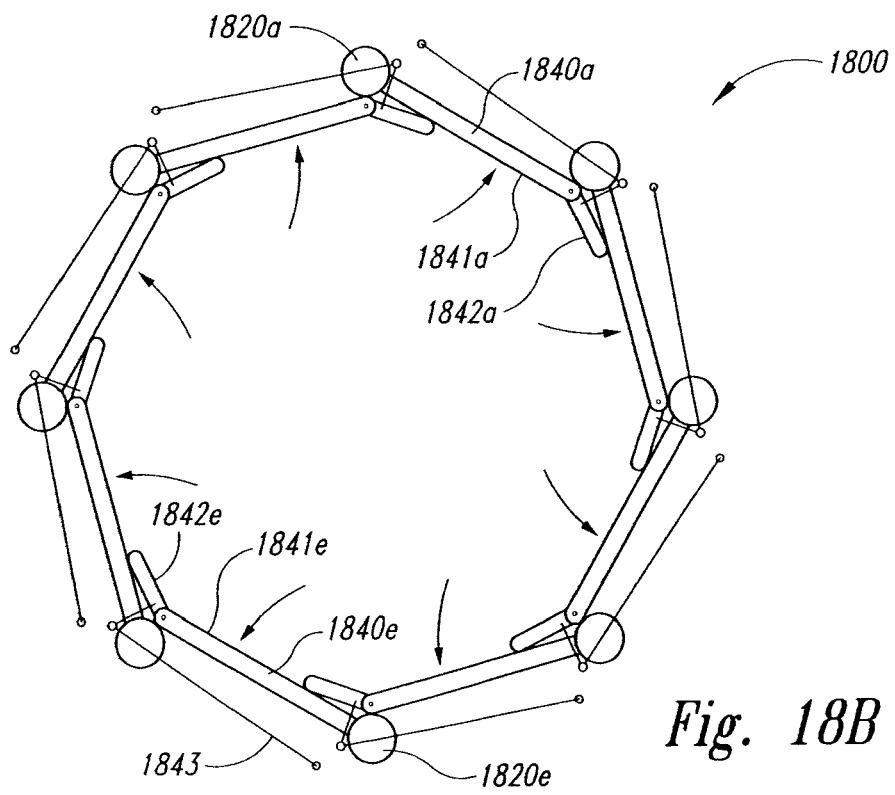

FIGS. 18A and 18B are top views of a portion of a radial impulse engine 1800 ("engine 1800") having a plurality of hinged chordons 1840a-h configured in accordance with an embodiment of the invention. Referring first to FIG. 18A, in this embodiment each of the chordons 1840 can include a body portion 1841 (identified individually as body portions 1841a-h) fixedly attached to a corresponding wrist shaft 1820 (identified individually as wrist shafts 1820a-h), and a hinged extension 1842 (identified individually as hinged extensions 1842a-h) pivotally attached to the body portions 1841. A control link 1843 can be operably coupled to each of the hinged extensions 1842 to control movement of the hinged extensions 1842 as the chordons 1840 pivot outwardly from the top dead center position illustrated in FIG. 18A to the bottom dead center position illustrated in FIG. 18B.

In one aspect of this embodiment, the engine 1800 includes eight chordons 1840, and each of the body portions 1841 has a length L that is at least approximately equivalent to a chord distance D between adjacent wrist shaft pivot axes. In other embodiments, however, other radial impulse engines can have more or fewer hinged chordons, and each of the chordons can have corresponding body portions with lengths that are greater or less than the chord length between adjacent wrist shaft pivot axes. In such embodiments, however, it may be necessary to utilize multiple hinged chordon sections to facilitate serpentine-like coiling of the chordons during their stroke to maintain adequate sealing without detrimental binding.

Figure 19A:
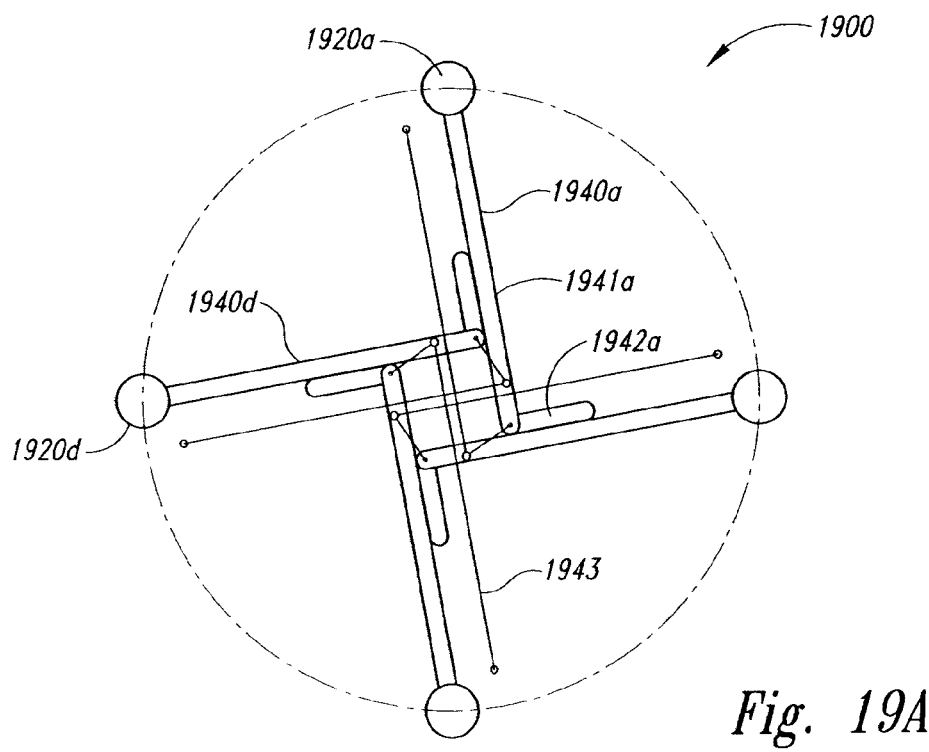
FIGS. 19A and 19B are top views of a portion of a radial impulse engine having a plurality of hinged chordons configured in accordance with another embodiment of the invention.
Figure 19B:
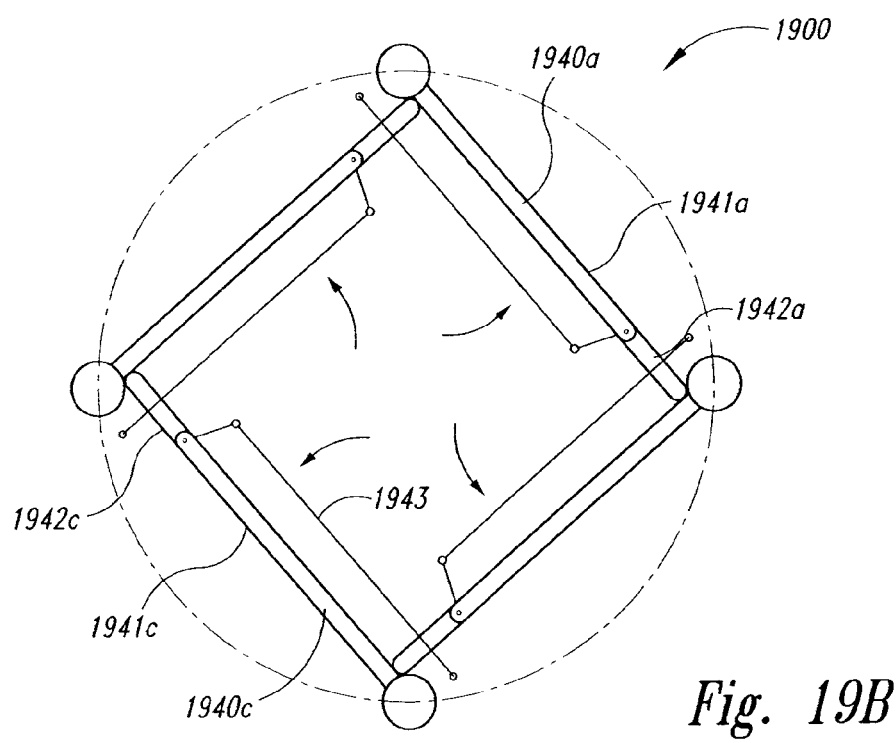

FIGS. 19A and 19B are top views of a portion of a radial impulse engine 1900 ("engine 1900") having a plurality of hinged chordons 1940a-d configured in accordance with another embodiment of the invention. In this embodiment, each of the chordons 1940 includes a body portion 1941 and a corresponding hinged extension 1942. A drag link 1943 can be operably coupled to each of the hinged extensions 1942 to control movement of the hinged extensions 1942 as the chordons 1940 pivot outwardly from the top dead center position illustrated in FIG. 19A to the bottom dead center position illustrated in FIG. 19B.

FIGS. 20A and 20B are cross-sectional end views of a telescoping chordon 2040 configured in accordance with an embodiment of the invention. FIG. 20A shows the chordon 2040 in a retracted position (e.g., a bottom dead center position), and FIG. 20B shows the chordon 2040 in an extended position (e.g., a top dead center position). Referring to FIGS. 20A and 20B together, the chordon 2040 can include a body portion 2047 that slides back and forth on a base portion 2049. A control link 2043, having a fixed pivot point 2045, controls the position of the body portion 2047 relative to the base portion 2049 as the chordon 2040 pivots about a wrist shaft 2020. Specifically, when the chordon 2040 pivots in a counterclockwise direction, the control link 2043 causes the body portion 2047 to move away from the wrist shaft 2020, thereby increasing the length of the chordon 2040. Conversely, when the chordon 2040 pivots in a clockwise direction, the control link 2043 causes the body portion 2047 to move toward the wrist shaft 2020, thereby decreasing the length of the chordon 2040. Those of ordinary skill in the relevant art will appreciate that the control link configuration described above is but one possible mechanism for controlling chordon length. Accordingly, in other embodiments, other control link configurations and/or other mechanisms can be used to vary chordon length during engine operation.

FIG. 21 is a cross-sectional end view of a telescoping chordon 2140 configured in accordance with another embodiment of the invention. In this embodiment, the chordon 2140 includes a coil spring 2143 compressed between a body portion 2147 and a corresponding base portion 2149. As the chordon 2140 sweeps through its arc during engine operation, the coil spring 2143 presses the body portion 2147 against the adjacent chordon surface, thereby maintaining a sufficient seal without detrimental binding or gaps.

Telescoping chordons configured in accordance with other embodiments of the invention can include other means for controlling chordon length during engine operation. Such means can include, for example, hydraulic and/or pneumatic systems that function in a manner that is at least generally similar to the coil spring 2143 described above. Telescoping chordons such as those described above with reference to FIGS. 20A-21 can be utilized in a number of different engine configurations where a variable chordon length is required or desirable. Such engine configurations can include, for example, the engines 1800 and 1900 described above with reference to FIGS. 18A-19B.

III. Valve Actuation

Figure 22:
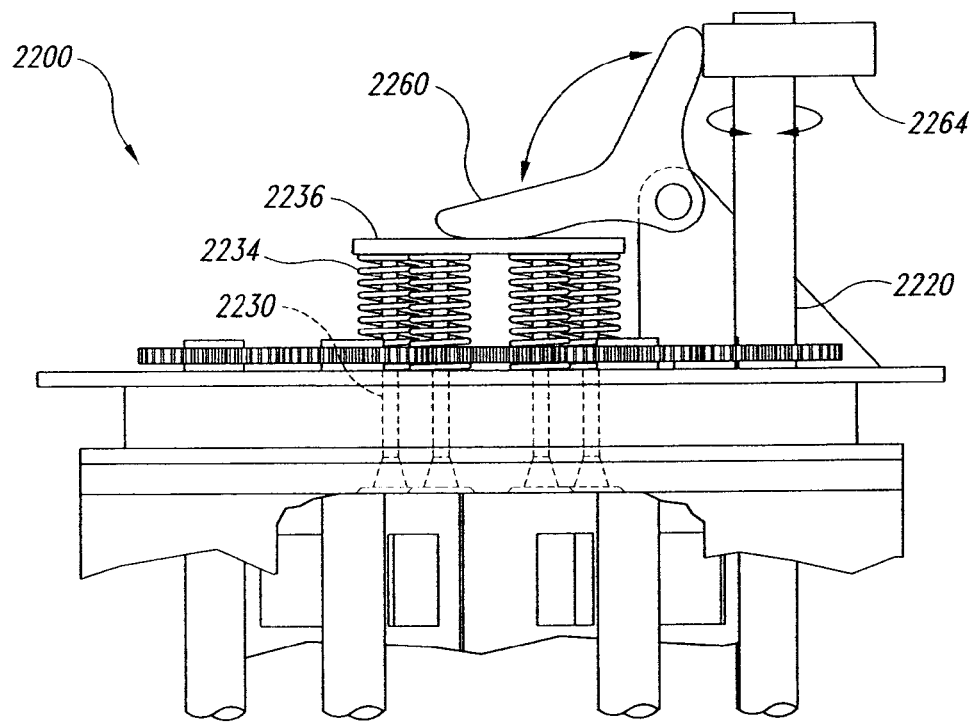
FIG. 22 is a side view of a portion of a radial impulse engine illustrating a system for poppet valve actuation in accordance with an embodiment of the invention.

FIG. 22 is a side view of a portion of a radial impulse engine 2200 ("engine 2200") illustrating a system for poppet valve actuation in accordance with an embodiment of the invention. The engine 2200 can be at least generally similar in structure and function to the engine 100 described above with reference to FIGS. 1-4E. For example, the engine 2200 can include a plurality of intake and/or exhaust valves 2230 held closed by a plurality of corresponding coil springs 2234. In this particular embodiment, however, the engine 2200 further includes a cam lobe 2264 fixedly attached to a distal end of an extended wrist shaft 2220. A rocker arm 2260 pivotally extends between the cam lobe 2264 and a valve actuator plate 2236. During engine operation, the pivoting cam lobe 2264 causes the rocker arm 2260 to intermittently press against the actuator plate 2236, thereby compressing the valve springs 2234 and temporarily opening the poppet valves 2230. In other embodiments of the present invention, valve actuation can be performed by other parts of the engine 2200. In one other embodiment, for example, a valve-actuating cam lobe or cam lobes can be driven off of a synchronizing ring gear (e.g., one of the ring gears 228 of FIG. 2).

Figure 23:
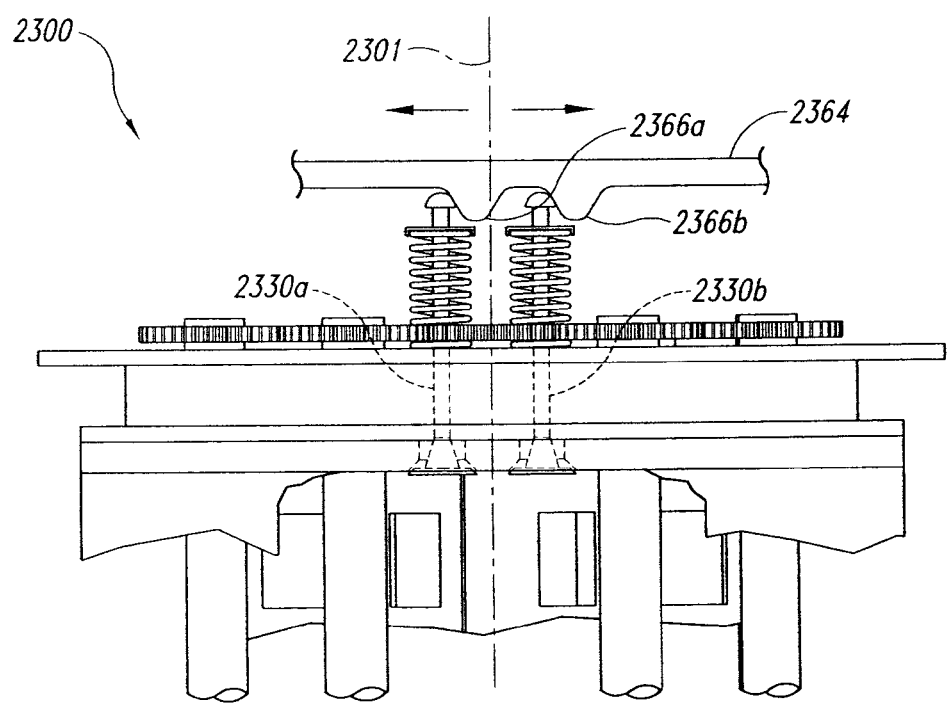
FIG. 23 is a side view of a portion of a radial impulse engine illustrating a system for poppet valve actuation in accordance with another embodiment of the invention.

FIG. 23 illustrates a valve actuation system configured in accordance with another embodiment of the invention. In this embodiment, a radial impulse engine 2300 ("engine 2300") includes a cylindrical ring cam 2364 configured to rotate about an engine center axis 2301. The ring cam 2364 can be driven in a number of different ways. In one embodiment, for example, the ring cam 2364 can be driven off of a wrist shaft gear (not shown). In another embodiment, the ring cam 2364 can be driven off of a synchronizing ring gear (e.g., a ring gear at least generally similar in structure and function to the ring gears 228 of FIG. 2). The ring cam 2364 includes a plurality of cam lobes 2366a-b that depress and open adjacent poppet valves 2330 as the ring cam 2364 rotates about the center axis 2301.

If symmetrical valve opening/closing profiles are desired, then the cam lobes 2366 should have correspondingly symmetrical shapes. In such embodiments, the ring cam 2364 can rotate unidirectionally or reciprocate back and forth. Alternatively, if an asymmetrical valve opening/closing profile is desired, then the cam lobes 2366 should have a correspondingly asymmetrical shape, and the ring cam 2364 should be configured to rotate unidirectionally about the center axis 2301.

Figure 24:
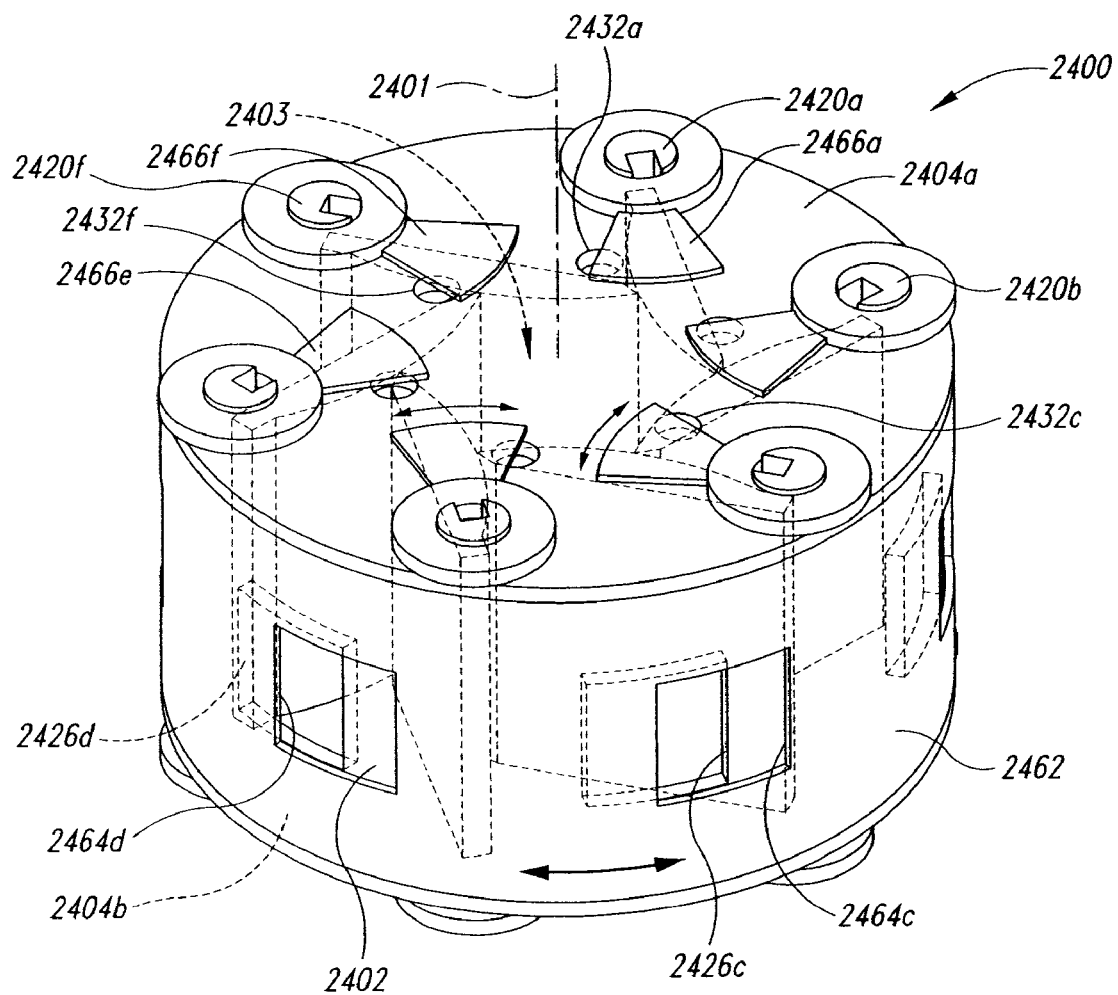
FIG. 24 is an isometric view of a portion of a radial impulse engine illustrating a method for controlling the flow of gaseous mixtures into and out of an associated combustion chamber.

FIG. 24 is an isometric view of a portion of a radial impulse engine 2400 ("engine 2400") illustrating a method for controlling the flow of gaseous mixtures into and out of an associated combustion chamber 2403. In one aspect of this embodiment, the engine 2400 includes a scavenging barrel 2402 extending between a first end plate 2404a and a second end plate 2404b. The scavenging barrel 2402 includes a plurality of intake ports 2426a-f configured to admit an air/fuel mixture into the scavenging barrel 2402. One or both of the end plates 2404 can include a plurality of exhaust ports 2432a-f configured to discharge exhaust gases from the combustion chamber 2403.

In another aspect of this embodiment, the engine 2400 further includes a cylindrical sleeve valve 2462 and a series of shutter valves 2466a-f. The sleeve valve 2462 is concentrically disposed around the exterior of the scavenging barrel 2402, and includes a plurality of apertures 2464a-f. In operation, the sleeve valve 2462 rotates about an engine center axis 2401 to vary the position of the apertures 2464 relative to the intake ports 2426 and control the flow of the air/fuel mixture into the scavenging barrel 2402. In one embodiment, movement of the sleeve valve 2462 can be controlled through gear engagement with one or more of a plurality of wrist shafts 2420a-f. In other embodiments, movement of the sleeve valve 2462 can be controlled by other means. In the illustrated embodiment, the shutter valves 2466 are operably coupled to the wrist shafts 2420. In operation, the shutter valves 2466 rotate back and forth with the wrist shafts 2420 to open and close the exhaust ports 2432 at the appropriate times during chordon stroke.

Figure 25:
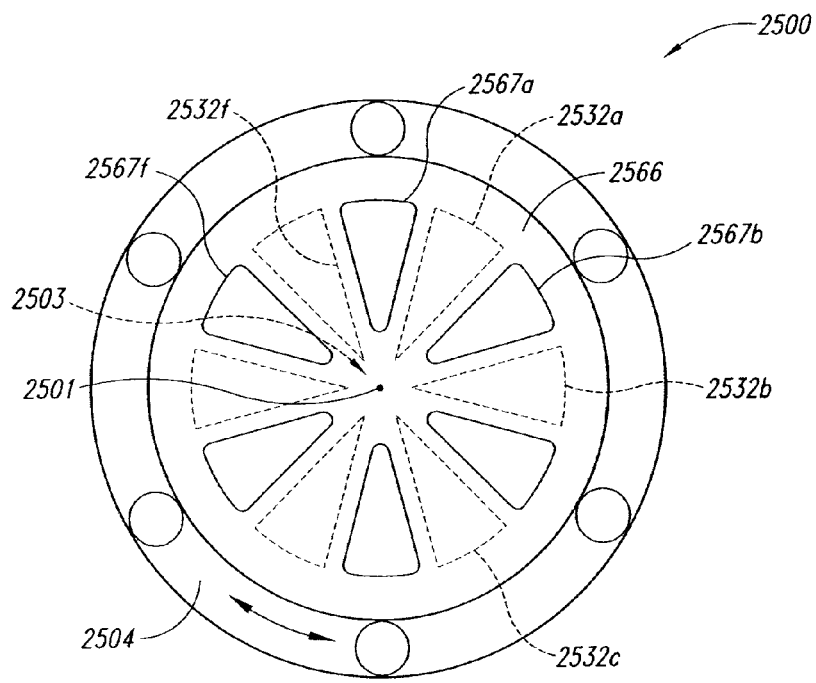
FIG. 25 is a partially hidden top view of a portion of a radial impulse engine having a movable valve plate configured in accordance with an embodiment of the invention.

FIG. 25 is a partially hidden top view of a portion of a radial impulse engine 2500 ("engine 2500") having a movable valve plate 2566 that overlays an engine end plate 2504. In this embodiment, the engine end plate 2504 includes a plurality of shaped exhaust ports 2532a-f which open into a combustion chamber 2503. The valve plate 2566 includes a plurality of corresponding apertures 2567a-f. In operation, the valve plate 2566 rotates back and forth (or unidirectionally) about an engine center axis 2501 to position the apertures 2567 over the exhaust ports 2532 at the appropriate times during chordon stroke.

IV. Power Take Out

A portion of the discussion above directed to FIG. 2 described one method for taking power out of a radial impulse engine, namely, by operably coupling the wrist shafts to a crankshaft via one or more connecting rods. In other embodiments of the invention, however, other methods can be used to take power out of the radial impulse engines described above.

Figure 26:
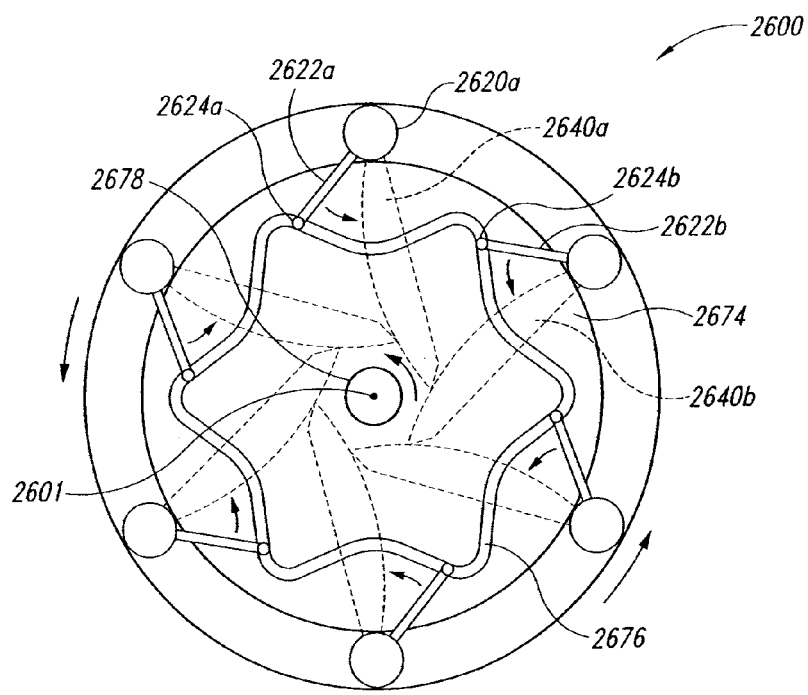
FIG. 26 is a top view of a radial impulse engine having a cam plate for transmitting power from a plurality of chordons to an output shaft.

FIG. 26, for example, is a top view of a radial impulse engine 2600 having a cam plate 2674 for transmitting power from a plurality of chordons 2640a-f to an output shaft 2678. In this embodiment, a torque arm 2622a-f is fixedly attached to each chordon wrist shaft 2620a-f. A cam follower 2624a-f positioned on the distal end of each torque arm 2622 rollably engages a cam track 2676 in the cam plate 2674. In operation, the torque arms 2622 move with the chordons 2640 so that when the chordons 2640 pivot outwardly during the power stroke, the cam followers 2624 move inwardly and drive the cam plate 2674 in a counterclockwise direction about an engine center axis 2601. At the end of the power stroke, the momentum of the rotating cam plate 2674 drives the chordons 2640 back toward the top dead center position for compression and ignition of the next intake charge.

Figure 27A:
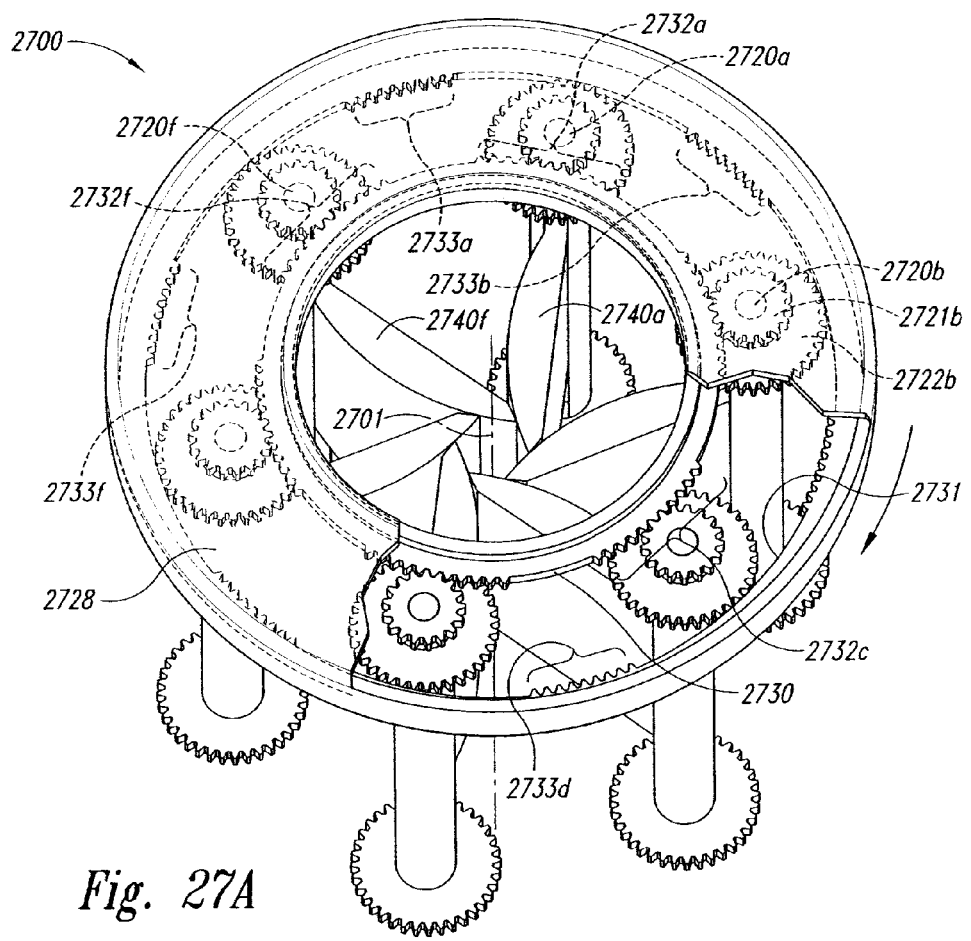
FIG. 27A is a partially cut-away isometric view of a radial impulse engine that uses a duplex synchronization gear for transmitting power from a plurality of chordons.
Figure 27B:
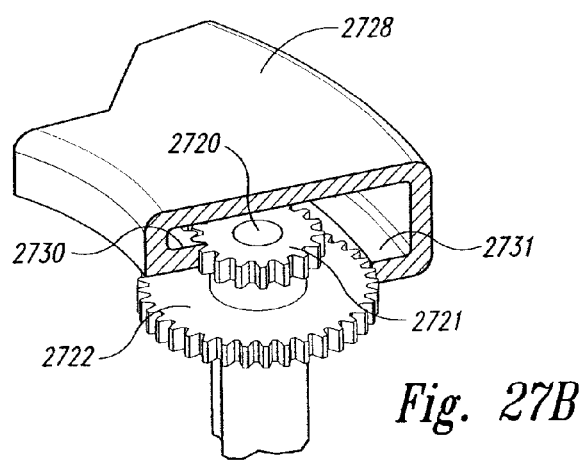
FIG. 27B is a cross-sectional view taken through a wrist shaft of FIG. 27A.

FIG. 27A is a partially cutaway isometric view of a radial impulse engine 2700 that uses a duplex synchronization gear 2728 for transmitting power from a plurality of chordons 2740a-f. FIG. 27B is a cross-sectional view taken through a wrist shaft 2720 of FIG. 27A. Referring to FIGS. 27A and 27B together, the synchronization gear 2728 has a channel shape with an inner flange 2730 and an outer flange 2731. The inner flange 2730 includes a plurality of equally spaced-apart inner teeth groups 2732a-f. The outer flange 2731 similarly includes a plurality of equally spaced-apart outer teeth groups 2733a-f. Each of the wrist shafts 2720a-f carries a first timing gear 2721 and a second timing gear 2722. The first timing gears 2721 are configured to sequentially engage the inner teeth groups 2732, and the second timing gears 2722 are configured to sequentially engage the outer teeth groups 2733.

In operation, the synchronization gear 2728 rotates in one direction (e.g., a clockwise direction) about an engine center axis 2701. When the chordons 2740 begin moving outwardly from the top dead center position on the power stroke, the first timing gears 2721 engage the inner teeth groups 2732 of the synchronization gear 2728, thereby driving the synchronization gear 2728 in the clockwise direction. When the chordons 2740 reach the bottom dead center position, the first timing gears 2721 disengage from the inner teeth groups 2732 and the second timing gears 2722 simultaneously engage the outer teeth groups 2733. The momentum of the rotating synchronization gear 2728 then drives the chordons 2740 back inwardly toward the top dead center position. Thus, as the synchronization gear 2728 rotates about the center axis 2701, it alternates between receiving power pulses from the chordons 2740 via the first timing gears 2721 and driving the chordons 2740 back toward the top dead center position via the second timing gears 2722. Accordingly, the wrist shafts 2720 oscillate back and forth while the synchronization gear rotates unidirectionally to maintain flywheel effect.

Figure 28:
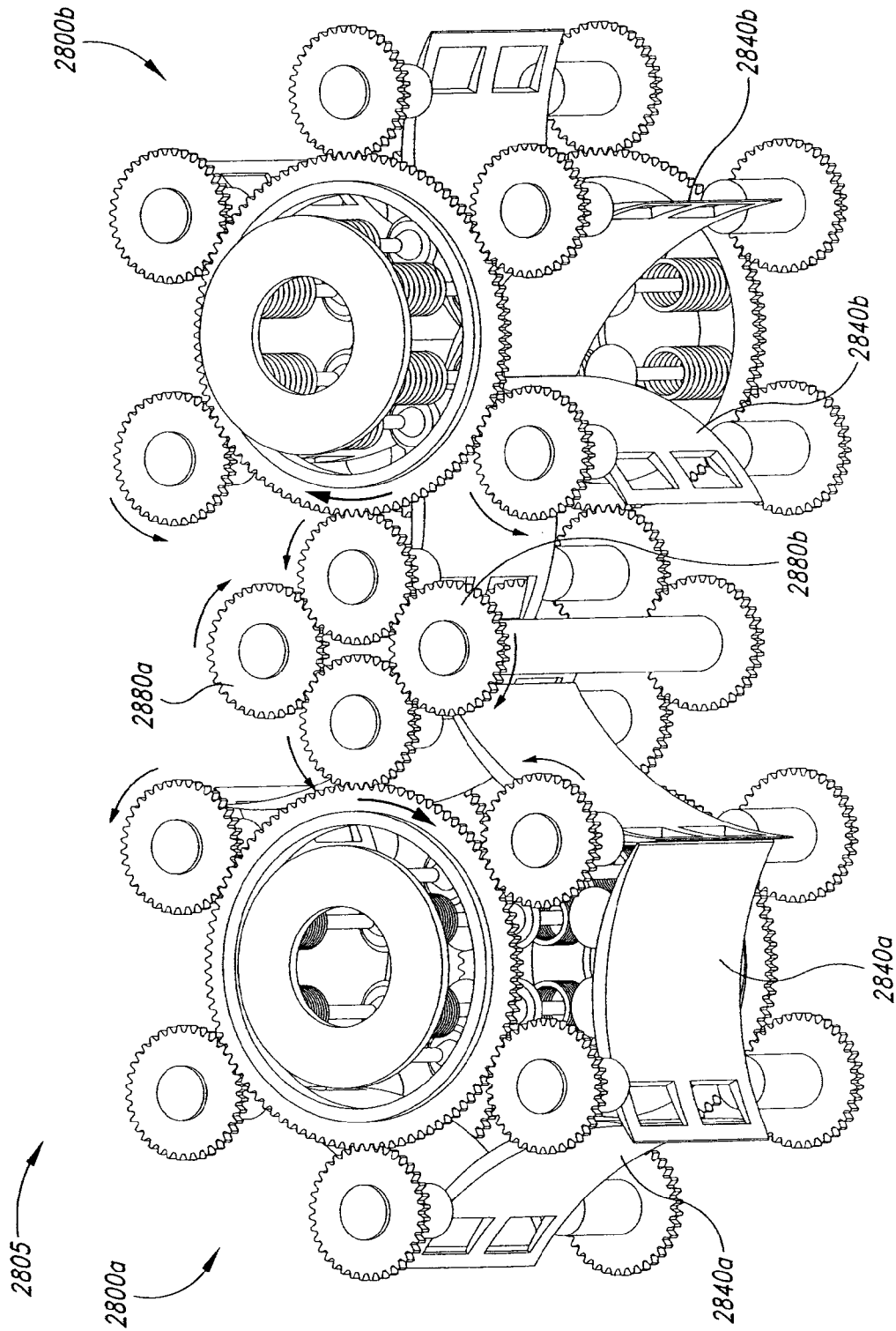
FIG. 28 is an isometric view of a portion of a power unit having a first radial impulse engine operably coupled to a second radial impulse engine in accordance with an embodiment of the invention.

FIG. 28 is an isometric view of a portion of a power unit 2805 having a first radial impulse engine 2800a operably coupled to a second radial impulse engine 2800b in accordance with an embodiment of the invention. The radial impulse engines 2800 of this embodiment can be at least generally similar in structure and function to one or more of the radial impulse engines described in detail above. For example, the first engine 2800a can include a plurality of first chordons 2840a, and the second engine 2800b can include a plurality of second chordons 2840b. The first chordons 2840a are operably coupled to the second chordons 2840b by means of a gear set 2880a-b.

In this particular embodiment, the first chordons 2840a operate counter-cyclically with respect to the second chordons 2840b. That is, the first chordons 2840a are at a bottom dead center position when the second chordons 2840b are at a top dead center position. One advantage of this embodiment is that counter-cyclic operation can enable the power unit 2805 to provide constant, or near-constant, torque output.

V. Power Unit Configurations

Figure 29:
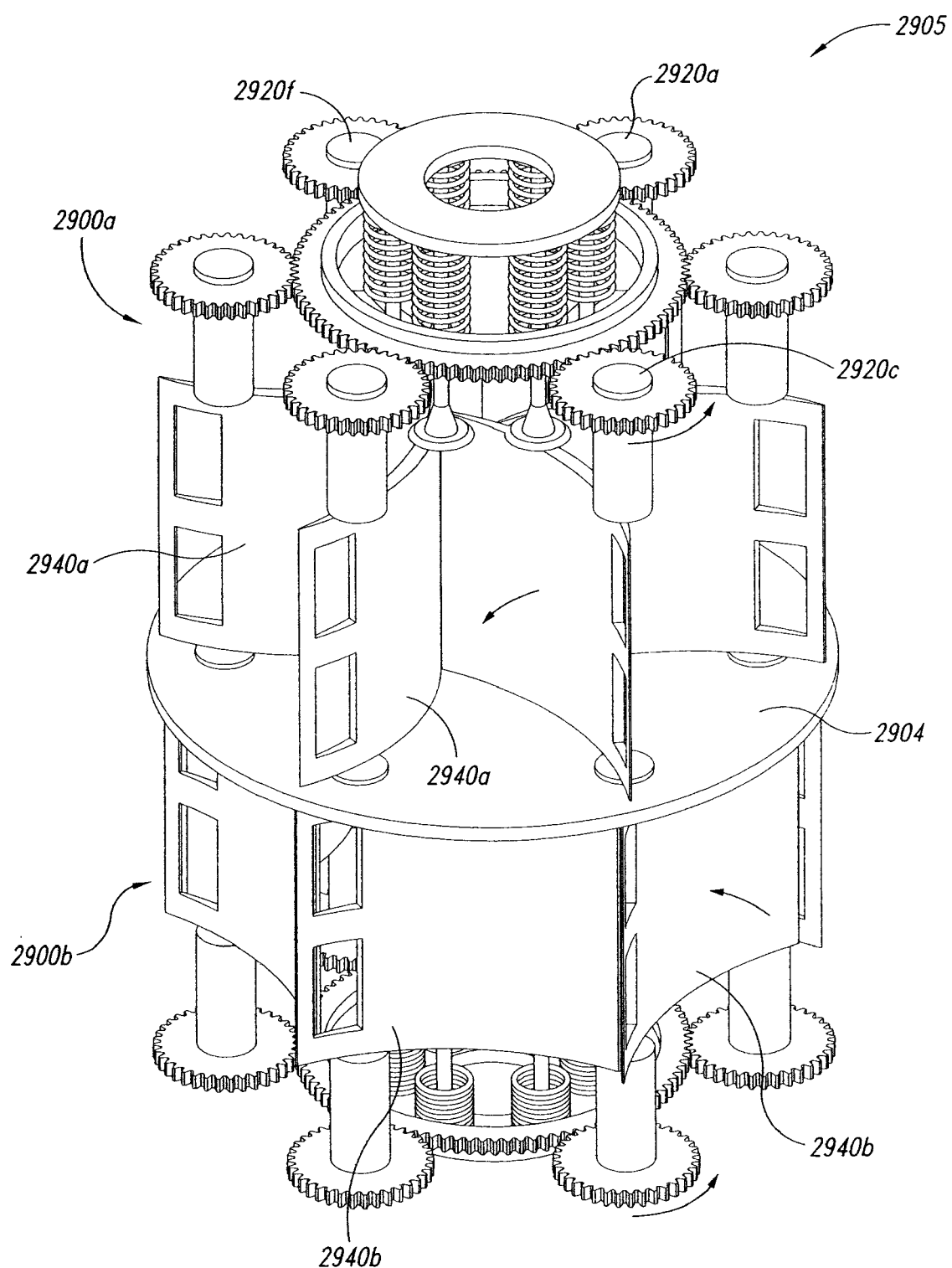
FIG. 29 is an isometric view of a portion of a power unit configured in accordance with another embodiment of the invention.

FIG. 29 is an isometric view of a portion of a power unit 2905 configured in accordance with another embodiment of the invention. In this embodiment, the power unit 2905 includes a first radial impulse engine 2900a coaxially coupled to a second radial impulse engine 2900b. The radial impulse engines 2900 can be at least generally similar in structure and function to one or more of the radial impulse engines described in detail above. For example, the first engine 2900a can include a plurality of first chordons 2940a, and the second engine 2900b can include a plurality of second chordons 2940b.

In this particular embodiment, however, the power unit 2905 further includes a plurality of extended wrist shafts 2920 (identified individually as wrist shafts 2920a-f) extending through a mid-plate 2904. The wrist shafts 2920 carry the first chordons 2940a of the first engine 2900a as well as the second chordons 2940b of the second engine 2900b. The second chordons 2940b, however, are inverted relative to the first chordons 2940a so that the second engine 2900b operates counter-cyclically relative to the first engine 2900a. Specifically, as the wrist shafts 2920 rotate in a counterclockwise direction, the first chordons 2940a pivot from a top dead center position toward a bottom dead center position while the second chordons 2940b pivot inwardly from a bottom dead center position toward a top dead center position. As mentioned above with reference to FIG. 28, this counter-cyclic operation enables the power unit 2905 to provide constant, or near-constant, torque output.

Figure 30:
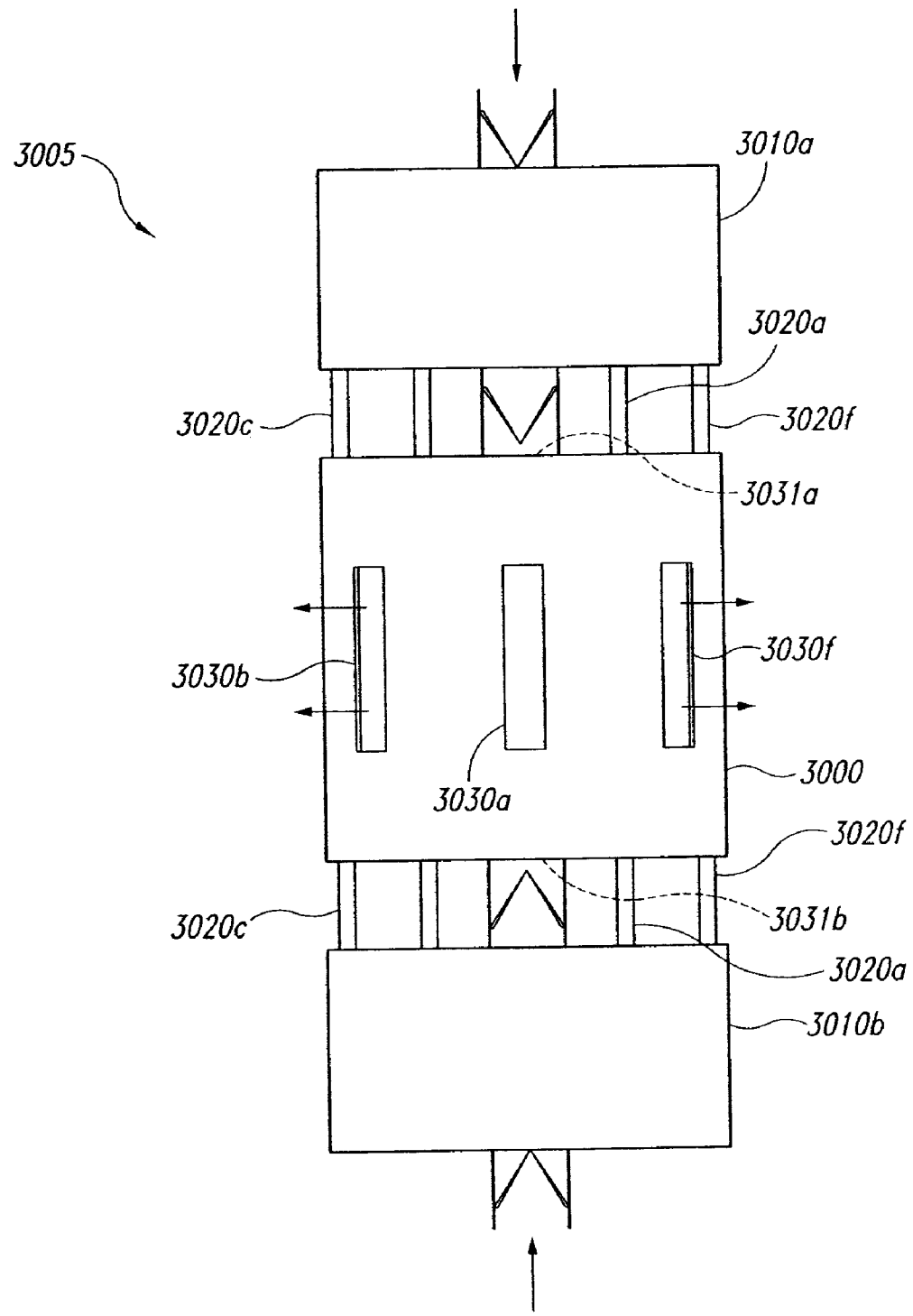
FIG. 30 is a partially schematic side view of a power unit configured in accordance with a further embodiment of the invention.

FIG. 30 is a partially schematic side view of a power unit 3005 configured in accordance with a further embodiment of the invention. In this embodiment, the power unit 3005 includes a radial impulse engine 3000 ("engine 3000") operably coupled to a first radial compressor 3010a and a second radial compressor 3010b. The compressors 3010 are coaxially aligned with the engine 3000. Further, each of the compressors 3010 includes a plurality of chordons (not shown) operably coupled to a plurality of corresponding chordons (also not shown) in the engine 3000 by means of extended wrist shafts 3020 (identified individually as wrist shafts 3020a-f). As described in greater detail below with reference to FIGS. 31A-31C, in operation, the compressors 3010 pump compressed air into the engine 3000 via a first intake port 3031a and an opposite second intake port 3031b. The compressed air is then mixed with fuel and ignited in the engine 3000 before being discharged through a plurality of exhaust ports 3030a-f.

Figure 31C:
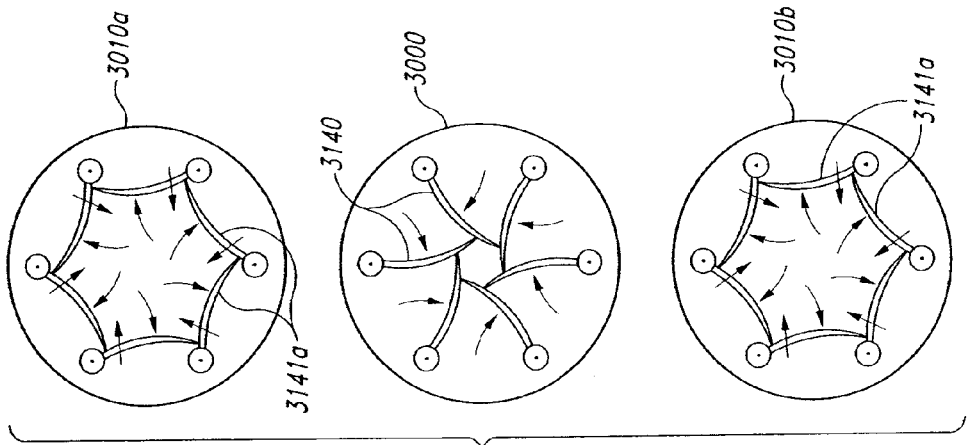
FIGS. 31A-31C are a series of top views illustrating a method of operating the power unit of FIG. 30.
Figure 31B:
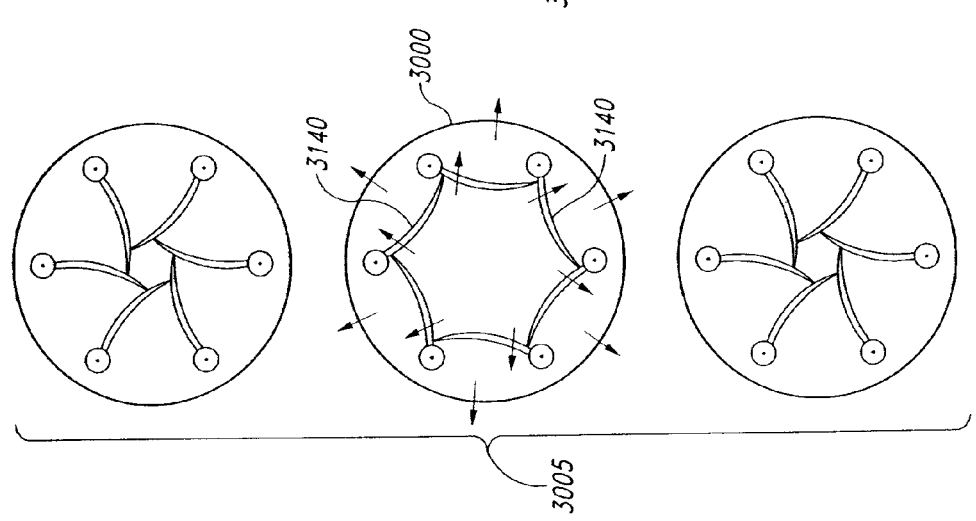
Figure 31A:
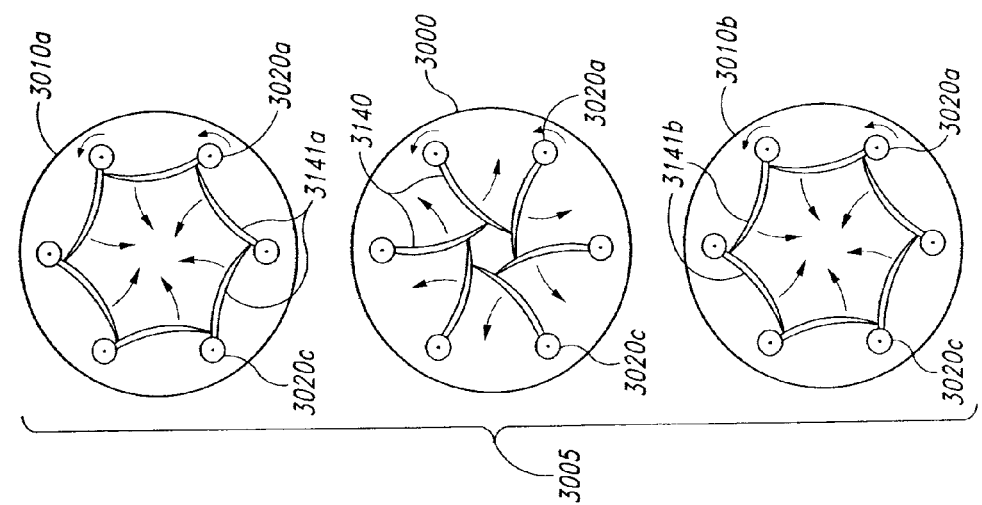

FIGS. 31A-31C are a series of top views illustrating a method of operating the power unit 3005 of FIG. 30 in accordance with an embodiment of the invention. Referring first to FIG. 31A, the engine 3000 includes a plurality of engine chordons 3140 operably coupled to the extended wrist shafts 3020. The first compressor 3010a includes a plurality of first compressor chordons 3141a operably coupled to the extended wrist shafts 3020, and the second compressor 3010b similarly includes a plurality of second compressor chordons 3141b operably coupled to the extended wrist shafts 3020. The compressor chordons 3141 are inverted with respect to the engine chordons 3140 so that compressors 3010 operate counter-cyclically with respect to the engine 3000.

Operation of the power unit 3005 can begin by ignition of an intake charge in the engine 3000 when the engine chordons 3140 are in a top dead center position as illustrated in FIG. 31A. The resulting combustion drives the engine chordons 3140 outwardly, causing the wrist shafts 3020 to rotate in a counterclockwise direction. This wrist shaft rotation drives the compressor chordons 3141 of the first and second compressors 3010 inwardly toward a top dead center position. As the compressor chordons 3141 move inwardly, they drive the air in their respective chambers into the engine 3000 via the first and second intake ports 3031 (FIG. 30). When the engine chordons 3140 reach the bottom dead center position as illustrated in FIG. 31B, the exhaust gases are allowed to flow out of the engine 3000 via the exhaust ports 3030 (FIG. 30). The incoming air from the adjacent compressors 3010 helps to drive the exhaust gases out of the engine 3000.

Referring next to FIG. 31C, the intake ports 3031 (FIG. 30) close as the engine chordons 3140 move inwardly from the bottom dead center position toward the top dead center position. As a result, the intake charge is compressed in the engine 3000. Simultaneously, the compressor chordons 3141 of the adjacent compressors 3010 move outwardly from their respective top dead center positions to bottom dead center positions, in the process drawing new air into their respective combustion chambers. At this time, fuel is mixed with the intake charge in the engine 3000 and ignited, causing the cycle described above to repeat.

Although various aspects of the invention described above are directed to internal combustion engines, in other embodiments, other aspects of the invention can be directed to other types of power units, including, for example, steam engines, diesel engines, hybrid engines, etc. Furthermore, in yet other embodiments, other aspects of the invention can be directed to other types of useful machines, including pumps (e.g., air pumps, water pumps, etc.), compressors, etc.

VI. Radial Impulse Steam Engines

Figure 32A:
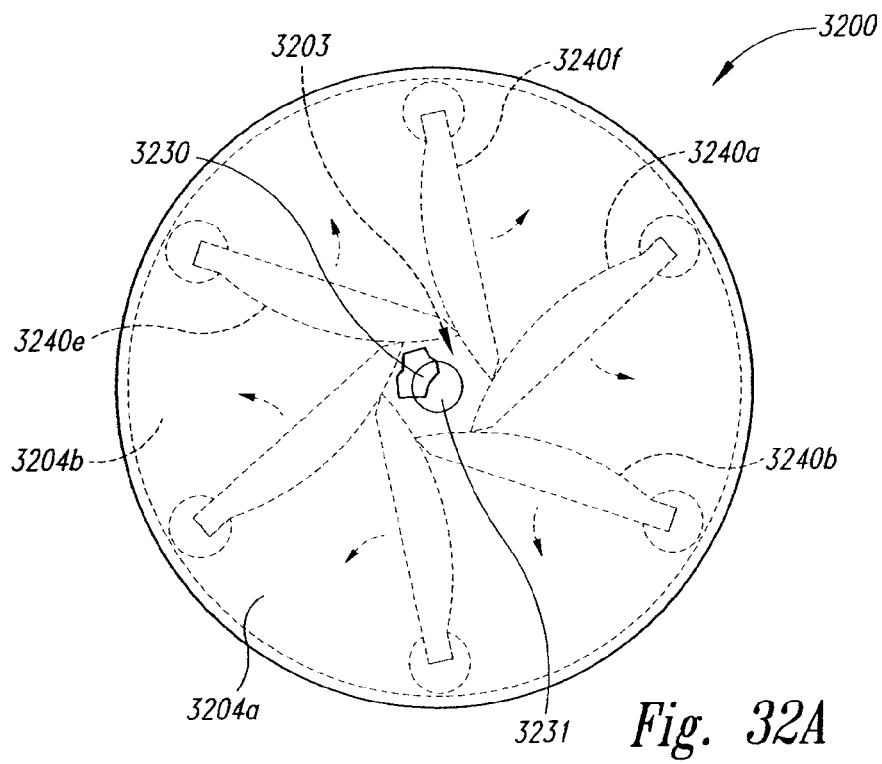
FIGS. 32A and 32B are top views of a radial impulse steam engine configured in accordance with an embodiment of the invention.
Figure 32B:
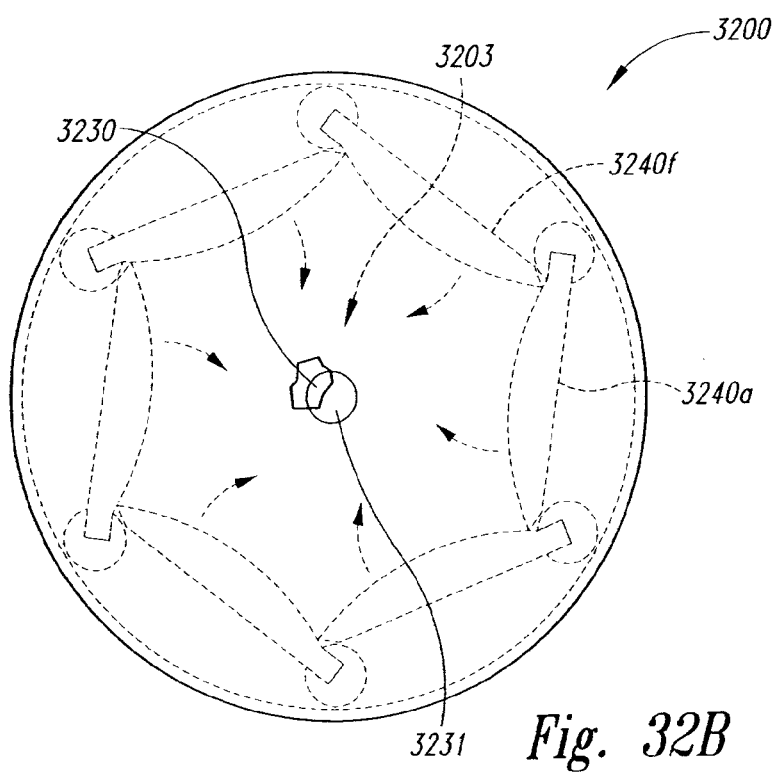

FIGS. 32A and 32B are top views of a radial impulse steam engine 3200 ("steam engine 3200") configured in accordance with an embodiment of the invention. Referring first to FIG. 32A, the steam engine 3200 includes a plurality of chordons 3240a-f movably disposed between a first end plate 3204a and a second end plate 3204b. An intake valve 3231 is positioned in the first end plate 3204a, and an exhaust valve 3230 is positioned in the second end plate 3204b.

In operation, the intake valve 3231 opens and admits steam into an expansion chamber 3203 when the chordons 3240 are in the top dead center position of FIG. 32A. The intake valve 3231 then closes as the steam expands, driving the chordons 3240 outwardly. As the chordons 3240 move outwardly, the exhaust valve 3230 begins to open, allowing the steam to flow out of the expansion chamber 3203. When the chordons 3240 reach the bottom dead center position of FIG. 32B, the exhaust valve 3230 is fully open.

As the chordons 3240 begin to move inwardly from the bottom dead center position, the exhaust valve 3130 starts to close. When the chordons 3240 reach the top dead center position of FIG. 32A, the exhaust valve 3230 is fully closed. At this time, the cycle repeats as the intake valve 3231 opens, admitting a fresh charge of steam into the expansion chamber 3203.

Although FIGS. 32A and 32B illustrate only a single intake valve 3231 and a single exhaust valve 3230, in other embodiments, steam engines configured in accordance with the present invention can include one or more intake valves and/or one or more exhaust valves. Further, in another embodiment of the invention, two steam engines at least generally similar in structure and function to the steam engine 3200 can be counter-cyclically coupled together to provide constant, or near-constant, torque output.

Figure 33A:
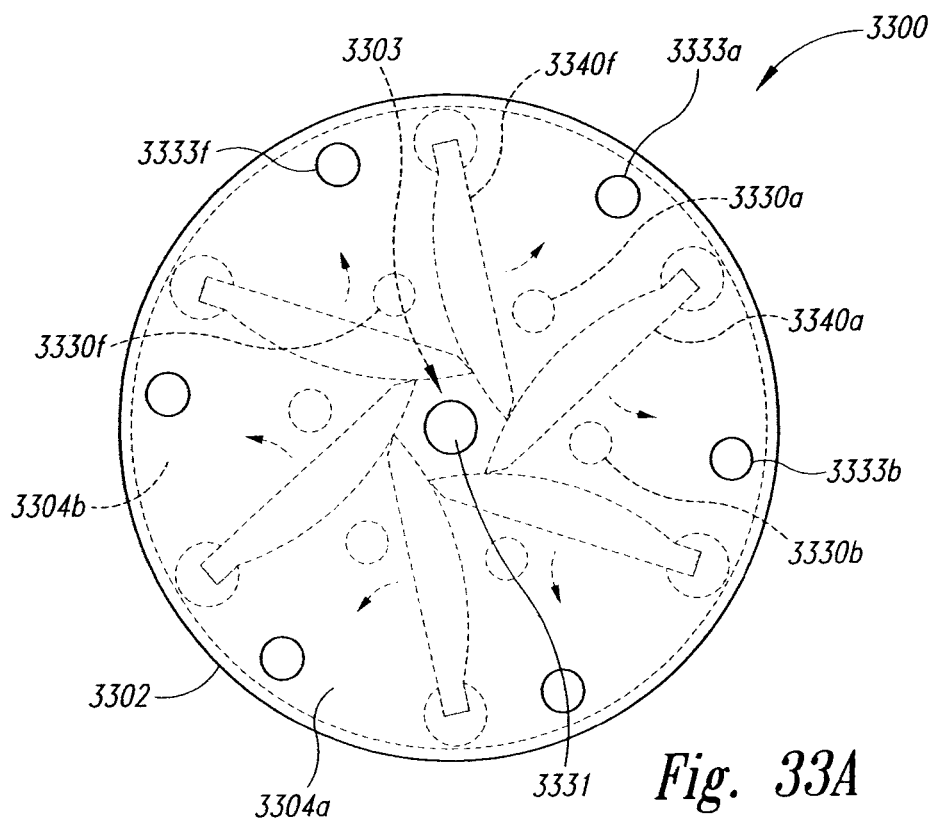
FIGS. 33A and 33B are top views of a radial impulse steam engine configured in accordance with another embodiment of the invention.
Figure 33B:
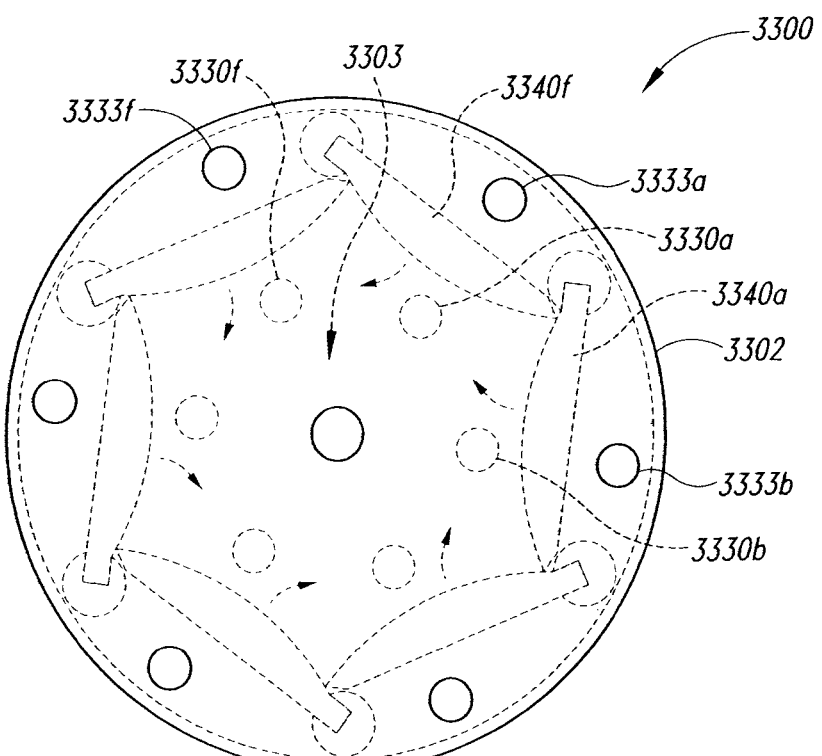

FIGS. 33A and 33B are top views of a radial impulse steam engine 3300 ("steam engine 3300") configured in accordance with another embodiment of the invention. Referring to FIGS. 33A and 33B together, the steam engine 3300 includes a plurality of chordons 3340a-f movably disposed between a first end plate 3304a and a second end plate 3304b. A barrel 3302 extends around the chordons 3340 between the first and second end plates 3304. In this particular embodiment, a first intake valve 3331 is positioned at the center of the first end plate 3304a, and a plurality of second intake valves 3333a-f are positioned toward the outer perimeter of the first end plate 3304a. In addition, a plurality of exhaust valves 3330a-f are positioned in the second end plate 3304b approximately equidistant between the center of the steam engine 3300 and the outer perimeter of the second end plate 3304b.

In operation, the first intake valve 3331 opens and admits steam into an expansion chamber 3303 when the chordons 3340 are in the top dead center position shown in FIG. 33A. The first intake valve 3331 then closes, allowing the steam to expand and drive the chordons 3340 outwardly toward the bottom dead center position shown in FIG. 33B. As the chordons 3340 move past the exhaust valves 3330, the exhaust valves 3330 open, allowing the steam to flow out of the expansion chamber 3303.

When the chordons 3340 reach the bottom dead center position shown in FIG. 33B, the second intake valves 3333 open, admitting a fresh charge of steam into the space between the chordons 3340 and the barrel 3302. The second intake valves 3333 then close, allowing this steam to expand and drive the chordons 3340 inwardly toward the top dead center position of FIG. 33A. As the chordons 3340 move inwardly, the exhaust valves 3330 close to avoid contact. When the chordons 3340 reach the top dead center position of FIG. 33A, the exhaust valves 3330 again open, allowing the pressurized steam behind the chordons 3340 to escape. At this time, the cycle repeats as the first intake valve 3331 opens, admitting a fresh charge of steam into the expansion chamber 3303.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

We claim:

1. An engine comprising:
   a first end wall portion;
   a second end wall portion spaced apart from the first end wall portion to at least partially define a pressure chamber therebetween;
   a first movable wall portion operably disposed between the first and second end wall portions, the first movable wall portion having a first distal edge portion spaced apart from a first pivot axis; and
   a second movable wall portion operably disposed between the first and second end wall portions adjacent to the first movable wall portion, the second movable wall portion having a second distal edge portion spaced apart from a second pivot axis, wherein the first distal edge portion of the first movable wall portion is configured to slide across a surface of the second movable wall portion as the first movable wall portion pivots back and forth about the first pivot axis and the second movable wall portion pivots back and forth about the second pivot axis.

2. The engine of claim 1 wherein the surface of the second movable wall portion is parallel to the second pivot axis.

3. The engine of claim 1 wherein the first and second pivot axes extend through the first and second end wall portions.

4. The engine of claim 1 wherein the first movable wall portion is operably coupled to the second movable wall portion so that the first movable wall portion moves in unison with the second movable wall portion.

5. The engine of claim 1, further comprising a synchronizing gear operably coupling the first movable wall portion to the second movable wall portion.

6. The engine of claim 1, further comprising:
   a third movable wall portion disposed between the first and second end wall portions; and
   a synchronizing gear operably coupling the first movable wall portion to the second and third movable wall portions.

7. The engine of claim 1, further comprising:
   a third movable wall portion disposed between the first and second end wall portions; and
   a synchronizing ring gear operably coupling the first movable wall portion to the second and third movable wall portions.

8. The engine of claim 1 wherein the surface of the second movable wall portion extends from the second distal edge portion of the second movable wall portion to a proximal edge portion of the second movable wall portion, and wherein the second pivot axis of the second movable wall portion is positioned between the second distal edge portion and the proximal edge portion.

9. The engine of claim 1 wherein the first distal edge portion of the first movable wall portion carries a seal configured to slide across the surface of the second movable wall portion as the first movable wall portion pivots about the first pivot axis and the second movable wall portion pivots about the second pivot axis.

10. The engine of claim 1, further comprising a fuel injector carried by the first end wall portion, wherein the pressure chamber is a combustion chamber and the fuel injector is configured to spray fuel into the combustion chamber.

11. The engine of claim 1, further comprising an igniter carried by the first end wall portion, wherein the pressure chamber is a combustion chamber and the igniter is configured to ignite an air/fuel mixture in the combustion chamber.

12. The engine of claim 1, further comprising a valve positioned in the first end wall portion, wherein the pressure chamber is a combustion chamber and the valve is configured to discharge exhaust gas from the combustion chamber.

13. The engine of claim 1, further comprising a valve positioned in the first end wall portion, wherein the pressure chamber is an expansion chamber and the valve is configured to admit pressurized steam into the expansion chamber.

14. An internal combustion engine comprising:

a combustion chamber;

a first movable wall portion positioned proximate to the combustion chamber, the first movable wall portion having a first distal edge portion spaced apart from a first pivot axis;

a second movable wall portion positioned proximate to the combustion chamber, the second movable wall portion having a second distal edge portion spaced apart from a second pivot axis;

means for introducing fuel into the combustion chamber; and means for igniting the fuel in the combustion chamber, thereby causing the first distal edge portion of the first movable wall portion to slide across a surface of the second movable wall portion as the first movable wall portion pivots back and forth about the first pivot axis and the second movable wall portion pivots back and forth about the second pivot axis.

15. The internal combustion engine of claim 14, further comprising means for discharging exhaust gas from the combustion chamber.

16. The internal combustion engine of claim 14, further comprising means for synchronizing movement of the first and second movable wall portions.

17. The internal combustion engine of claim 14, further comprising means for converting pivotal motion of the first and second movable wall portions into rotational motion of an associated crankshaft.

18. An internal combustion engine comprising:

a first end wall portion;

a second end wall portion spaced apart from the first end wall portion to at least partially define a combustion chamber therebetween;

a first movable wall portion operably disposed between the first and second end wall portions, the first movable wall portion having a distal edge portion; and a second movable wall portion operably disposed between the first and second end wall portions adjacent to the first movable wall portion, the second movable wall portion having a cylindrical surface, wherein the distal edge portion of the first movable wall portion is configured to slide across the cylindrical surface of the second movable wall portion as the first movable wall portion pivots back and forth about a first pivot axis and the second movable wall portion pivots back and forth about a second pivot axis.

19. The internal combustion engine of claim 18, further comprising:

means, operably coupled to the first end wall portion, for introducing a combustible mixture into the combustion chamber.

20. The internal combustion engine of claim 18, further comprising:

means, operably coupled to the first end wall portion, for introducing a combustible mixture into the combustion chamber; and means, operably coupled to at least one of the first end wall portion and the second end wall portion, for igniting the combustible mixture.

* * * * *